United States Patent [19]

Rembert

[11] Patent Number: 5,101,352
[45] Date of Patent: Mar. 31, 1992

[54] MATERIAL REQUIREMENTS PLANNING SYSTEM

[75] Inventor: Allen J. Rembert, Greensboro, N.C.

[73] Assignee: Carolina Cipher, Greensboro, N.C.

[21] Appl. No.: 373,902

[22] Filed: Jun. 29, 1989

[51] Int. Cl.⁵ ............................................. G06F 15/46
[52] U.S. Cl. .................................... 364/401; 364/403; 364/468
[58] Field of Search ............ 364/403, 401, 468, 551.01

[56] References Cited

U.S. PATENT DOCUMENTS

| | | | |
|---|---|---|---|
| 4,459,663 | 7/1984 | Dye | 364/200 |
| 4,646,238 | 2/1987 | Carlson | 364/403 |
| 4,827,423 | 5/1989 | Beasley et al. | 364/468 |
| 4,847,761 | 7/1989 | Ferriter et al. | 364/401 |
| 4,864,507 | 9/1989 | Ebling et al. | 364/468 |
| 4,887,207 | 12/1989 | Natarajan | 364/401 |

Primary Examiner—Jerry Smith
Assistant Examiner—Russell E. Cass
Attorney, Agent, or Firm—Rhodes, Coats & Bennett

[57] ABSTRACT

An integrated MRP system for distributors, manufacture and job shops is provided. The MRP system of the present invention is specifically directed to an user which manufactures and sells products that have a wide variety of options. In particular, the MRP system of the present invention provides two key features. The first feature allows the user to define items which uniquely characterize the product for a customer order, purchase order, to work order. The second unique feature of the MRP system of the present invention is the application of user-defined formulas which allow the user to include user-defined formulas which determined the quantity and/or size of a part based on the selected options. Thus, the MRP system of the present invention allows the user who manufactures and sells a number of styles with a wide variety of options to employ an MRP system without a correspondingly high manintenance overhead.

8 Claims, 16 Drawing Sheets

FIG. 3

PRIMARY FILES

| MODULE | SALES ORDER 42 | INVENTORY ITEM 44 | PURCHASE ORDER 46 | PRODUCT STANDARDS 48 | STANDARD OPERATIONS 50 | ESTIMATE 52 | WORK ORDER 54 |
|---|---|---|---|---|---|---|---|
| SALES ORDER ENTRY 22 | ● | ● | | | | | |
| INVENTORY CONTROL 24 | | ● | | | | | |
| PURCHASING 26 | | ● | ● | | | | |
| ESTIMATING AND PRODUCT STANDARDS 28 | | ● | | ● | ● | ● | |
| WORK ORDER CONTROL 30 | | ● | | ● | ● | ● | ● |
| MRP 32 | ● | ● | ● | ● | ● | ● | ● |

MATERIAL REQUIREMENTS PLANNING SYSTEM

BACKGROUND OF THE INVENTION (1) Field of the Invention

The present invention relates generally to a computerized manufacturing system and, in particular, to a new and novel method for controlling the production, including pricing, costing, scheduling etc., by such a system.

(2) Description of the Prior Art

Material Requirements Planning (MRP) is the technique for determining the net time phased requirement of dependent items parts or sub-assemblies from known (e.g. sales orders) or assumed (e.g. sales forecast) independent demand. A Bill of Materials (BOM) is used to define a relationship between the independent demand items at one level and the dependent demand items at the next lower level. In addition, the BOM also is used as the basis for costing and pulling materials from inventory for released work orders. Typically MRP planning is carried out by a general purpose computer operating under software control.

In most prior art MRP systems, there is an "one-for-one" relationship between an independent demand item produced and the BOM which defines the dependent items and the quantity of each dependent item required to build the independent demand item. Some MRP systems have the additional capability of including limited conditions in the BOM. However, such MRP systems do not include any general provision for providing a "many-to-one" relationship between the independent demand items and the BOM.

Unfortunately such MRP systems pose a problem for an user which manufactures and sells products that are available in a wide variety of options. Upholstered furniture companies, for example, sell chairs by style number. They are often available in a variety of fabrics and finishes. Another example is found in the apparel industry where it is common to specify product by style, size and color.

The general MRP solution for this type of manufacturer is to enter into its MRP system a product number and a BOM for each possible style/option combination. While this approach is conceivable, it would necessitate thousands of unnecessary product numbers and BOMs. This would create a huge problem in maintaining the BOMs and entering the data into the MRP system. As a result, there now are a number of industry specific MRP systems which allow, for example, a furniture manufacturer to enter individual styles, fabrics and finishes which correspond to specific sub-BOMs, thereby substantially reducing the total number of BOMs required to be maintained and entered into the MRP system.

Certain disadvantages become apparent for such a MRP system. First, these MRP systems are specific solutions rather than general purpose. Thus, they can not be readily adapted for different industries or even different manufacturers in the same industry. Furthermore, a manufacturer can not add or easily modify his product structure. For example, adding the option of a sectional sofa for an existing style (i.e. add another "degree of freedom").

There have been some attempts at otherwise simplifying, limiting the data entry into the MRP system, and increasing the reliability of production estimates of the MRP system. For example, the Dye patent (U.S. Pat. No. 4,459,663) discloses a data processing system for automatically and efficiently controlling the manufacture of designated end item products and components which are used to make them. The MRP system is a basic MRP system which, in addition, incorporates an unique feature whereby the system automatically maps all end item stock to the jobs on a priority basis every time a MRP report is produced. As a result, it is not necessary to continually update the MRP system with changes made to the original stock allocation as required in prior art approaches.

The Carlson et al reference (U.S. Pat. No. 4,646,238) discloses a MRP system for controlling the flow of semiconductor products and their components through a production facility. In addition to a conventional MRP system, the Carlson patent also provides a method for by-product planning, co-product planning, and downgrading. However, neither of these references provides a solution to the problem of problem in maintaining the BOMs and entering the data into the MRP system for a distributor or manufacturer which sells products that are available in a wide variety of options.

It has thus become desirable to develop a MRP system which allows, for example, a furniture manufacturer to establish an one-to-one relationship between a style number and its BOM without regard to selected fabrics or finishes and, in addition, allows the manufacture to utilize user-defined formulas which determine the quantity and/or size of an item based on the selected options, thereby eliminating the extra number of BOMs required to be maintained and entered into the MRP system.

SUMMARY OF THE INVENTION

The present invention is directed to an integrated MRP system for distributors, manufactures and job shops. The MRP system of the present invention includes multiple modules including inventory control, sales order processing, purchasing, estimating and standards, work order control, and MRP. These modules may be interfaced to an existing accounting package which includes accounts receivables, accounts payable, general ledger and payroll modules. The MRP system of the present invention is specifically directed to an user which manufactures and sells products that have a wide variety of options. In particular, the MRP system of the present invention provides two key features. The first feature allows the user to define items from which one to six options may be specified to uniquely characterize the product for a customer order, purchase order, or work order. The user is only required to maintain limited information about each combination of item and options.

The second unique feature of the MRP system of the present invention is the application of user-defined formulas similar to those that are used in conventional spreadsheet programs. This is particularly useful in defining the BOM since the MRP system of the present invention allows the user to include user-defined formulas which determine the quantity and/or size of a part based on the selected options. Thus, the MRP system of the present invention allows the user who manufactures sells a number of styles with a wide variety of options to employ an MRP system which does not require the high maintenance overhead which is currently required by prior art MRP systems.

Accordingly, one aspect of the present invention is to provide a computer system for controlling the production, including pricing, costing, scheduling etc., of manufactured items having means for receiving and storing production information and means for interrogating the stored production information and using the result of such interrogation to create a parameter table containing selected production information and utilizing calculations based on the information from the parameter table to control the production of the manufactured items.

Another aspect of the present invention is to provide a computer system for controlling the production, including pricing, costing, scheduling etc., of manufactured items having means for receiving and storing production information and means for interrogating the stored production information and using the result of such interrogation to create a parameter table containing selected production information and utilizing calculations based on the information from the parameter table to control the production of the manufactured items, wherein the user may define formulas for the calculations to be performed utilizing the parameter table.

Still another aspect of the present invention is to provide a computer system for controlling the production, including pricing, costing, scheduling etc., of manufactured items having means for receiving and storing production information and means for interrogating the stored production information and using the result of such interrogation to create a parameter table containing selected production information and utilizing calculations based on the information from the parameter table to control the production of the manufactured items, wherein the system is selectively operable between pre-determined and user-defined formulas for the calculations to be performed utilizing the parameter table.

These and other aspects of the present invention will more clearly understood after review of the following description of the preferred embodiment of the invention when considered with the drawings.

BRIEF DESCRIPTION OF THE DRAWINGS

FIG. 3 is a schematic diagram representing the data structure in a computer system implementing the present invention;

DESCRIPTION OF THE PREFERRED EMBODIMENT

Figure 1:
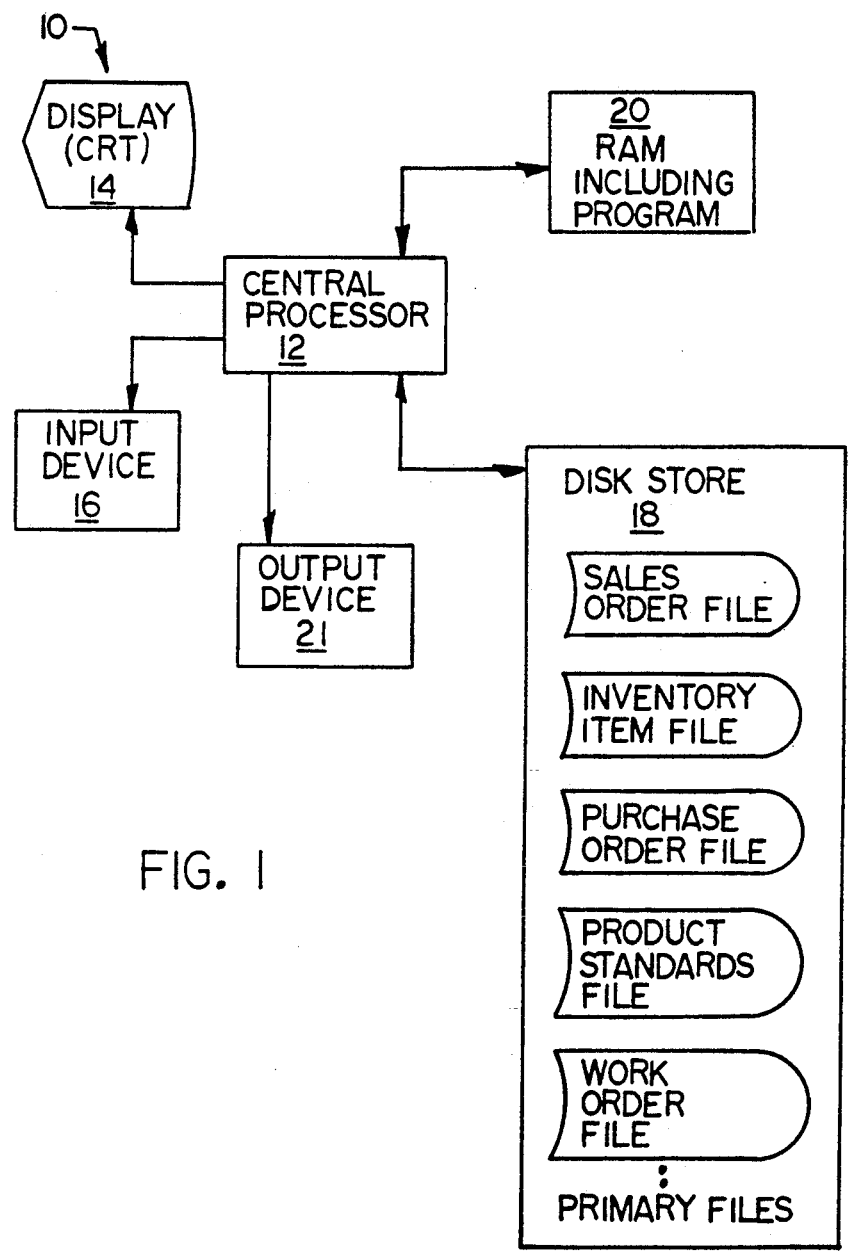
FIG. 1 is a generalized block diagram of a programmable computer system suitable for implementing the exemplary embodiment of the present invention.

Referring now to the drawings in general and to FIG. 1 in particular, it will be understood that the illustrations are for the purpose of describing a preferred embodiment of the invention and are not intended to limit the invention thereto.

FIG. 1 provides a block diagram of a typical computer system 10 programmed in accordance with this invention. In the exemplary embodiment, the system 10 includes as "hardware" a Data General model MV/2500 computer and, as "software", a commercially available operating system suitably programmed to execute COBOL program instructions in accordance with this invention.

Typically, such a computer system 10 includes a processor unit 12 having human interfaces via a CRT display 14 and a manually activated keyboard 16. A disk store 18 conventionally includes a data base of, for example, inventoried fabric pieces and associated color, length, location, etc. parameters which can be readily machine accessed by the processor 12 under suitable program control. A RAM 20 is typically also included for program storage. A suitable hard copy output device 21 can be used to generate a permanent record. However, it should be understood that the spirit of the invention can also be performed by hard-wired circuitry or a special purpose computer. Such devices contain the same basic elements which are utilized when instructed by a software program according to the present invention. Consequently, the scope of the present invention is intended to be determined according to the following claims and not by the particular embodiment described herein.

Keeping this in mind, the present invention will be described in connection with how a general purpose computer can be programmed and operated to achieve the objectives of the present invention. From the following detailed description one skilled in the art will be readily capable of generating the specific instruction set for programming the computer to perform the desired operations.

In the present invention, the stored program within RAM 20 will include a program for generating the BOM in accordance with this invention. It will be appreciated that the portions of such RAM which store program segments directed toward accomplishment of a particular function will necessarily constitute a portion of the provided apparatus of "means" for achieving that same respective function in this exemplary embodiment.

In the preferred embodiment, the MRP system of the present invention includes an unique means of processing the BOM which allows the user to specify for each line of the BOM the type of calculation which is to be performed either: 1) "default" which is defined as the parts quantity times the production quantity or 2) a formula calculation which can be any calculation based on the information in any of 150 fields stored in a parameter table.

When the user sets up a BOM in the MRP system of the present invention, it has the option of specifying for each detail of the BOM the following information:

a) "Default" or "formula calculation" (if "formula", then the user specifies the formula code to be executed).

b) The materials item code which can be changed by the formula.

c) The quantity of the item, per unit of output (this value can also be changed by the formula).

In each of the modules in which BOM processing occurs, Estimating and Standards, MRP, and Work Order Control, the MRP system of the present invention performs the following:

a) Sets up the parameter table.

b) Default calculation or formula calculation as requested by the user.

c) Moves selected fields back to the appropriate record (i.e., cost detail, MRP detail, or Work Order Detail) from the parameter table).

Figure 2:
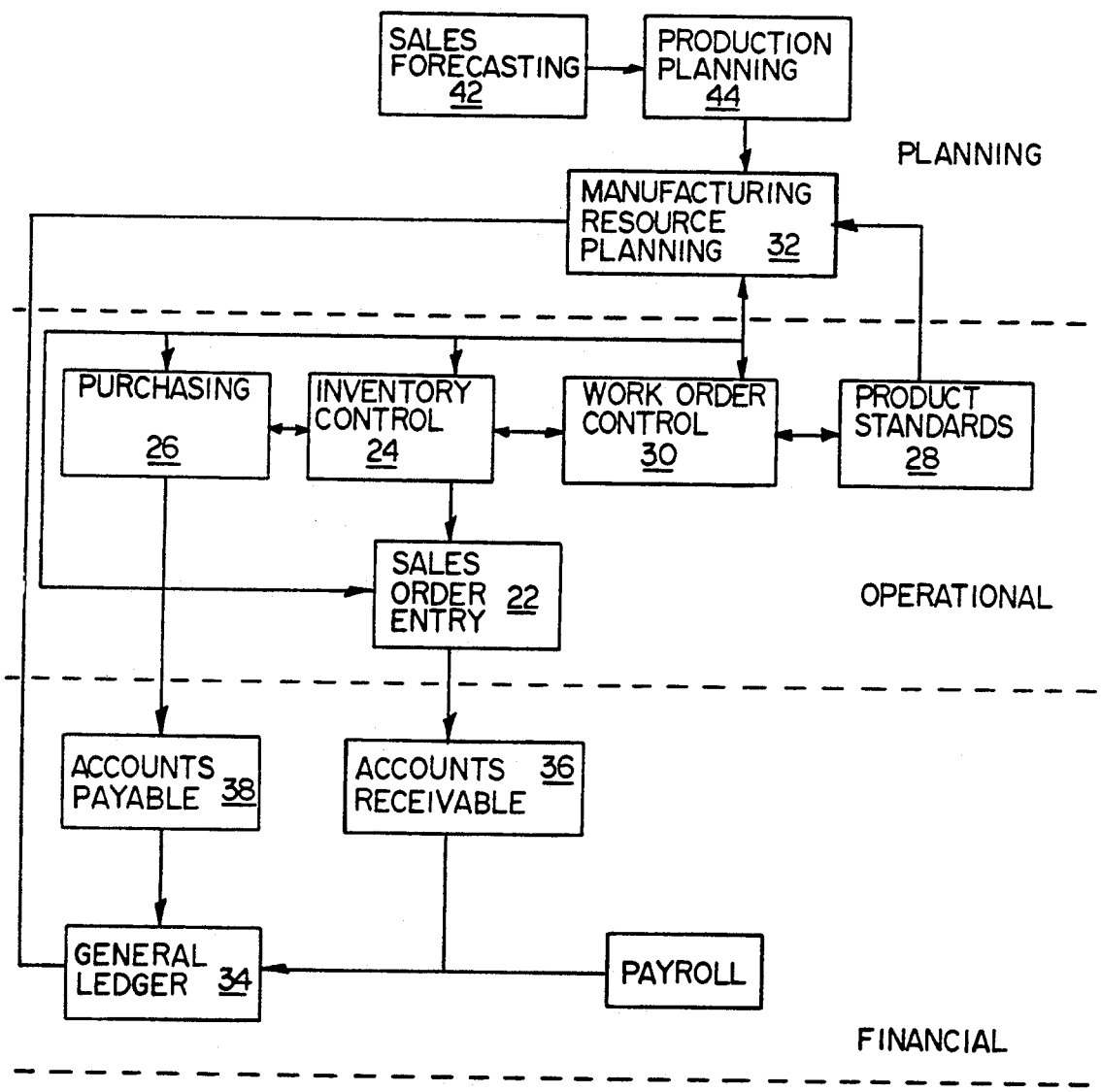
FIG. 2 is a generalized flow chart illustrating the relationship between the program modules of the present invention.

FIG. 2 illustrates the overall relationship between the modules which comprise the MRP system of the present invention. The modules are Sales Order Entry 22, Inventory Control 24, Purchasing 26, Estimating and Standards 28, Work Order Control 30 and MRP 32 and are described briefly below. The six modules are written in COBOL and, in the preferred embodiment, interface with a General Ledger 34, Accounts Receivable 36, Accounts Payable 38, and Payroll 40 system available from SouthWare Innovations, Inc., Auburn, Ala.

1. Sales Order Entry Module

The Sales Order Entry Module 22 allows the user to enter sales orders, ship stock against those orders, and produce invoices for shipped orders. It also has the capability to produce after-the-fact invoices. During order entry, credit checking is performed and a Sales Acknowledgement may be printed. The Sales Order Entry Module 22 has the capability to assign orders to truck loads based on user-defined load capacity calculations (e.g., cubic feet, square feet, weight, etc) . Orders may be entered for items which are shipped from stock, drop shipped by a vendor, or customer manufactured items. They may be for items which are tracked by serial number, lots, or items with options. The Sales Order Entry Module 22 also includes customer invoicing. Invoices may be produced for items which have been shipped or for jobs which were entered into the Work Order Control Module. The Sales Order Entry Module 22 interfaces with the Inventory Control 24, Purchasing 26, Work Order Control 30, MRP 32, Accounts Receivable 36 and General Ledger 34 modules.

2. Inventory Control Module

The Inventory Control Module 24 allows the user to track finished goods and/or raw material inventory. The Inventory Control Module 24 supports multiple warehouse locations. Items in inventory may be divided into categories which is useful in sales analysis. Furthermore, the user can specify that items in a category may have up to six (6) different options. Each of these options may have user-defined description and editing characteristics. The Inventory Control Module 24 maintains an inventory balance for each item or item/option combination. It relieves inventory during invoicing and issuing materials to work orders. It handles purchase orders, receipts, physical inventory counts, and adjustments. Items may be tracked in inventory by serial number or lot number. The Inventory Control Module 24 also includes three types of inventory commitment and reorder techniques. Items may be committed to a sales order or a stock level, custom, or net requirements basis.

3. Purchasing Module

The Purchasing Module 26 aids the user in issuing purchase orders as well as monitoring receipts. The Purchasing Module 26 first produces a recommended purchase list. It automatically prints the purchase order, if desired, and monitors open purchase orders until they are received. The cost of purchased items may be entered at a later date. The Purchasing Module 26 interfaces with the Accounts Payable 38, Inventory Control 24, Sales Order Entry 22, MRP 32 and Work Order Control 30 modules.

4. Estimating and Product Standards Module

The Estimating and Product Standards Module 28 allows the user to estimate the cost of a "one time" job or to establish standards for products which are manufactured on a repetitive basis. The Estimating and Product Standards Module 28 defines the labor, material, outside services and other direct costs used to build a product. This module also allows the user to define standard operations which may be used across several products or jobs but which have independent standards. The Estimating and Product Standards Module 28 allows the user to define flexible, formula based Product Standards. Both usage and direct costs may be values which the user specifies as part of the Product Standards or they may be calculated by user-defined formulas. The Estimating and Product Standards Module 28 optionally calculates manufacturing and general and administrative overhead costs. It may also be used to estimate a selling price based on up to four (4) user-defined pricing methods formulas for each of four different production quantities.

5. Work Order Control Module

The Work Order Control Module 30 allows the user to enter work orders into the system and to track them until they are completed. An order may be based on a Product Standards, an estimate, or may be a "one time" order. The user also may select shop scheduling. This module supports either a plant or department level calendar and allows the user to specify machine and employee capacity by work center. Work orders may be scheduled using either forward or backward scheduling. It produces a wide variety of production documents and lists, including production pickets and a material list. The Work Order Control Module 30 tracks work through the plant. Actual labor and material usage may be reported, or it may be taken as standard. The Work Order Control Module 30 tracks direct costs, manufacturing overhead costs as well as general and administrative overhead costs. It includes reports and inquiry screens which compare the actual cost to the standard or estimated costs.

6. MRP Module

The MRP Module 32 allows the user to forecast material and capacity requirements necessary to meet the Sales and Production Plan during each of the periods in the planning horizon. It produces an Exception Report which identifies resource shortages with respect to the current production schedule. It also produces a planned Purchase Order list and Planned Work Order List which represent the order requirements for the current plan. The MRP Module 32 interfaces with the Work Order Control 30, Estimating and Standards 28, Inventory Control 24, and Purchasing 26 modules. It may also be adapted to interface with optional Sales Forecasting 42 and Production Planning 44 modules.

As best seen in FIG. 3, a schematic diagram representing the data structure in a computer system implementing the present invention is shown. The primary files, discussed in more detail later, are each accessible by two or more of the modules of the present invention. Each of the primary files are accessible by the MRP Module 32 which integrates the contents of the primary files and selected secondary files (not shown).

Figure 4:
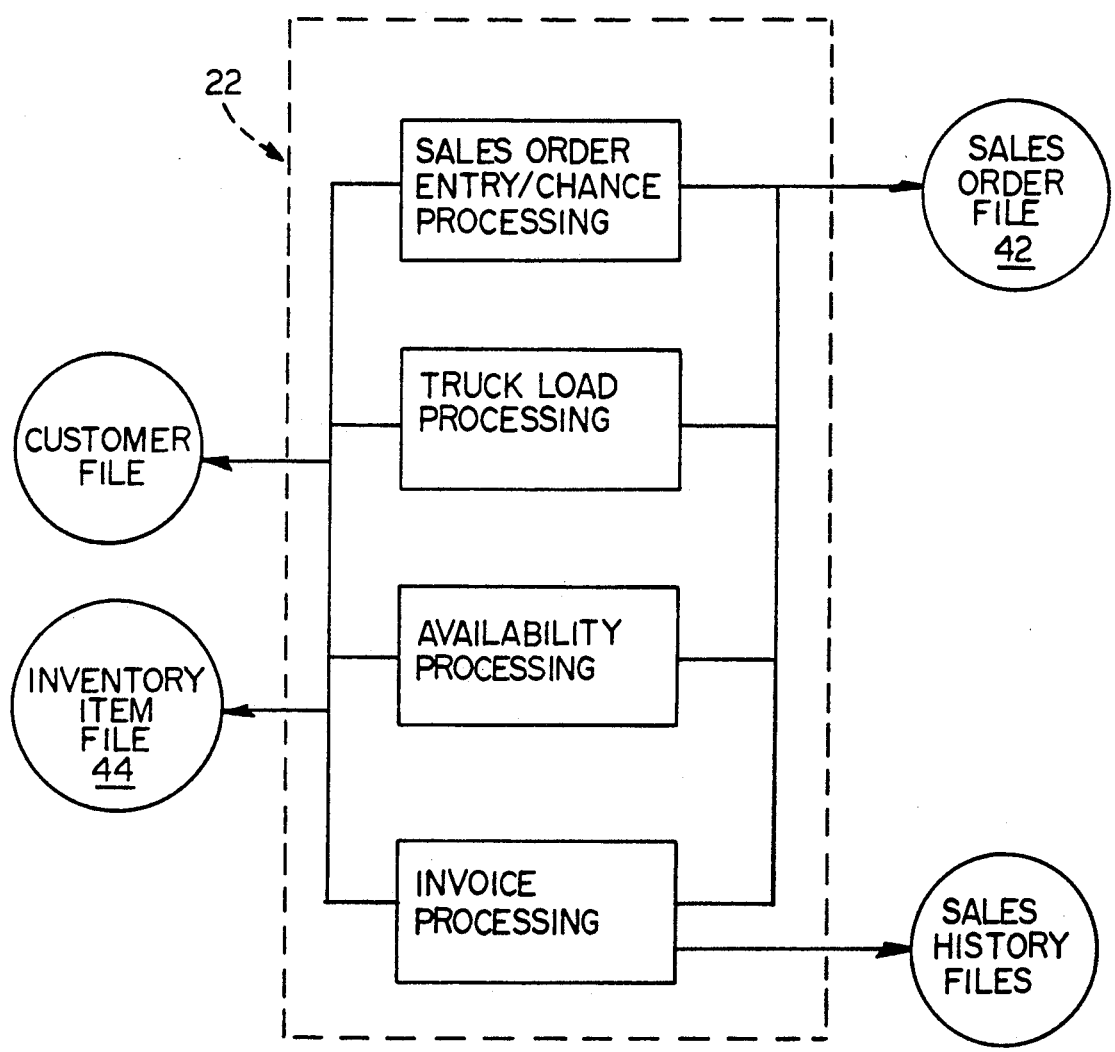
FIG. 4 is a generalized flow chart illustrating the sequence of operations performed by the machine for the sales order entry module.

Turning now to FIG. 4, the details of the Sales Order Entry Module 22 are illustrated. The primary file used by the Sale Order Entry Module 22 is Sales Order File 42. In the preferred embodiment, the Sales Order Entry Module 22 offers the user two alternatives for processing sales orders. "One step" invoicing is the simplest and involves the direct entry or orders for invoicing. The other alternative, "two-step" processing, allows the user to enter orders, print acknowledgements, generate production and/or shipping documents, then produce invoices. Both alternatives may be used concurrently.

The user may produce a variety of different kinds of orders, including drop shipments, transfer orders from one warehouse to another, credit memos and billing adjustments. During sales order entry, the user may search for a customer by the customer number, index lookup, or alphanumeric (customer name) search. Additionally, the user may add a new customer during order entry without having to exit the program and return to a menu.

The user also may assign multiple ship-to addresses to each customer. When entering orders, the user may select the same ship-to as the billing address, or enter the code for one of the alternate ship-to addresses for the customer. The user also may use up to six user-defined options for each item. Use of the valid option checking feature insures that an acceptable value will be entered for each option at order entry. The Sales Order Entry Module 22 checks stock availability during order entry. If stock is not available, the user will have the option of shipping available stock, creating a back order, cancelling the order line, or entering a substitute item.

Shipping dates may be assigned by order header or by detail line, allowing the user to use different shipping dates for each line on an order. The user may use comments on documents produced by the system, including sales orders, purchase orders, bills of lading, production documents, and invoices. The user also may specify whether the comment is for internal use, or the user may set up standard, or recurring comments to reduce data entry.

The Sales Order Entry Module 22 includes an automatic credit checking feature which allows the user to assign a credit limit and credit expiration date for each customer. During order entry, the Sales Entry Order Module 22 checks credit availability for the customer and places a credit hold on the order if sufficient credit is not available. The user may take advantage of the Truck Load processing feature if the user deliver orders on company trucks, ship in complete truck loads, or need to group orders together for processing.

The Sales Order Entry Module 22 offers an easy to use order inquiry program which is designed for use by customer service representatives who take telephone inquiries from customers. The inquiry offers several alternative ways to locate an order and shows up to date information at several levels of detail.

An UPS processing feature automatically calculates UPS charges, adds them to the order, and prints the UPS manifest. It can handle air shipments as well as COD and other special charges. Packing tickets may be generated by bin location to facilitate selection of stock for shipment.

Sales commission calculations may be either default or formula based calculations based on commission rates for each customer, order shipping address, order or item. In addition, the system handles multi-salesman commission splitting for up to a four way split.

The Sales Order Entry Module 22 allows the user to set up a cross reference table for entering orders using the manufacturing operation customer's items numbers, categories, and descriptions. The customer-defined information will be printed on documents produced for the customer, while the standard item number and description are printed on documents for internal use. This cross reference table also allows the user to establish special pricing for this customer.

The Sales Order Entry Module 22 allows for the use of royalty calculations with user-defined formulas. Item pricing and/or discounting may be handled using formulas, tables, or item pricing. The customer type determines how pricing will be applied for each customer, allowing the user to use different methods for different customers.

Figure 5:
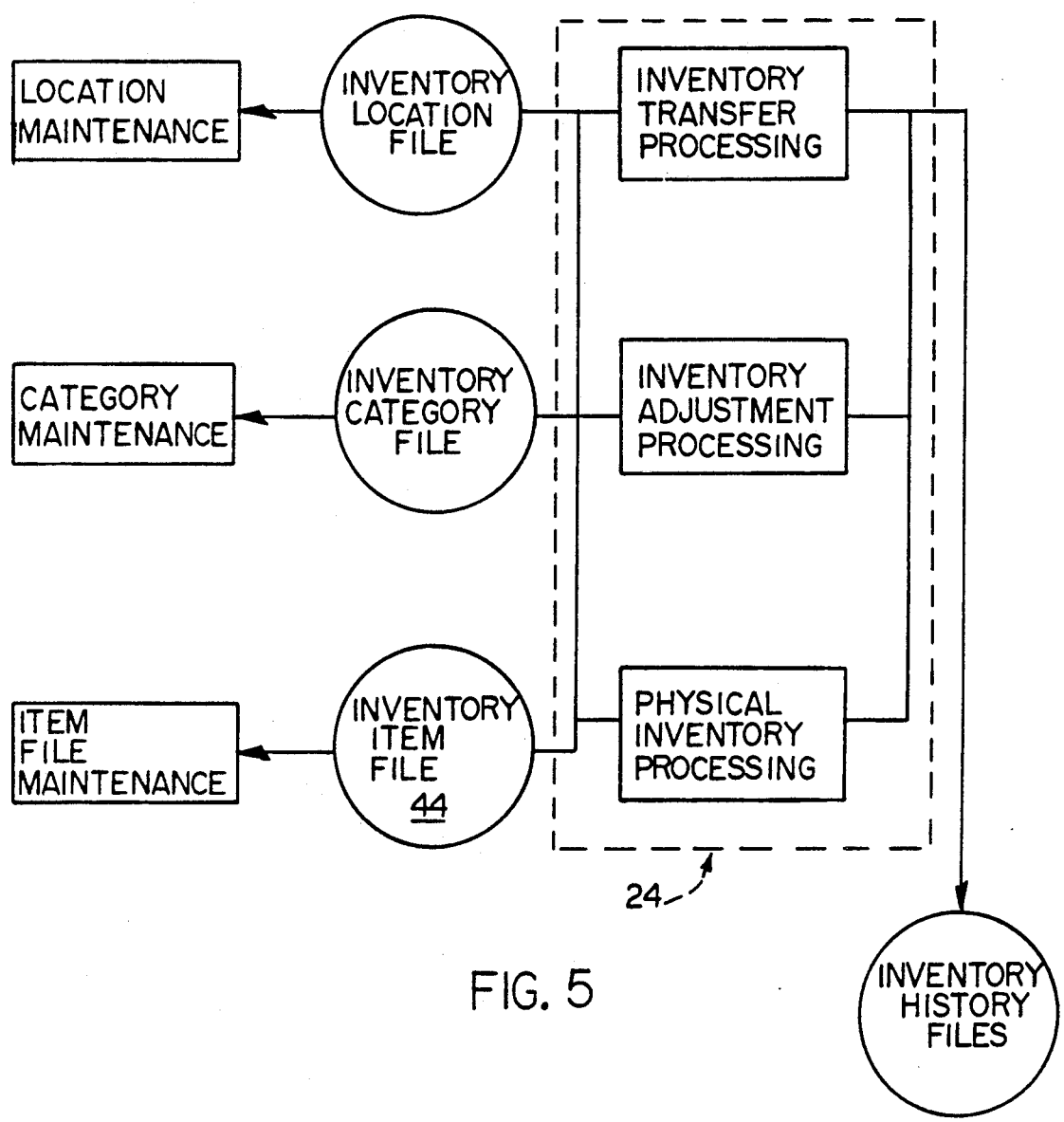
FIG. 5 is a generalized flow chart illustrating the sequence of operations performed by the machine for the inventory control module.

Turning now to FIG. 5, the Inventory Control Module 24 is shown. The Inventory Control Module 24 allows the user to maintain inventory records for multiple warehouses or locations. If the same item is found in more than one location, the system maintains information separately for each physical location. The Inventory Control Module 24 allows the user to maintain records concurrently for a variety of different items types, including:

a) Serial Items—items for which it is necessary to maintain a serial number identification for each occurrence in inventory.

b) Lot or Bin—Items which require identification by lot grouping or bin placement within a physical location.

c) Option—Items which have assigned options such as color or size. The MRP system of the present invention has the ability to maintain up to six different options for each category of items.

d) Regular—Items for which none of the above conditions apply.

The Inventory Control Module 24 has several features to facilitate the processing of a physical inventory.

For recording physical counts, the Inventory Control Module 24 prints work sheets by location and in a variety of sequences. To ease entry of counted figures, the Inventory Control Module 24 prompts the operator for each entry in the same sequence that the work sheet was printed. Before updating the inventory quantities, the Inventory Control Module 24 operates a comparison printout of the old and new figures. Discrepancies may be checked and corrected before updating the physical count results.

Inventory adjustments are made by the Inventory Control Module 24 in a three-step process which insures an audit trail of all entries. The first step is the entry of inventory adjustments. The second step is the printing of an edit list or entry register. After verification, and corrections if necessary, the adjustments are posted, completing the process. The Inventory Control Module 24 has inquiry capability tailored to the item, and providing up to date information at several levels of detail.

The Inventory Item File 44 utilized by the Inventory Control Module 24 includes raw materials as well as finished products, eliminating the need to maintain separate files. The Inventory Item File 44 contains three different costs for each item: standard cost, last cost and average cost. The last cost and average cost values are automatically updated by the Inventory Control Module 24 each time the item is received into inventory. Inventory costing may be based on any of these three costs.

The Inventory Control Module 24 allows Item pricing based on one of five different price levels maintained in the item file. The system offers several calculation programs to automatically recalculate item pricing. Information about item acquisition is maintained through the Item Source file. There are several different source types, including Vendor for purchased items, Plant for manufactured items, and Locations for items received through an inventory transfer. Multiple sources and source types may be maintained for each inventory item.

Figure 6:
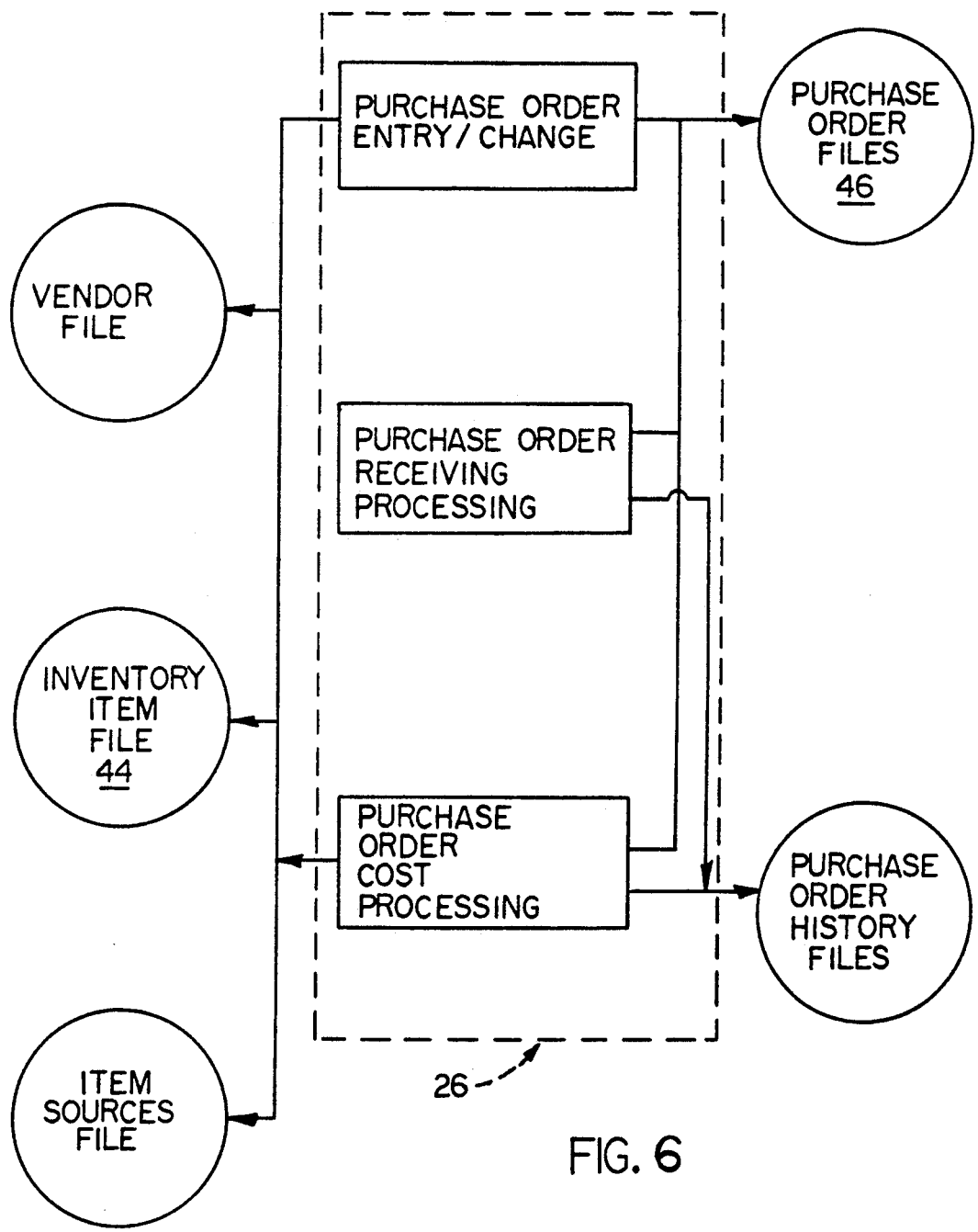
FIG. 6 is a generalized flow chart illustrating the sequence of operations performed by the machine for the purchasing module.

As best seen in FIG. 6, the Purchasing Module 26 aids the user in issuing purchase orders as well as monitoring receipts. The primary file used by the Purchasing Module 26 is the Purchase Order File 46. The Purchasing Module 26 first produces a recommended purchase list. It automatically prints the purchase order, if desired, and monitors open purchase orders until they are received. The cost of purchased items may be entered at a later date. The Purchasing Module 26 interfaces with the Accounts Payable 38, Inventory Control 24, Sales Order Entry 22, MRP 32 and Work Order Control 30 modules.

Figure 7:
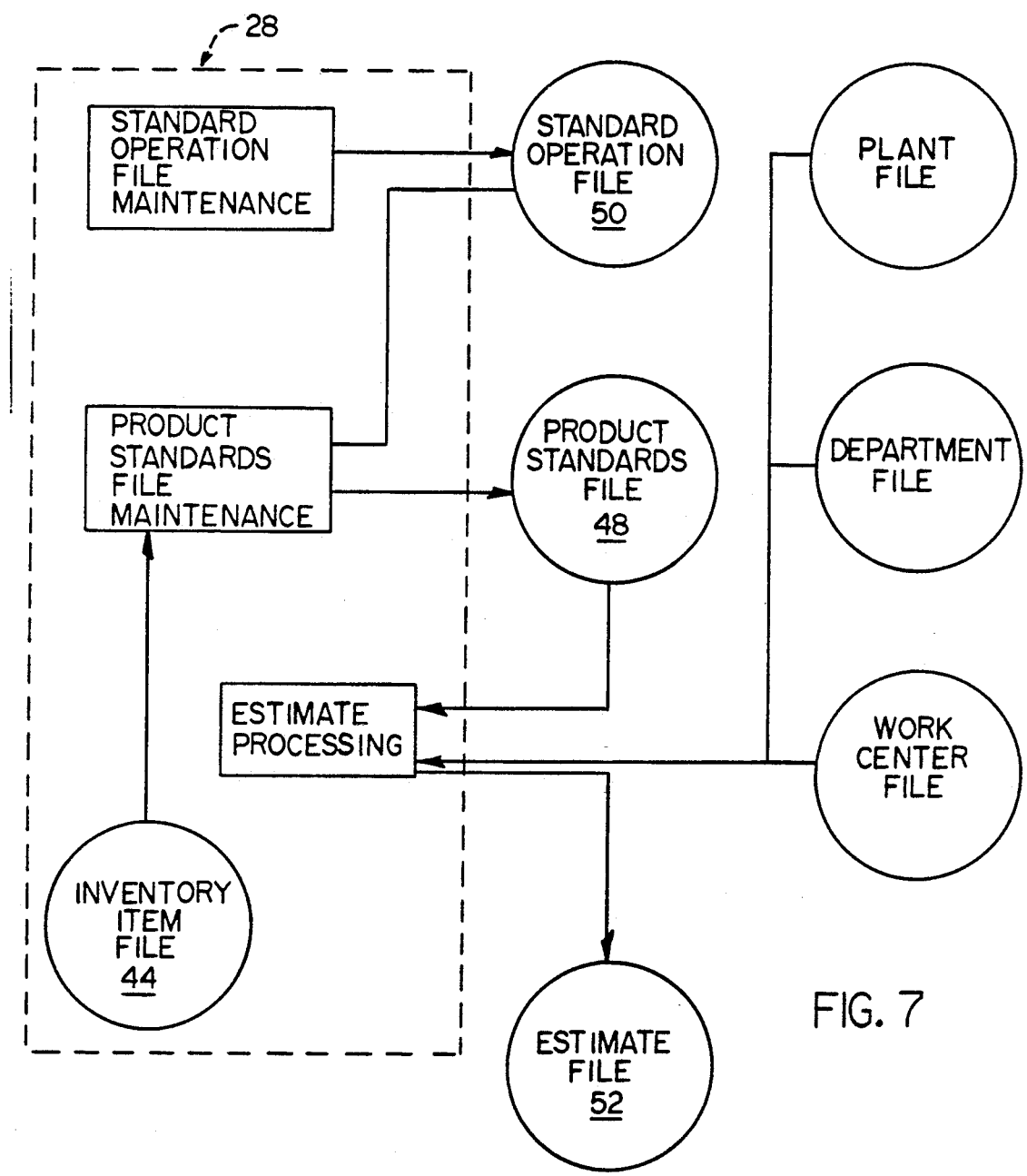
FIG. 7 is a generalized flow chart illustrating the sequence of operations performed by the machine for the estimating and standards module.

Turning now to FIG. 7, the Estimating and Product Standards Module 28 is illustrated. The primary file used by the Estimating and Product Standards Module 28 is the Product Standards File 48. This file is similar to a traditional BOM, in that it specifies the exact components of production required to make a product. These components of production may include Materials, Labor, Outside services, and up to seven user-defined Other costs. However unlike the prior art, the Estimating and Product Standards Module 28 also has the ability to use either default methods or formulas for calculating Quantities, Costs, Lead Times, and Overhead. Formulas may be entirely user-defined and may consider any of up to 150 variables from the files used by the Estimating and Product Standards Module 28.

The Product Standards records used for MRP planning also may easily be copied into either estimates or work orders. From an estimate, costing, pricing, and inventory requirements are calculated. From a work order, inventory is reduced, production documents are generated, and actual costs are charged as they are incurred. Overhead costs may be considered in estimate calculation using any of a variety of user-defined alternatives, including formulas. The user also may maintain estimates for regular production items as well as special or custom items, and multiple estimates may be maintained for each item.

Another important file maintained through the Estimating and Product Standards Module 28 is the Standard Operations File 50. The Standard Operations File 50 includes procedures, labor operations, miscellaneous cost items, or comments which are recurring and may be required for multiple products or items that the user want to build. Each Standard Operations item may be used several times in building a product, and/or it may be used in building many different products. The Standard Operations File 50 allows the user to make changes to the Standard Operations record to update all the different Product Standards which use the operation.

The Estimating and Product Standards Module 28 allows estimates to be easily changed, calculated, or copied. This gives the user the ability to easily examine the impact of changes in the various components of production required to make a product. Each estimate may include pricing for up to four different manufacturing quantities, allowing the user to examine the efficiencies achieved with different volumes.

Figure 8:
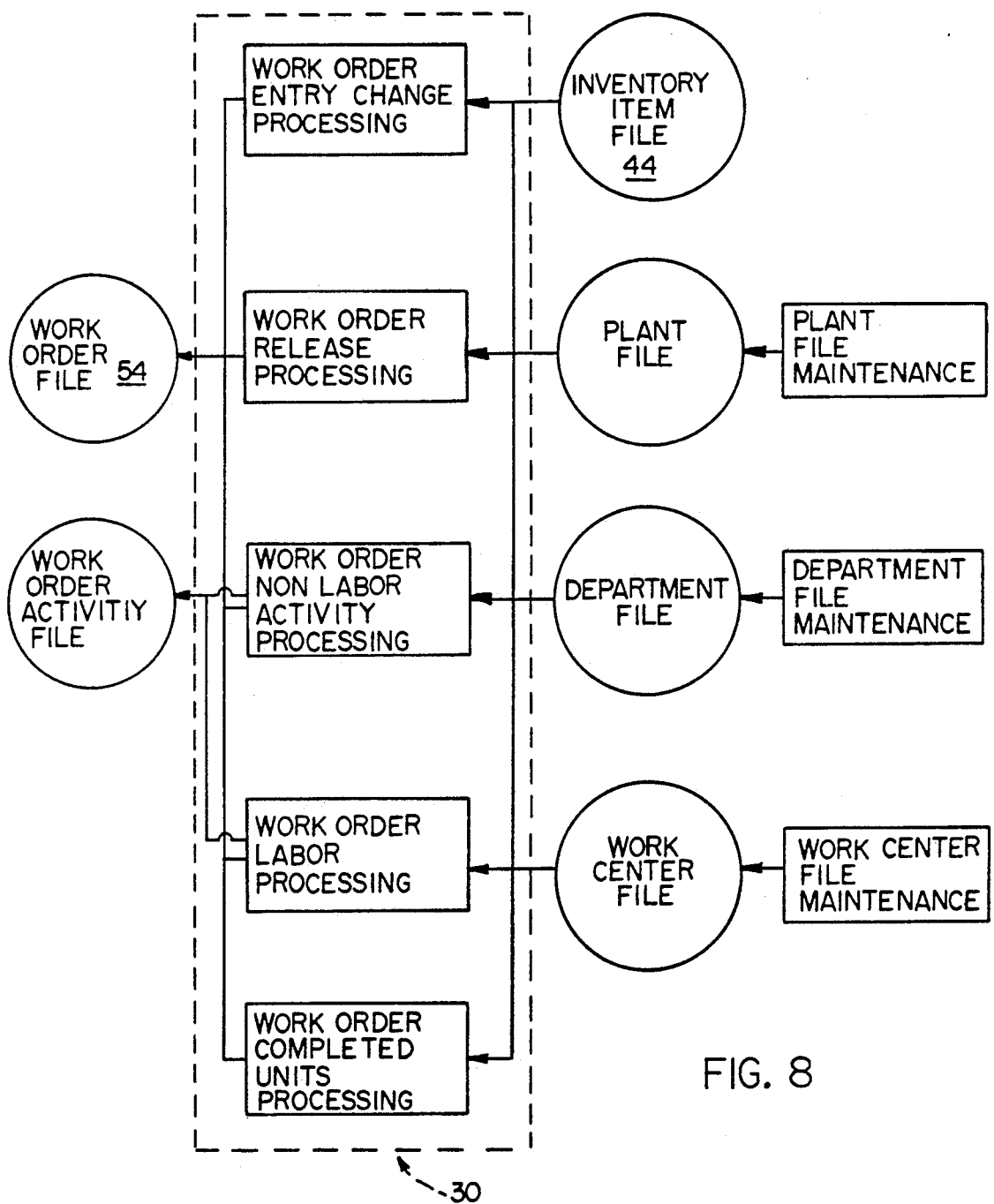
FIG. 8 is a generalized flow chart illustrating the sequence of operations performed by the machine for the work order control module.

As best seen in FIG. 8, the Work Order Control Module 30 is illustrated. The primary file used by the Work Order Control Module 30 is the Work Order File 54.

Work orders are generated as part of a three-step process in which they are entered, edited and posted. Each Work Order record consists of a header and one or more detail lines. The Work Order detail lines are identical in structure to the Product Standards detail records. When creating work orders, the user has the option of duplicating the Product Standards records as Work Order detail lines. Changes can then be made to the Work Order detail lines without affecting the Product Standards record.

The Work Order Control Module 30 allows the user to establish default overhead and labor rates by plant, department, or work center. The setting of the manufacturing operation control record determines in which of these files the default rates will be established, insuring the user the most meaningful default values. The default rates may be overridden for specific work orders during work order processing.

The Work Order Control Module 30 also allows the creation of a customized calendar which is used for production scheduling. The manufacturing operation control record determines whether the calendar is to be established by plant or by department. The calendar specifies standards work days and hours, as well as exceptions such as holidays. The Work Order Control Module 30 allows the use of up to 9 reporting stations within each plant. Reporting stations are sequential checkpoints at which manufacturing progress is reported to the system.

Quantities of labor, materials, and other items used in the manufacturing process may be reported to the MRP system of the present invention at actual or standard usage. If reporting is to be done at actual, then the quantities must be monitored and entered. If reporting is to be done at standard, then the standard quantity will always be used for relieving inventory and calculating costs. Each work order may have some items which are reported at standard and some reported at actual, or all items on a work order may be reported at either standard or actual.

For each Work Order detail line, the Work Order Control Module 30 maintains both estimated and actual quantities and costs. Estimated amounts are calculated from the Work Order detail lines when the work order is posted, and these figures are used for committing inventory and scheduling. Actual amounts are calculated after reporting occurs for the Work Order detail line regardless of whether reporting is done at actual or standard. The Work Order Control Module 30 maintains both figures for comparison.

The Work Order Control Module 30 has the capability of generating work orders from sales orders using the Auto Entry option. In addition to reducing the amount of data entry required to generate a work order, this links the work order record with the sales order for which it was generated.

All quantity and cost calculations performed by the Work Order Control Module 30 may be based on the default or the formula method. In most situations, the default method is adequate, but the formula method provides a very powerful tool in complex situations where many factors must be considered.

The Work Order Control Module 30 tracks and places into inventory, defective items which are generated as part of the manufacturing process.

Work Order inquiries show Work Order header and detail information, including status, estimated costs, and estimated quantities in a similar manner as shown in Table 2. Work Order inquiry also displays up to date actual costs and quantities which have been posted.

As discussed above, the MRP Module 32 allows the user to forecast material and capacity requirements necessary to meet the Sales and Production Plan during each of the periods in the planning horizon. It produces an Exception Report which identifies resource shortages with respect to the current production schedule. It also produces a planned Purchase Order list and Planned Work Order List which represent the order requirements for the current plan.

MRP planning may be performed in either of two modes: net change or regenerative. Net change is the process of determining the change in material and capacity requirements which results from changes in demand, supply, and on hand balances which have occurred since the last time the MRP system was updated.

In regenerative MRP planning the MRP detail files are first deleted and then rebuilt from existing sales orders, purchase orders and work orders. The MRP records contain the quantity of demand for each sales order and work order detail record or the quantity of supply for each purchase order or work order header record. The MRP records are stored by Inventory Item number in date and time due sequence. Each Inventory Item record which contains either supply or demand is automatically flagged for MRP planning.

Figure 9:
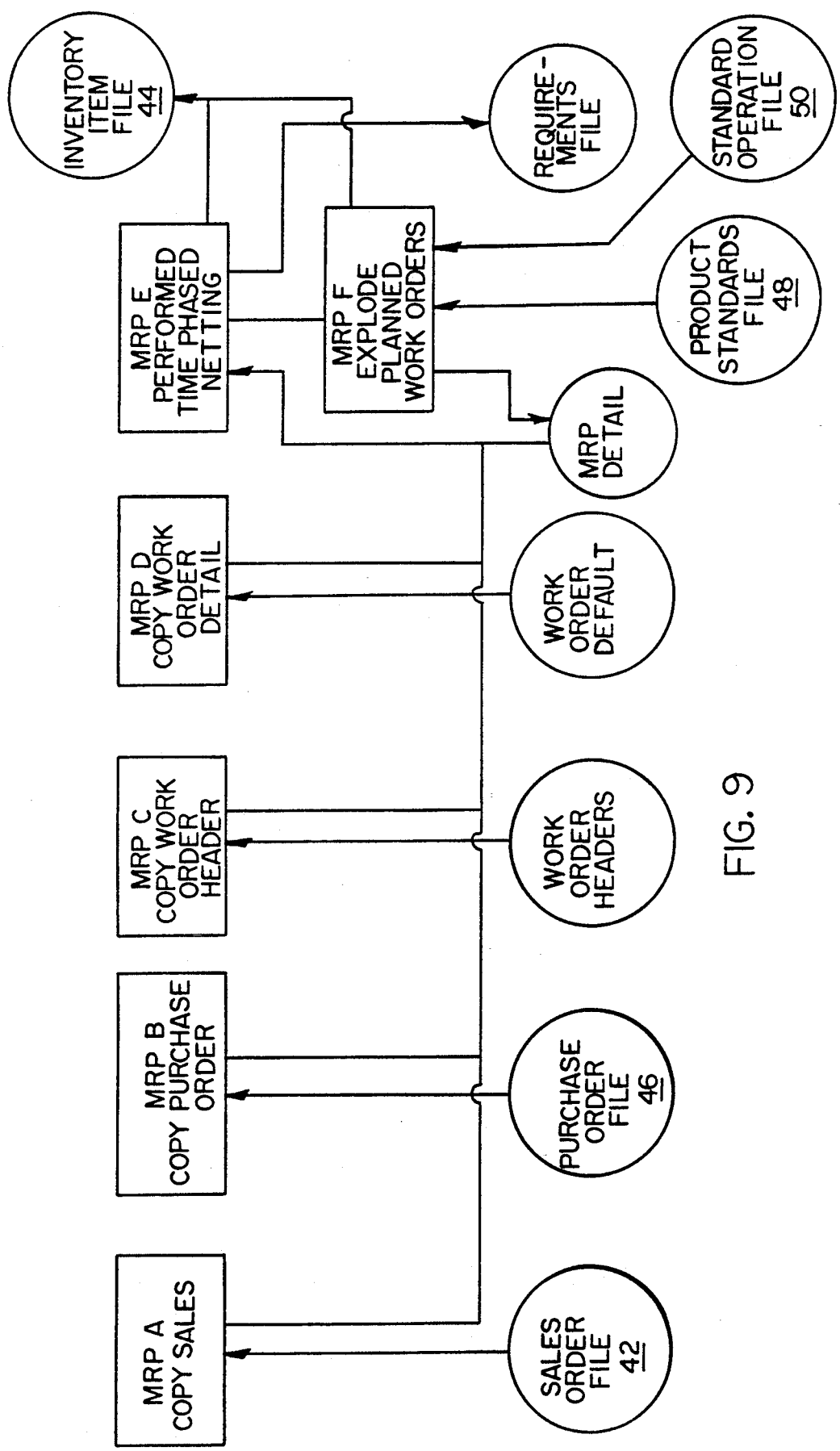
FIG. 9 is a generalized flow chart illustrating the sequence of operations performed by the machine for the MRP module.

As best seen in FIG. 9, the regenerative MRP planning operation is illustrated. The MRPA, MRPB, MRPC, and MRPD blocks perform the copying functions, as discussed above, to rebuild the MRP records.

Then the MRPE block performs the time phased netting operation. Each record in the Inventory Item File 44 is processed until a complete pass is made through the Inventory Item File 44 without detecting a flagged item. Each flagged record in the Inventory Item File 44 is processed with its corresponding MRP record in date and time sequence. For each MRP record a new balance is first calculated. If the value of the new balance is less than the value of an user-defined safety margin value for that particular item, then a new record is written to the Requirements File that indicates that a purchase order for purchased items or a work order for manufactured items is to be issued or changed.

When a work order is to be issued or changed, the MRPF block explodes the requirement for the item, according to the definition in the Product Standards File 48, and writes it to the MRP detail file. The same default or user-defined calculations as used by the Estimating and Product Standards Module 28 and the Work Order Control Module 30. As additional requirements for items are written into the MRP detail file, the corresponding Inventory Item record is flagged.

As can be understood from the above discussion, the MRP system of the present invention allows the user to control the calculations utilized by the system. Thus, the user may select either default or user-defined formula calculations for each of the following:

(1) Customer Pricing;
(2) Customer Discounts;
(3) Truck Capacities;
(4) Salesmen Commissions;
(5) Designer Royalties; and
(6) Product Standards/Estimate/Work Order/MRP detail quantity and cost calculations.

The formulas operate on the "universe" of information which is stored in a parameter table which is unique for each of the above. For example, the parameter table for Customer Pricing contains Customer Type, Customer Sold To, Customer Ship To, and Salesman information. However it does not contain information about components of production. On the other hand, the parameter table for calculating Estimate details does not contain Customer information. For each of the above, both the default and formula calculations are performed utilizing the information in its associated parameter table.

The instruction set for the user-defined formulas for each of the above are identical. The instructions are stack-oriented and utilize "reverse Polish" notation. The formula instruction set allows a degree of user programming and includes "If", "Then", "Else", and "Perform" operations.

For the purpose of illustrating its operation, the use of formulas in the Estimating and Product Standards Module 28 will be discussed in more detail, however, this discussion is equally applicable to any module employing the formula function such as listed above.

Figure 10:
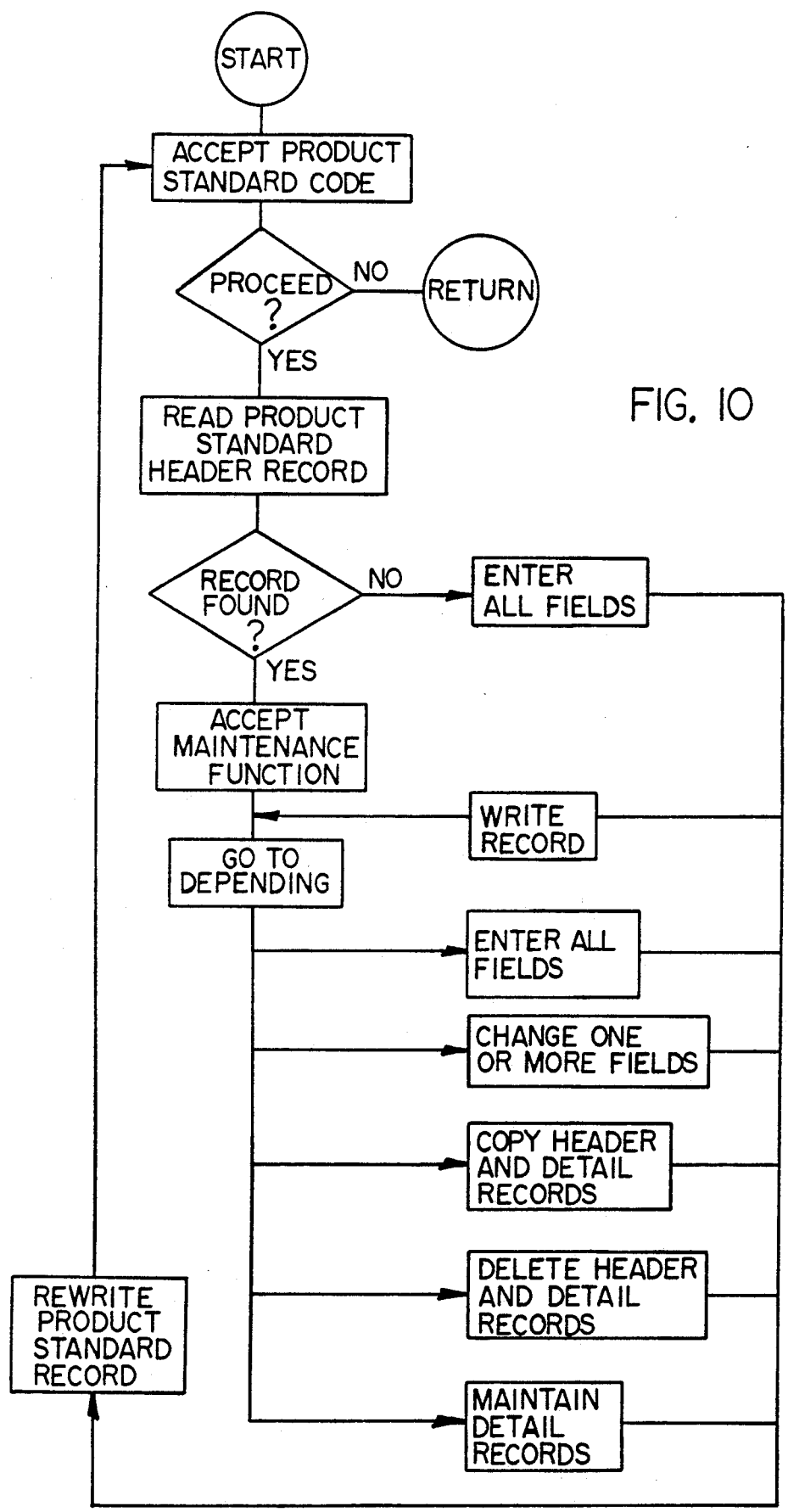
FIG. 10 is a detailed flow chart illustrating the process of Product Standards Entry/Change shown in FIG. 7.

Turning now to FIG. 10, a detailed flow chart illustrating the process of Product Standards Entry/Change, shown in FIG. 7, is shown. A discussion of its operation follows:

Product Standards File Maintenance

The Product Standards File 48 of the MRP system of the present invention are similar to traditional BOM records, in that they specify the exact production components that are used to build a product. Product Standards records are the basis for standard cost calculations, production scheduling and capacity planning, material requirements planning, and generating production documents. Within the Estimating and Product Standards Module 28, the Product Standards records may be used to process estimates. On the other hand, in the Work Order Control Module 30, the Product Standards records are generally the basis of work orders.

There are several different types of production components that may be specified by the Product Standards File 48. The manufacturing operation control record indicates which ones are used by the manufacturing operation. Each Product Standards record consists of two components, a Product Standards header and the Product Standards detail records. Each Product Standards record may contain multiple detail records.

The header screen appears as shown below:

TABLE 1

| Standard Header File Maint | TIME 15:54 TERM 8 |
|---|---|
| *1. Product Stnd Code | ———— |
| 2. Description 1 | ———— |
| 3. Description 2 | ———— |
| 4. Description 3 | ———— |
| 5. Scrap Factor | ———— |
| 6. Lead Time | ———— |

Entering a New Product Standards Record

1. Product Standards Code

The user may enter any alphanumeric code, up to 20 characters in length. This code will be used to identify the Product Standards record throughout the system. If this Product Standards record is for a regular production item, the user may want to enter the item code for ease of reference.

2-4. Description

The user may enter three 30 character lines of descriptive information about each Product Standards record.

5. SCRAP FACTOR

If the manufacture of the product normally results in some known percentage of defective product, then that percentage can be entered under "Scrap Factor". The Estimating and Product Standards Module 28 will then use this figure when calculating production quantities to insure that enough good product is manufactured to meet requirements.

6. Lead Time

This figure may be used for scheduling. When requirements are entered for delivery on a specific date, the system uses this lead time to calculate when the work order should be issued in order to meet the required delivery date. Enter the lead time, in plant hours. If no lead time is entered, the system will use the default lead time from the work order control parameters.

At the conclusion of this screen, the message 'Enter line to change' will appear. The user should enter an 'M' to maintain Product Standards detail lines.

Entering Product Standards Records Detail Lines

After the user have entered an 'M' to maintain detail from the Product Standards header screen, the following screen will appear:

TABLE 2

| Product Standards Detail File Maint | TIME 15:57 TERM 8 |
|---|---|
| *1. Product Stnd Code | ———— |
| 2. Description 1 | ———— |

TABLE 2-continued

| Product Standards Detail File Maint | TIME 15:57 TERM 8 |
|---|---|
| *1. Line Number | —— ———— |
| 2. Op Type | —— |
| 3. Labor Code/Item | ———— ———— |
| 4. Operation/Category | ———— |
| 5. Description | ———————— |
| 6. Rpt Type | —— |
| 7. Qty Calc | —— ———— |
| Standard Calc Parameters: | |
| 9. Setup Time/Scrap | ———————— |
| 10. Frequency | ———— |
| 11. Run Time/Quantity | ———————— |
| 12. Unit of Meas | ———— |
| 13. Rate per Unit | ———————— |
| 14. Pay Type | ———— |
| 15. Move Time | ———————— |
| 16. Queue Time | ———— |
| 17. Percent Overlap | ———— |
| 19. Print on Document #: | —— ———— —— |

The Product Standards code and Description 1 from the Product Standards header are displayed at the top of the screen.

1. Line Number

If the manufacturing operation uses reporting stations, the first digit of the line number is the reporting station associated. When the user have entered a valid reporting station number, the reporting station description will be displayed to the right and the cursor will move one space to the right, on the same line for the user to enter the sequence number portion of the line number.

If the user do not use reporting stations, the line number and the sequence number are the same. If the user are adding records, the system will assign the next sequence number, starting with 10 and incrementing by 10.

If the user wants to insert a record between two existing ones, he enters a number that is between the existing records where this one is to be inserted.

2. Operation Type

Operation types are used to specify the general kind of processing accomplished by this Product Standards detail line. This is somewhat user-defined, as not all types apply to all companies. The types that are available include the following:

'L'abor: A labor operation is one which must be performed at a specific department or work center. Primary concerns for labor operations are production scheduling, capacity planning, and labor costing. The manufacturing operation control record may require that all Labor operations be set up as standard operations.

'M'aterial: Materials operations are raw materials that are consumed in the production process by this operation. Primary concerns for materials operations are inventory reporting, materials requirements planning, and material costing. The manufacturing operation control record may require that all Material lines be items from the item file.

'O'utside services: These are direct costs which are incurred as part of the production process, but do not affect inventory usage, labor costs, planning, scheduling, or capacity. The primary concern of outside service operations is their impact on costing. Outside services may be set up as standard operations.

'C'omments: These are notes or reminders associated with a specific operation. The purpose of most comments is for printing on production documents, and they have no impact on costing or scheduling. Comments may be set up as standard operations.

Other Costs: There may be up to seven user-defined other costs. Each is identified by a number (1-7). Other costs are used for tracking any other type of specific cost that does not fall into one of the types described above. The manufacturing operation control record determines which other costs are used.

The user must enter a valid operation type for each Product Standards detail line.

3. Labor Code/Item

The user's entry for this field depends on the operation type the user entered above.

If the operation type is labor, the user enters a department number and the department name will be displayed. If the manufacturing operation uses work centers, the cursor will move to the right on the same line for the user to enter a work center code. When the user enters a work center code for this detail line the work center description will be displayed on the right.

If the operation type is material, he enters the item code for the material to be used in this detail line. The manufacturing operation control record determines whether or not the user must enter a valid item code from the item file.

If the operation type is comment, other cost, or outside service, this entry is not used unless this Product Standards detail record uses a standard operation. If not used, the user may move to the next field. If this detail record is a Standard Operation, the user enters the labor code that was used for this Standard Operation. The cursor will then move to the description field.

4. Operation/Category

This field is only applicable for Labor or Material operation types.

For a labor item, this field allows the user to specify a Standard Operation. If the user want to use a Standard Operation for this Product Standards detail record, he enters the Standard Operation code here. The manufacturing operation control record may require that the user enter a Standard Operation code for all labor operations.

For a material item, the cursor will skip this field if the user entered a valid item code, and the product category code for this item will be displayed. If the manufacturing operation control record allows the user to enter material lines for materials that are not in your item file, and this is such a line, the user must enter a valid product category code.

5. Description

If this detail line uses a Standard Operation, the description from the Standard Operation record will be displayed as the default. If this detail line uses an item record from the item file, the item description from the item record will be displayed as the default. The user may accept the default or enter a different description.

If one of the cases described above does not apply, a default description will not be displayed and the user may type a description up to 30 characters long.

6. Reporting Type

There are two choices available, though both may not be used by the manufacturing operation. The reporting types are (S)tandard or (A)ctual. If both types are not used by the manufacturing operation, the one that is used will be displayed and the cursor will skip this entry. Reporting type refers to the calculation method that will be used for computing the costs and quantities used in the manufacturing process for the Product Standards.

Standard reporting is used because it requires less data entry at completion time, but it reports standard quantities, which may be less accurate than actual reporting. Standard reporting should be used for reporting items that are inexpensive or not likely to deviate significantly from standard quantities.

Actual reporting is used because it is more accurate than standard reporting, but it requires more data entry at reporting time. The exact quantities that were used in the manufacturing process are reported and used for calculating costs and usages. Actual reporting should be used for items that are expensive or highly variable from standard quantities.

7. Quantity Calculator

This refers to the method used for calculating the quantity required for this operation. There are two choices (D)efault or (F)ormula, though both may not be available for the manufacturing operation. If both alternatives are not used by the manufacturing operation, the method that is used will be displayed and the cursor will skip this entry.

Default calculations are based on the quantities specified in the calculation parameters section of this operation. To use the default method, the user enters an 'D'.

Formula calculations are be based on the results of a formula. To use the formula method, the user enters an 'F'. The cursor will move to the right for the user's to enter the formula code that is to be used. The user must enter a valid formula code.

Product Standards Detail Lines Calculation Parameters

The following fields are displayed under the heading "Calculation Parameters". The manner in which each of these items is used varies according to the operation type. If the user are not already familiar with the structure of system defaults used for these fields, the user should read the 'Note' that appears below. The system offers a multi-level default structure, or 'pecking order' for locating the particular parameter values that are used when performing calculations. At each level in the pecking order, the system attempts to locate a value that is greater than zero. If such a value is located, it will be used for calculations and subsequent levels in the pecking order will not be used. Zero will be used for calculations if, at the end of the pecking order a greater value has not been located.

This pecking order is used on an individual basis for each parameter—one parameter may be found at one level in the pecking order, the next may be at a different level.

At the first level of the pecking order, the system uses parameter values from the estimate or work order detail line. The system will default to the next level in the pecking order for any values not entered on the detail line.

The next level in the pecking order is the Product Standards record, if one was used to create the estimate. The system will default to the Product Standards detail for value(s) not entered in the estimate or work order detail. If the values are not entered in the Product Standards detail, or if a Product Standards record was not used to create the estimate, the system will default to the next level in the pecking order.

If the operation type for this line is Other cost, Comment, or one of the seven user-defined costs, this is the last level in the pecking order unless a Standard Operation was used. If the operation type is Material, the cost, or rate per unit, is the only value for which there is another level in the pecking order. If a value has not been located by the final level in the pecking order for any parameter, a zero will be used when performing calculations.

If the operation type is material, the next, and final level in the pecking order is used only for finding the rate, or cost. If an item (from the item file) was specified for this material line, the system will default to the cost entered in the item record. There are three costs in each item record, last, standard, and average. The manufacturing operation control record determines which will be used. If an item record does not exist for this material line, zero will be used for calculations.

For non-material operation types, the system will default to the Standard Operations record, if one was used. Except for the 'rate' in labor operations, this is the final level in the pecking order. If the estimate or work order detail record does not use a Standard Operation, or if parameter values cannot be located in the Standard Operation record, zero will be used for calculations.

The last item in the pecking order is used only for locating the rate per unit for labor detail lines. The system defaults to the department record, and uses the hourly rate for this pay type. If there is no hourly rate specified in the department record, a zero will be used for calculations.

9. Setup Time/Scrap

If this is a labor operation, setup time refers to the time (in number of hours) required to prepare for the operation to begin. If setup time is applicable to this operation, the user enters the time. If a setup time is not applicable, the user leaves it blank.

If this is a material operation, scrap refers to the number of units that are wasted each time the material operation is performed. If applicable, the user enters the quantity. If scrap is not applicable for this material, the user leaves it blank.

10. Frequency

If this is a labor operation and the user have entered a setup time, the user may use this entry to indicate the rate of occurrence with which the setup must be executed. For example, if this labor operation requires a setup time of 1 hour, and the setup must be executed again after 30 units are produced, then the setup time is 1.0 and the frequency is 30.

If this is a material line and the user have entered a scrap amount, the user may enter a frequency to indicate the rate at which the scrap amount is incurred. For example, if this material results in a scrap of 1 unit for each 30 units that are produced, the user should enter 1 for scrap, and 30 for the frequency.

This entry is generally not used if the user did not enter a setup time, or for operations that are not labor or material. If the user chooses not to use it, he leaves it blank.

11.-12. Run Time/Quantity and Unit of Measure

For labor operations, these fields are dependent on each other. Their use is best illustrated through examples:

Example 1

If the user wants to specify a number of hours per unit of output, he enters the number of hours required to perform this operation for one unit of output, and 'HPP' (hours per piece) as the unit of measure. This method is generally used for operations that take a relatively long time to perform. For an operation that requires one and a half hours to perform, the user should enter 1.5 as the run time and HPP as the unit of measure.

EXAMPLE 2

If the user want to specify a number of units produced per hour, he enters the number of units in run time, and 'PPH' (pieces per hour) as the unit of measure. This method is generally used for operations which take very little time to perform. For an operation that yields 1000 pieces per hour, the user should enter 1000 as the run time, and PPH as the unit of measure.

13. Rate Per Unit

If the user are not already familiar with the way in which the system uses rates and defaults, the user should read the 'Note about parameter defaults' at the beginning of this section.

If this is a labor operation, the rate per unit refers to the standard hourly rate for the department/work center where this operation is performed.

If this is a material operation, the rate per unit refers to the cost for the raw material.

If this is another type of operation, the rate per unit refers to the cost per unit of the operation.

Entries 14-16 apply only to labor operations:

14. Pay Type

If this is a labor line, the user must enter a valid pay type code. This code is used to determine the pay rate for calculating labor costs. It is also used if the user are interfacing to payroll.

15. Move Time

This entry allows the user to indicate the length of time required to move this item from the previous work station to this work station. If entered, this field is important for reporting labor costs incurred by move time, as well as for shop scheduling.

16. Queue Time

This entry allows the user to specify a time for which the product must sit idle at this work station before this operation may begin. If the length of time is significant, this entry is important for its impact on shop scheduling.

17. Percent Overlap

This entry refers to the percentage of completion of this operation at which the next operation may begin. For example, if there is a 40% overlap, then when this operation has been completed on 60% of the items, execution of the next operation may begin. This entry is used primarily for calculating lead times and for shop scheduling.

If not applicable, the user leaves this field blank.

19. Print on Document #

The production documents used by the manufacturing operation are specified in the manufacturing operation control record. The user may use up to nine different documents, and all are user-defined. Each production document is assigned a one-digit number.

When production documents are generated, detail lines are selected for printing based on the print on document flags. For each production document that the user want this Product Standards detail line to print on, he enters the production document number. The system will display the name of the production document, and the cursor will move to the right side of the screen. The user enters a 'Y' or an 'N' depending on whether or not the user wants this operation to print on the document. When the user have selected all the production document flags the user want for this operation, he enters a 0 for the document number, and the cursor will move to the next entry.

After completing the entry of the Product Standards detail line. The cursor will move back to the line number entry for the user to enter another detail line or may be returned to the first screen.

Changing an existing Product Standards record

To modify an existing Product Standards record, the user must first display it on the user's screen. The user may locate the record using pre-defined function keys or the user may enter the Product Standards code.

Once the user have displayed a record on the user's screen, the user may change any of the details on the header screen by entering the number of the line the user want to change and entering a different value. Each field on this screen is described in the preceding pages.

If the user wants to change something on a detail line, the user first displays the Product Standards header, then enter an 'M' to maintain detail. He can then enter the line number of the detail line the user want to change or use a function key to locate the line.

Once the line has been displayed on the user's screen, the user may make changes by entering the number of the field the user want to change, and entering a different value. Each field on the screen is described in the preceding pages.

Deleting an existing Product Standards record

To delete an existing Product Standards record, the user must first display it on the user's screen. The user may locate the record using function keys or the user may enter the Product Standards code and the header will be displayed on the user's screen.

Once the user have displayed the Product Standards header to be deleted, the user may choose option 'D' for delete. Product Standards are not immediately deleted from the file—they are flagged for deletion at a later date. Product Standards records which have been flagged for deletion remain in the file until the 'Purge deleted Product Standards' program has been run. Whenever a Product Standards that has been flagged for deletion is displayed on the user's screen, the word 'DEL' will appear in the top right corner of the user's screen. (See Chapter 4, Periodic Procedures for information about deleting Product Standards records.)

To delete Product Standards detail records, the user should first locate the Product Standards header, then choose option 'M' to maintain lines. Locate the line user want to delete, and choose option 'D' to delete the line. Product Standards detail lines are flagged for deletion in the same manner as Product Standards headers (described above).

Figure 11:
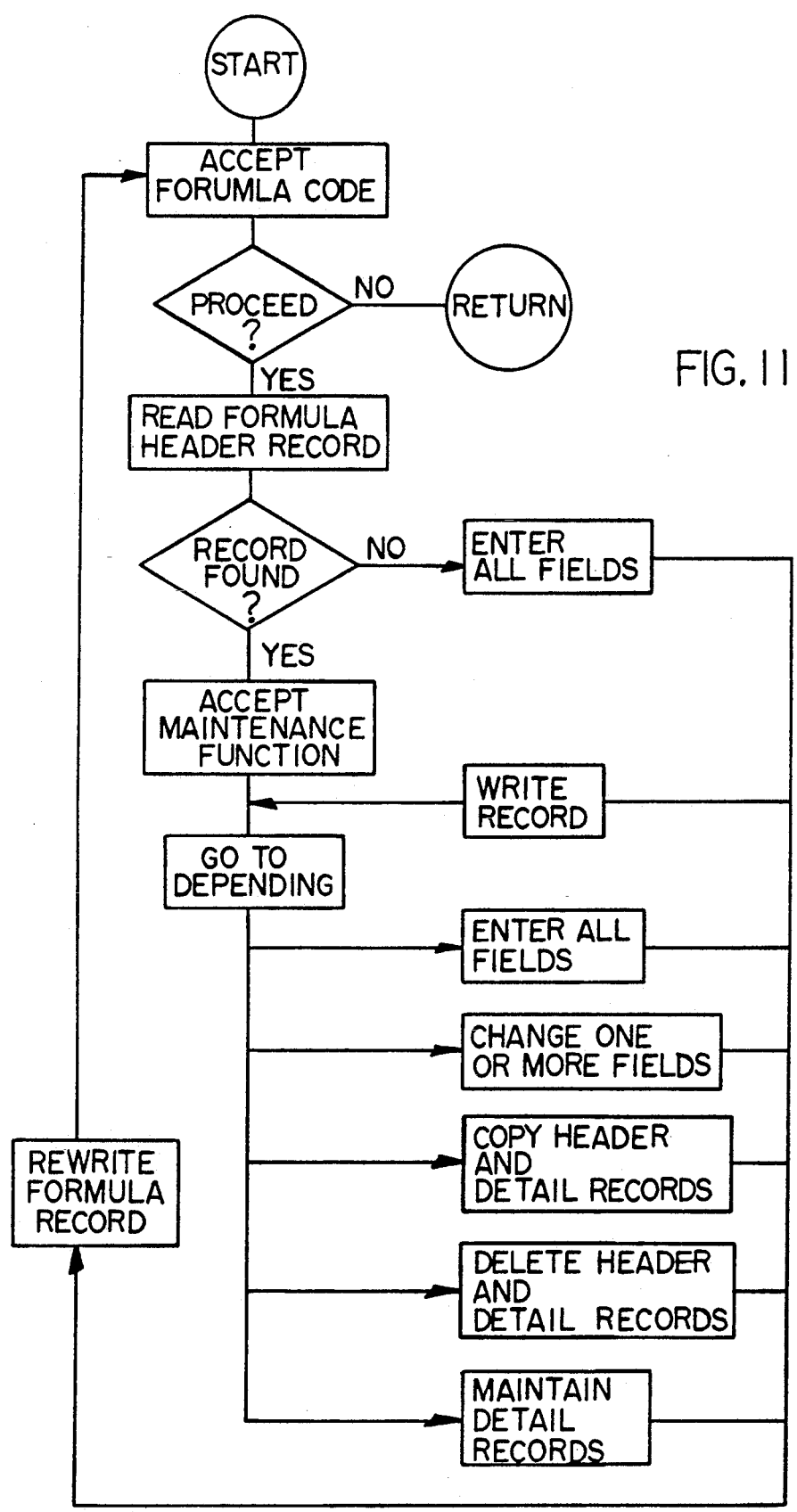
FIG. 11 is a detailed flow chart illustrating the process of Detail Formula Entry/Change shown in FIG. 7.

Turning now to FIG. 11, a detailed flow chart illustrating the process of Detail Formula Entry/Change, shown in FIG. 7, is shown. A discussion of its operation follows:

Estimating and Product Standards Detail Formula Definitions

This option is used to create, change or delete the detail formulas used by the Estimating and Product Standards Module 28. The manufacturing operation control record specifies whether or not detail formulas are used by the manufacturing operation. If they are not used, this option will not appear on the user's menu.

Detail formulas are executed when the calculation type in a Product Standards/estimate/work order detail record specifies a formula name. Detail formulas are used to calculate quantities, costs, overhead, and lead times for estimates, work orders or MRP.

Several types of formulas are used throughout the MRP system of the present invention. All formulas use the same logic and operations, and all formulas are set up and maintained in the same manner. Depending on the module in which the formulas are used, however, different parameter tables apply. Therefore, when setting up or maintaining formulas, be sure to use the parameter table listing for that type of formula.

When selecting this option, the following screen will be displayed:

TABLE 3

| Detail Cost Formula File Maint | TIME 10:50 TERM 3 |
|---|---|
| 1. Formula Code | ——— |
| 2. Description 1 | ——————— |
| 3. Description 2 | ——————— |
| 4. Description 3 | ——————— |
| 5. Trace Flag | — |

1. Formula Code

Enter a code (up to six alphanumeric characters) to identify this formula. If the user enter an existing formula code, the values will be displayed for the user to edit or delete. If the user are establishing a new formula, the user should enter an unused formula code, and the cursor will move to the first description line.

2.–4. Description 1–Description 3

The user may enter up to three 30-character lines of description about the formula the user are entering.

5. Trace Flag

The user enters "Y" if the user wants to trace what happens when the user calculate the user's estimate otherwise enter "N". If the user put a tracer on the formula then it creates a file called xxxTRCyy (where xxx=company id, yy=terminal number) which can be printed from the operating system. The following is an example of a printout of a traced formula:

TABLE 4

| | | | |
|---|---|---|---|
| FAB01 00 0010 01 01 01 00000000.000000 01 | | 01 | 00 0000 |
| FAB01 00 0020 01 77 01 00000000.000000 02 | 1040 | 01 | 00 0000 |
| FAB01 00 0025 01 78 01 00000000.000000 01 | | 01 | 00 0000 |
| FAB01 00 0026 01 77 01 00000000.000000 02 | 1040 | 01 | 00 0000 |
| FAB01 00 0030 01 47 02 00000001.000000 02 | 1040 | 01 | 00 0000 |
| FAB01 00 0040 01 83 01 00000000.000000 01 | | 02 T | 00 0000 |

The first column represents the formula name. The next column represents the current level number of the environment. The third column represents the line number in the formula. The fourth column tells the user the user's block level in reference to begin/end blocks. This is useful when using multiple begin/end blocks. The fifth column tells the Op Code that is executed. The sixth and seventh columns represent the next numeric stack location available and the numeric stack value. The eighth and ninth columns represent next alpha stack location available and the alpha stack value. The tenth and eleventh columns represent the next boolean stack location available and the boolean stack value. The twelfth column represents the return error code and the last column represents the user error code.

This completes the formula header information. If the user want to maintain formula detail lines, the user enters an 'M' for maintain at the 'enter line to change' prompt.

Maintaining Formula Detail Lines

When the user choose 'M' to maintain formula detail lines, the following screen will appear:

TABLE 5

| Est & Stds Detail Formula Maint | TIME 17:23 TERM 25 |
|---|---|
| *1. Formula Code | ___ |
| 2. Description 1 | ___ |
| 3. Description 2 | ___ |
| 4. Description 3 | ___ |
| 1. Line No. | ___ |
| 2. Op Code | ___ |
| 3. Operand | ___ |
| 4. Comment | ___ |

1. Line Number

Each formula detail line must be assigned a line number. If the user are entering a new formula, the system will assign the next available line number. In assigning line numbers, the system uses increments of 10. It is advisable to use line numbers with an increment that allows for the insertion of new lines at a later date.

If the user are editing an existing formula, he enters the line number for the line the user want to change, or enter an unused line number to insert a new line.

2. Op Code

The operation code refers to the logical operation to be performed. Operation codes used for all formulas are the same. An op code listing appears in the formula appendix section at the end of this volume. When the user have entered a valid op code, the operation description will be displayed.

3. Operand

If an operand applies for the op code the user have entered, the cursor will move to this field. The operand refers to the parameter upon which the operation is to be performed. The user must make a valid entry from the accompanying parameter table.

4. Comment

The user may enter a comment line to describe this formula detail line. The comment appears on the formula listings.

Formula Parameter Tables

The parameter table lists all the parameters that may be used in detail formulas. The parameter table for the type of formula the user is maintaining is used. Table headings begin with Param No and Param Name to clarify referring to the table items. Each parameter is one of the following types:

A Alphanumeric: This indicates that the parameter value is alphanumeric.

N Numeric: Indicates that the parameter value is numeric.

E Either: Indicates that the parameter value may be numeric or alphanumeric.

B Boolean: Indicates that the parameter value is either a true or false value.

Parameters in the table may be set by the MRP system or the formula, as indicated in the table. Likewise, parameters may be read by the MRP system or the formula, as indicated in the table. It is important to remember that the table actually provides the place where information is stored before, during, and after the formula is executed. A more detailed discussion of how to write formulas follows later.

TABLE 6

| Param No | Parameter Name | Ty | Set By Sys | Set By Frm | Set By Oper | Read By Sys | Read By Frm |
|---|---|---|---|---|---|---|---|
| 1 | Est/WO Item to be Mfg | A | Y | | | | Y |
| 2 | Est/WO Router Code | A | Y | | | | Y |
| 3 | Est/WO Item Category | A | Y | | | | Y |
| 4 | Est/WO Option 1 | E | Y | | | | Y |
| 5 | Est/WO Option 2 | E | Y | | | | Y |
| 6 | Est/WO Option 3 | E | Y | | | | Y |
| 7 | Est/WO Option 4 | E | Y | | | | Y |
| 8 | Est/WO Option 5 | E | Y | | | | Y |
| 9 | Est/WO Option 6 | E | Y | | | | Y |
| 10 | Est/WO User Option 1 | A | Y | | | | Y |
| 11 | Est/WO User Option 2 | A | Y | | | | Y |
| 12 | Est/WO User Value 1 | N | Y | | | | Y |
| 13 | Est/WO User Value 2 | N | Y | | | | Y |
| 14 | Est/WO Total Qty to Mfg | N | Y | | | | Y |
| 15 | Est/WO Lead Time | N | Y | | | | Y |
| 16 | Mfg Item Record Flag | B | Y | | | | Y |
| 17 | Mfg Item Unit of Measure | A | Y | | | | Y |
| 18 | Mfg Item Unit Weight | N | Y | | | | Y |
| 19 | Mfg Item Average Cost | N | Y | | | | Y |
| 20 | Mfg Item Last Cost | N | Y | | | | Y |
| 21 | Mfg Item Standard Cost | N | Y | | | | Y |
| 22 | Mfg Item Width Per Unit | N | Y | | | | Y |
| 23 | Mfg Item Height Per Unit | N | Y | | | | Y |
| 24 | Mfg Item Length Per Unit | N | Y | | | | Y |
| 25 | Mfg Item User Option -1 | A | Y | | | | Y |
| 26 | Mfg Item User Option -2 | A | Y | | | | Y |
| 27 | Mfg Item User Value -1 | N | Y | | | | Y |
| 28 | Mfg Item User Value -2 | N | Y | | | | Y |
| 29 | Est/WO Detail Record Flag | B | Y | | | | Y |
| 30 | Est/WO Detail Type | A | Y | | | | Y |
| 31 | Est/WO Detail Dept Code | A | Y | Y | | | Y |
| 32 | Est/WO Detail Work Center | A | Y | Y | | | Y |
| 33 | Est/WO Detail Item | A | Y | Y | | | Y |
| 34 | Est/WO Detail Item Whse | N | Y | Y | | | Y |
| 35 | Est/WO Detail Oper/Mod | A | Y | Y | | | Y |
| 36 | Est/WO Detail Setup/Scrap | N | Y | | | | Y |
| 37 | Est/WO Detail Freq | N | Y | | | | Y |
| 38 | Est/WO Detail Run Time/Qty | N | Y | | | | Y |
| 39 | Est/WO Detail U/M | A | Y | | | | Y |
| 40 | Est/WO Detail Rate/Cost | N | Y | | | | Y |
| 41 | Est/WO Detail Pay Type | A | Y | | | | Y |
| 42 | Est/WO Detail | N | Y | | | | Y |

TABLE 6-continued

| Param No | Parameter Name | Ty | Set By Sys | Set By Frm | Set By Oper | Read By Sys | Read By Frm |
|---|---|---|---|---|---|---|---|
|  | Move Time |  |  |  |  |  |  |
| 43 | Est/WO Detail Queue Time | N | Y |  |  |  | Y |
| 44 | Est/WO Detail Overlap % | N | Y |  |  |  | Y |
| 45 | Est/WO Detail User Value | N | Y |  |  |  | Y |
| 46 | Est/WO Detail Qty Compl | N | Y |  |  |  | Y |
| 47 | WT Record Flag | B | Y |  |  |  | Y |
| 48 | WT Type | A | Y |  |  |  | Y |
| 49 | WT Dept Code | A | Y |  |  |  | Y |
| 50 | WT Work Center | A | Y |  |  |  | Y |
| 51 | WT Item | A | Y |  |  |  | Y |
| 52 | WT Item Whse | N | Y |  |  |  | Y |
| 53 | WT Oper/Cat | A | Y |  |  |  | Y |
| 54 | WT Serial Number | A | Y |  |  |  | Y |
| 55 | WT Vendor Number | N | Y |  |  |  | Y |
| 56 | WT Setup Time/Scrap | N | Y |  |  |  | Y |
| 57 | WT Run Time/Quantity | N | Y |  |  |  | Y |
| 58 | WT Unit of Measure | A | Y |  |  |  | Y |
| 59 | WT Cost per Unit | N | Y |  |  |  | Y |
| 60 | WT Employee No | N | Y |  |  |  | Y |
| 61 | WT Shift | N | Y |  |  |  | Y |
| 62 | WT Pay Type Code | A | Y |  |  |  | Y |
| 63 | WT Quantity Completed | N | Y |  |  |  | Y |
| 64 | WT Quantity Scrap | N | Y |  |  |  | Y |
| 65 | Company GNA Overhead Rate | N | Y |  |  |  | Y |
| 66 | Plant Code | A | Y |  |  |  | Y |
| 67 | Plant Def RM Item Whse | N | Y |  |  |  | Y |
| 68 | Plant Def FG Item Whse | N | Y |  |  |  | Y |
| 69 | Plant Mfg Overhead Rate | N | Y |  |  |  | Y |
| 70 | Plant Reg Labor Rate | N | Y |  |  |  | Y |
| 71 | Plant Ovt Labor Rate | N | Y |  |  |  | Y |
| 72 | Plant Spc Labor Rate | N | Y |  |  |  | Y |
| 73 | Plant User Value 1 | N | Y |  |  |  | Y |
| 74 | Plant User Value 2 | N | Y |  |  |  | Y |
| 75 | Plant User Value 3 | N | Y |  |  |  | Y |
| 76 | Dept Record Flag | B | Y |  | 81 |  | Y |
| 77 | Dept Mfg Overhead Rate | N | Y |  | 81 |  | Y |
| 78 | Dept Reg Labor Rate | N | Y |  | 81 |  | Y |
| 79 | Dept Ovt Labor Rate | N | Y |  | 81 |  | Y |
| 80 | Dept Spc Labor Rate | N | Y |  | 81 |  | Y |
| 81 | Dept User Value 1 | N | Y |  | 81 |  | Y |
| 82 | Dept User Value 2 | N | Y |  | 81 |  | Y |
| 83 | Dept User Value 3 | N | Y |  | 81 |  | Y |
| 84 | Work Center Record Flag | B | Y |  | 82 |  | Y |
| 85 | Work Center Mfg Ovhd Rate | N | Y |  | 82 |  | Y |
| 86 | Work Center Def Pay Type | A | Y |  | 82 |  | Y |
| 87 | Work Center Reg Labor Rate | N | Y |  | 82 |  | Y |
| 88 | Work Center Ovt Labor Rate | N | Y |  | 82 |  | Y |
| 89 | Work Center Spc Labor Rate | N | Y |  | 82 |  | Y |
| 90 | Work Center User Value 1 | N | Y |  | 82 |  | Y |
| 91 | Work Center User Value 2 | N | Y |  | 82 |  | Y |
| 92 | Work Center User Value 3 | N | Y |  | 82 |  | Y |
| 93 | Item Record Flag | B | Y |  | 83 |  | Y |
| 94 | Item Unit of Measure | A | Y |  | 83 |  | Y |
| 95 | Item Unit Weight | N | Y |  | 83 |  | Y |
| 96 | Item Average Cost | N | Y |  | 83 |  | Y |
| 97 | Item Last Cost | N | Y |  | 83 |  | Y |
| 98 | Item Standard Cost | N | Y |  | 83 |  | Y |
| 99 | Item Width Per Unit | N | Y |  | 83 |  | Y |
| 100 | Item Height Per Unit | N | Y |  | 83 |  | Y |
| 101 | Item Length Per Unit | N | Y |  | 83 |  | Y |
| 102 | Item User Option -1 | A | Y |  | 83 |  | Y |
| 103 | Item User Option -2 | A | Y |  | 83 |  | Y |
| 104 | Item User Value -1 | N | Y |  | 83 |  | Y |
| 105 | Item User Value -2 | N | Y |  | 83 |  | Y |
| 106 | Serial Record Flag | B | Y |  | 83 |  | Y |
| 107 | Serial Unit of Measure | A | Y |  |  |  | Y |
| 108 | Serial Unit Cost | N | Y |  |  |  | Y |
| 109 | Serial Standard Cost | N | Y |  |  |  | Y |
| 110 | Serial Type | A | Y |  |  |  | Y |
| 111 | Serial MRP Rel Type | A | Y |  |  |  | Y |
| 112 | Stnd Op Record Flag | B | Y |  | 84 |  | Y |
| 113 | Stnd Op Setup Time/Scrap | N | Y |  | 84 |  | Y |
| 114 | Stnd Op Frequency | N | Y |  | 84 |  | Y |
| 115 | Stnd Op Run Time/Quantity | N | Y |  | 84 |  | Y |
| 116 | Stnd Op Unit of Measure | A | Y |  | 84 |  | Y |
| 117 | Stnd Op Cost per Unit | N | Y |  | 84 |  | Y |
| 118 | Stnd Op Pay Type | A | Y |  | 84 |  | Y |
| 119 | Stnd Op Move Time | N | Y |  |  |  | Y |
| 120 | Stnd Op Queue Time | N | Y |  |  |  | Y |
| 121 | Stnd Op Overlap % | N | Y |  |  |  | Y |
| 122 | Stnd Op User Value | N | Y |  |  |  | Y |
| 123 | Employee Record Flag | B | Y |  |  |  | Y |
| 124 | Employee Reg Rate | N | Y |  |  |  | Y |
| 125 | Employee Ovt Rate | N | Y |  |  |  | Y |
| 126 | Employee Spc Rate | N | Y |  |  |  | Y |
| 127 | Employee Classification | A | Y |  |  |  | Y |
| 128 | User Defined -1 | E |  | Y |  |  | Y |
| 129 | User Defined -2 | E |  | Y |  |  | Y |
| 130 | User Defined -3 | E |  | Y |  |  | Y |

TABLE 6-continued

| Param No | Parameter Name | Ty | Set By | | | Read By | |
|---|---|---|---|---|---|---|---|
| | | | Sys | Frm | Oper | Sys | Frm |
| 131 | User Defined -4 | E | | Y | | | Y |
| 132 | User Defined -5 | E | | Y | | | Y |
| 133 | Reserved | | | | | | |
| 134 | Reserved | | | | | | |
| 134 | Reserved | | | | | | |
| 135 | Reserved | | | | | | |
| 136 | Reserved | | | | | | |
| 137 | Reserved | | | | | | |
| 138 | Eng Value 1 | N | Y | Y | | Y | Y |
| 139 | Eng Value 2 | N | Y | Y | | Y | Y |
| 140 | Eng Value 3 | N | Y | Y | | Y | Y |
| 141 | Eng Value 4 | N | Y | Y | | Y | Y |
| 142 | Eng Value 5 | N | Y | Y | | Y | Y |
| 143 | Total Setup/ Scrap | N | Y | Y | | Y | Y |
| 144 | Total Time/ Quantity | N | Y | Y | | Y | Y |
| 145 | Total Direct Cost | N | Y | Y | | Y | Y |
| 146 | Gross Pay | N | Y | Y | | Y | Y |
| 147 | Mfg Overhead Cost | N | Y | Y | | Y | Y |
| 148 | General and Admin Ovhd | N | Y | Y | | Y | Y |
| 149 | Total Wait Time | N | Y | Y | | Y | Y |
| 150 | Total Processing Time | N | Y | Y | | Y | Y |

Figure 12A:
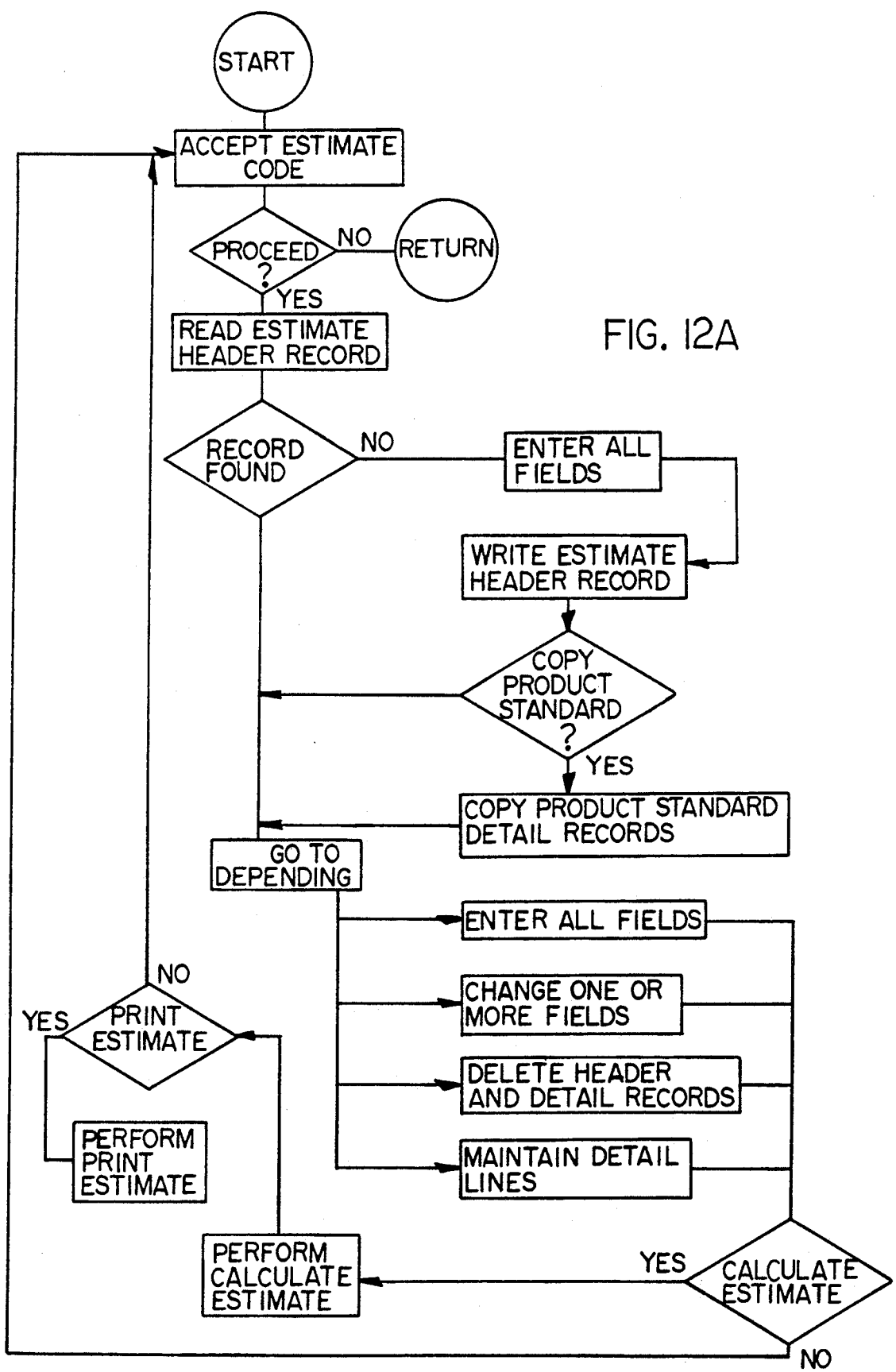
FIG. 12A is a detailed flow chart illustrating the process of Estimate Entry/Change shown in FIG. 7.
Figure 12B:
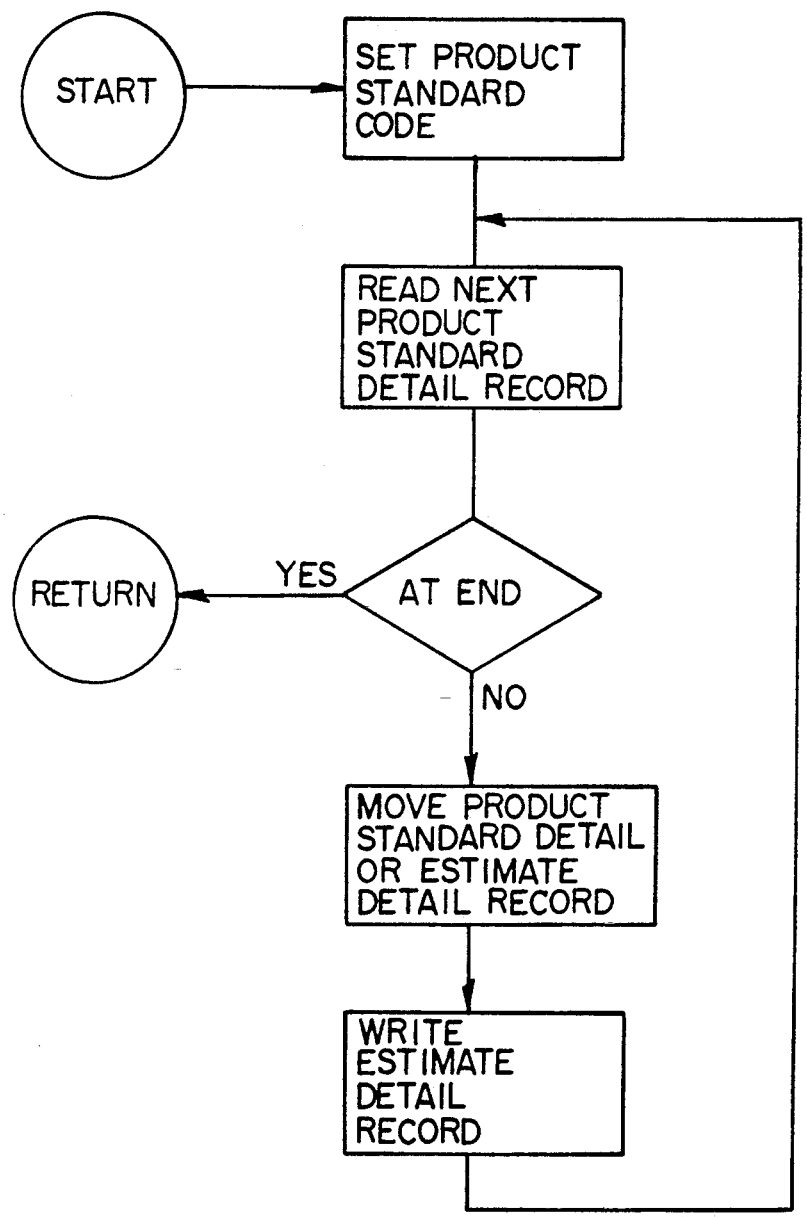
FIG. 12B is a continuation of the detailed flow chart shown in FIG. 12A illustrating the function block for Copying the Product Standard Detail Records.

Turning now to FIG. 12, a detailed flow chart illustrating the process of Estimate Entry/Change, shown in FIG. 7, is shown. A discussion of their operations follows:

Estimate File Maintenance

The Estimate File 52 of the MRP system of the present invention is used to create or modify an estimate, calculate costs, prices and print the estimate. The user may create estimates for regular production items and for special, custom, or modified items. The user may also change details for an existing estimate.

Each Estimate record consists of two components, a Estimate header and the Estimate detail records. Each estimate has one header which identifies the estimate and contains the item number, description, category, and manufacturing quantities. Each Estimate record may contain multiple detail records, each of which contains information about a specific component of production required to build the item.

The header screen appears as shown below:

TABLE 7

| Estimate Header File Maint | TIME 8:59 TERM 8 |
|---|---|
| *1. Estimate Code | |
| 3. Item Number | |
| 4. Product Std Code | |
| 5. Category Code | |
| 12. Description | |
| | Unit Pricing |
| Quantities | |
| 13. | |
| 14. | |
| 15. | |
| 16. | |

The user may use any of the four alternatives described below to create a new Estimate:

The usual way to create an Estimate is to use an existing Product Standards record. To use this method, the user first completes the Estimate header screen, entering the Product Standards code that the user wants to use in field #4. At the completion of this screen, the user will be asked if the user wants to copy the Product Standards into the Estimate detail and the user should respond "Y"es. The Product Standards will be duplicated into the Estimate detail. The user then may proceed with Estimate calculations and printing.

If the user is preparing an estimate for an item that is similar to an existing Product Standards record, the user may use the method described above to created the Estimate record, then edit the details that are different from the Product Standards record similar to maintaining Estimate detail.

If the user do not have a Product Standards record that can be used for creating an Estimate record, the user may enter the Estimate header as discussed below, leaving a blank for entry #4, "Product Standards Code". The user will then have to enter each detail record.

If the user has an Estimate record already created that is similar to the one the user wants to create, the user may copy the old one using the rename feature. The user first brings up the Estimate record to be copied. When the original Estimate record is displayed on the user's screen, the user presses the "R" key to Replicate. The user then will be asked if the user want to delete the original Estimate record. The user should respond "N"o and the cursor will move to the Estimate code entry. The user then enters the code for the new Estimate record to duplicate the header and detail of the original Estimate record into the new Estimate record. The user may then edit the header or detail.

If the user are using one of the methods that copies the Product Standards detail into the Estimate record, the user enters the Product Standards code at the time the Estimate record is created and the user must also respond "Y"es when asked if the user want to copy the Product Standards into the Estimate detail. The only opportunity the user has to copy Product Standards into an Estimate record is at the time the Estimate record is created.

1. Estimate Code

For a new Estimate record, the user may assign any alphanumeric code, up to eight characters in length.

If the user want to change an existing Estimate record, he first enters the code. If the user entered a valid estimate code, the remaining values on the user's screen will be displayed.

3. Item Number

If the user are preparing an Estimate record for a regular production item, the user enters the item code here, as it appears on the Inventory Item File. If the user uses multiple locations, the user will also have to enter the location code for this item. When the user make a valid entry, the item description will be displayed on the right side of the user's screen.

If this Estimate record is for an item that is not in the Inventory Item file, the user may leave this entry blank or enter up to 15 characters of information for the user's reference.

4. Product Standards Code

This entry is the link to the Product Standards file. If the method the user are using to create the Estimate record copies the Product Standards, the user must enter the Product Standards code here.

If the item the user entered above specifies a Product Standards code on the source screen, that code will be displayed and the Product Standards description will be displayed in the spaces to the right.

If the user did not enter an Inventory Item code above or if the item the user entered does not specify a Product Standards code, the user may enter the Product Standards code. Alternatively, the user may use the index feature to display and select a Product Standards code. The entry of a Product Standards code is not required and the user may to leave this entry blank.

5. Category Code

If a valid item number was entered for this Estimate record, then the product category code for this item will be displayed, and the category description will be displayed to the right.

If the user did not enter an item number for this Estimate record, the user must specify a valid product category code.

6–11. Item Options

If options have been specified for the product category shown above, the user's screen will display the options descriptions, beginning with entry #6. For each option the user must enter an option value. If the option requires valid option checking, the system will verify that the user have entered a valid option value.

The user may enter the valid option value by typing it or select the value using the index feature as described below:

When using the index feature to see the valid options, if the user wants to display the valid options that are available for an option, the user may use the index feature by positioning the cursor on the option, then pressing the pre-selected function key. A box will appear on the user's screen with valid options displayed inside. The selection cursor will be positioned on the first option in the box. Only a limited number of option values are shown at one time but the user may use the following function keys to display more valid options or to move the selection cursor.

"F1" When multiple screens of valid option values are required, this function key will return the user to the first screen.

"F2" This key moves the selection cursor down one line at a time.

"F3" This key moves the selection cursor up one line at a time.

"F4" This key displays the next screen of valid option values.

"F8" This key is used to insert the valid option value currently chosen by the selection cursor into the Estimate record and end the index feature.

12. Description

If a valid Product Standards code was entered above, then the description from the Product Standards File will appear in this space. The user may change this description or accept it.

If a valid Product Standards code was not entered, the user may enter any 30 character alphanumeric description for this Estimate record.

13–16. Quantities

The user enters the manufacturing quantities for which the Estimate record is to be calculated. The user may enter up to four different quantities. In performing calculations, the system will automatically consider production efficiencies such as setup time, queue time, frequencies, etc. for each quantity.

The following steps depend on whether the user is creating a new Estimate record or modifying an existing one:

If the user have created a new Estimate record using a product standards as the basis, the user will be asked "Do the user wish to copy the product record now ("Y" or "N")? The user should respond with a "Y"es and the system will copy the Product Standards detail from the Product Standards code the user entered above. This is the user's only opportunity to copy the Product Standards detail into the Estimate record. The user may then calculate and print the Estimate record as described below or choose "M" to maintain detail and change any of the details that were copies from the Product Standards record.

If the user are not using a Product Standards as the basis for this Estimate record, the user should choose option "M" to maintain estimate detail and enter the Estimate detail record.

If the user has returned to this screen after entering or changing Estimate detail records, the user may change information on the header screen or continue.

Calculating and Printing Estimates

Each time the user enters or changes an Estimate record, the user will be asked if the user wants to calculate and print the Estimate record before returning to the menu. These processes are identical to menu options 2 and 3 from the Estimate processing sub-menu.

After clearing the Estimate header screen, the user will be asked "Do you want to calculate the estimate now?" The user should only proceed with calculations after the user has finished entering or changing estimate details. If the user is ready to calculate the estimate, he enters a "Y". If the user enters an "N", the user will be returned to the menu.

If the user has chosen to calculate the estimate, the following calculations are performed and the results are displayed on the user's screen. The user will be asked "Do you want to print the estimate?" If the user enters an "N", the user will be returned to the menu. If the user enters a "Y", the user will be asked for which of the four manufacturing quantities the user wants to print, then the user will be asked to choose an output selection. The report will be printed and the user's menu displayed.

After the user has entered an 'M' to maintain detail from the Estimate header screen, the following screen will appear:

TABLE 8

| Estimate Detail File Maint | TIME 15:57 TERM 8 |
|---|---|
| *1. Estimate Code | |
| 2. Item Number | |
| *1. Line Number | |
| 2. Op Type | |
| 3. Labor Code/Item | |
| 4. Operation/Category | |
| 5. Description | |
| 6. Rpt Type | |
| 7. Qty Calc | |
| Standard Calc Parameters: | |
| 9. Setup Time/Scrap | |
| 10. Frequency | |
| 11. Run Time/Quantity | |
| 12. Unit of Meas | |
| 13. Rate per Unit | |
| 14. Pay Type | |
| 15. Move Time | |
| 16. Queue Time | |
| 17. Percent Overlap | |

The Estimate code and Item Number from the Estimate header are displayed at the top of the screen.

1. Line Number

If the manufacturing operation uses reporting stations, the first digit of the line number is the reporting station (0–9) with which this Estimate detail line is associated. When the user have entered a valid reporting station number, the reporting station description will be displayed to the right and the cursor will move one space to the right, on the same line for the user to enter the sequence number portion of the line number.

If the user do not use reporting stations, the line number and the sequence number are the same. If the user are adding records, the system will assign the next sequence number, starting with 10 and incrementing by 10.

If the user want to insert a record between two existing ones, he enters a number that is between the existing records where this one is to be inserted.

2. Operation Type

Operation types are used to specify the general kind of processing accomplished by this Estimate detail line. This is somewhat user-defined, as not all types apply to all companies. The types that are available include the following:

'L'abor: A labor operation is one which must be performed at a specific department or work center. Primary concerns for labor operations are production scheduling, capacity planning, and labor costing. The manufacturing operation control record may require that all Labor operations be set up as standard operations.

'M'aterial: Materials operations are raw materials that are consumed in the production process by this operation. Primary concerns for materials operations are inventory reporting, materials requirements planning, and material costing. The manufacturing operation control record may require that all Material lines be items from the item file.

'O'utside services: These are direct costs which are incurred as part of the production process, but do not affect inventory usage, labor costs, planning, scheduling, or capacity. The primary concern of outside service operations is their impact on costing. Outside services may be set up as standard operations.

'C'omments: These are notes or reminders associated with a specific operation. The purpose of most comments is for printing on production documents, and they have no impact on costing or scheduling. Comments may be set up as standard operations.

Other Costs: There may be up to seven user-defined other costs. Each is identified by a number (1–7). Other costs are used for tracking any other type of specific cost that does not fall into one of the types described above. The manufacturing operation control record determines which other costs are used.

The user must enter a valid operation type for each Estimate detail line.

3. Labor Code/Item

The user's entry for this field depends on the operation type the user entered above.

If the operation type is labor, the user enters a department number and the department name will be displayed. If the manufacturing operation uses work centers, the cursor will move to the right, on the same line for the user to enter a work center code. Enter a work center code for this detail line, and the work center description will be displayed on the right.

If the operation type is material, the user enters the item code for the material to be used in this detail line. The manufacturing operation control record determines whether or not the user must enter a valid item code from the item file.

If the operation type is comment, other cost, or outside service, this entry is not used unless this Estimate detail record uses a standard operation. If not used, the user may move to the next field. If this detail record is a standard operation, the user enters the labor code that was used for this standard operation. The cursor will move to the description field.

4. Operation/Category

This field is only applicable for Labor or Material operation types.

For a labor item, this field allows the user to specify a standard operation. If the user want to use a standard operation for this Estimate detail record, he enters the Standard Operation code here. The manufacturing operation control record may require that the user enter a Standard Operation code for all labor operations.

For a material item, the cursor will skip this field if the user entered a valid item code, and the product category code for this item will be displayed. If the manufacturing operation control record allows the user to enter material lines for materials that are not in the user's item file, and this is such a line, the user must enter a valid product category code.

5. Description

If this detail line uses a Standard Operation, the description from the Standard Operation record will be displayed as the default. If this detail line uses an item record from the item file, the item description from the item record will be displayed as the default. The user may accept the default or enter a different description.

If one of the cases described above does not apply, a default description will not be displayed, and the user may type a description up to 30 characters long.

6. Reporting Type

There are two choices available, though both may not be used by the manufacturing operation. The reporting types are (S)tandard or (A)ctual. If both types are not used by the manufacturing operation, the one that is used will be displayed and the cursor will skip this entry. Reporting type refers to the calculation method that will be used for computing the costs and quantities used in the manufacturing process for this Estimate.

Standard reporting is used because it requires less data entry at completion time, but it reports standard quantities, which may be less accurate than actual reporting. Standard reporting should be used for reporting items that are inexpensive or not likely to deviate significantly from standard quantities.

Actual reporting is used because it is more accurate than standard reporting, but it requires more data entry at reporting time. The exact quantities that were used in the manufacturing process are reported and used for calculating costs and usages. Actual reporting should be used for items that are expensive or highly variable from standard quantities.

7. Quantity Calculation

This refers to the method used for calculating the quantity required for this operation. There are two choices (D)efault or (F)ormula, though both may not be available for the manufacturing operation. If both alternatives are not used by the manufacturing operation, the method that is used will be displayed and the cursor will skip this entry.

Default calculations are based on the quantities specified in the calculation parameters section of this operation. To use the default method, the user enters an 'D'.

Formula calculations are be based on the results of a formula. To use the formula method, the user enters an 'F'. The cursor will move to the right for the user's to enter the formula code that is to be used. The user must enter a valid formula code.

Estimate detail lines Calculation Parameters

The following fields are displayed under the heading "Calculation Parameters." The manner in which each of these items is used varies according to the operation type. If the user are not already familiar with the structure of system defaults used for these fields, the user should read the 'Note' that appears below.

The system offers a multi-level default structure, or 'pecking order' for locating the particular parameter values that are used when performing calculations. At each level in the pecking order, the system attempts to locate a value that is greater than zero. If such a value is located, it will be used for calculations and subsequent levels in the pecking order will not be used. Zero will be used for calculations if, at the end of the pecking order a greater value has not been located.

This pecking order is used on an individual basis for each parameter—one parameter may be found at one level in the pecking order, the next may be at a different level.

At the first level of the pecking order, the system uses parameter values from the estimate or work order detail line. The system will default to the next level in the pecking order for any values not entered on the detail line.

The next level in the pecking order is the Estimate record, if one was used to create the estimate. The system will default to the Estimate detail for value(s) not entered in the estimate or work order detail. If the values are not entered in the Estimate detail, or if a Estimate record was not used to create the estimate, the system will default to the next level in the pecking order.

If the operation type for this line is Other cost, Comment, or one of the seven user-defined costs, this is the last level in the pecking order unless a standard operation was used. If the operation type is Material, the cost, or rate per unit, is the only value for which there is another level in the pecking order. If a value has not been located by the final level in the pecking order for any parameter, a zero will be used when performing calculations.

If the operation type is material, the next, and final level in the pecking order is used only for finding the rate, or cost. If an item (from the item file) was specified for this material line, the system will default to the cost entered in the item record. There are three costs in each item record, last, standard, and average. The manufacturing operation control record determines which will be used. If an item record does not exist for this material line, zero will be used for calculations.

For non-material operation types, the system will default to the Standard Operations record, if one was used. Except for the 'rate' in labor operations, this is the final level in the pecking order. If the estimate or work order detail record does not use a standard operation, or if parameter values cannot be located in the Standard Operation record, zero will be used for calculations.

The last item in the pecking order is used only for locating the rate per unit for labor detail lines. The system defaults to the department record, and uses the hourly rate for this pay type. If there is no hourly rate specified in the department record, a zero will be used for calculations.

9. Setup Time/Scrap

If this is a labor operation, setup time refers to the time (in number of hours) required to prepare for the operation to begin. If setup time is applicable to this operation, the user enters the time. If a setup time is not applicable, the user leaves it blank.

If this is a material operation, scrap refers to the number of units that are wasted each time the material operation is performed. If applicable, the user enters the quantity. If scrap is not applicable for this material, the user leaves it blank.

10. Frequency

If this is a labor operation and the user have entered a setup time, the user may use this entry to indicate the rate of occurrence with which the setup must be executed. For example, if this labor operation requires a setup time of 1 hour, and the setup must be executed again after 30 units are produced, then the setup time is 1.0 and the frequency is 30.

If this is a material line and the user have entered a scrap amount, the user may enter a frequency to indicate the rate at which the scrap amount is incurred. For example, if this material results in a scrap of 1 unit for each 30 units that are produced, the user should enter 1 for scrap, and 30 for the frequency.

This entry is generally not used if the user did not enter a setup time, or for operations that are not labor or material. If the user does not use it, he may leave it blank.

11. Run Time/Quantity

For labor operations, this value is the run time to complete the operation in terms of unit of measure (see below). Their use is best illustrated through examples:

Example 1

If the user want to specify a number of hours per unit of output, he enters the number of hours required to perform this operation for one unit of output, and 'HPP' (hours per piece) as the unit of measure. This method is generally used for operations that take a relatively long time to perform. For an operation that requires one and a half hours to perform, the user should enter 1.5 as the run time and HPP as the unit of measure.

Example 2

If the user want to specify a number of units produced per hour, he enters the number of units in run time, and 'PPH' (pieces per hour) as the unit of measure. This method is generally used for operations which take very little time to perform. For an operation that yields 1000 pieces per hour, the user should enter 1000 as the run time, and PPH as the unit of measure.

12. Unit of Measure

For a labor line, this field specifies the units of measure for the run time the user has entered. As discussed above, the usual choices are Hours Per Piece (HPP) or Pieces Per Hour (PPH).

13. Rate Per Unit

If the user are not already familiar with the way in which the system uses rates and defaults, the user should read the 'Note about parameter defaults' at the beginning of this section.

If this is a labor operation, the rate per unit refers to the standard hourly rate for the department/work center where this operation is performed.

If this is a material operation, the rate per unit refers to the cost for the raw material.

If this is another type of operation, the rate per unit refers to the cost per unit of the operation.

Entries 14–16 apply only to labor operations:

14. Pay Type

If this is a labor line, the user must enter a valid pay type code. This code is used to determine the pay rate for calculating labor costs. It is also used if the user are interfacing to payroll.

15. Move Time

This entry allows the user to indicate the length of time required to move this item from the previous work station to this work station. If entered, this field is important for reporting labor costs incurred by move time, as well as for shop scheduling.

16. Queue Time

This entry allows the user to specify a time for which the product must sit idle at this work station before this operation may begin. If the length of time is significant, this entry is important for its impact on shop scheduling.

17. Percent Overlap

This entry refers to the percentage of completion of this operation at which the next operation may begin. For example, if there is a 40% overlap, then when this operation has been completed on 60% of the items, execution of the next operation may begin. This entry is used primarily for calculating lead times and for shop scheduling.

If not applicable, the user leaves this field blank.

19. Print on Document Flag

The production documents used by the manufacturing operation are specified in the manufacturing operation control record. The user may use up to nine different documents, and all are user-defined. Each production document is assigned a one-digit number.

When production documents are generated, detail lines are selected for printing based on the print on document flags. For each production document that the user want this Estimate detail line to print on, he enters the production document number. The system will display the name of the production document, and the cursor will move to the right side of the screen. The user enters a 'Y' or an 'N' depending on whether or not the user want this operation to print on the document. When the user have selected all the production document flags the user want for this operation, he enters a 0 for the document number, and the cursor will move to the next entry.

After completing entry of the Estimate detail line, the cursor will move back to the line number entry for the user to enter another detail line or the user can return to the first screen.

Changing an existing Estimate record

To change an existing Estimate detail record, the user first displays it on the screen. The user may use pre-defined function keys, as described earlier, or enter the line number. Once the user has a detail line displayed, he may change the values on the screen by entering the number of the selected field. As can be seen, Estimate detail records are substantially the same in format and entry procedure to Product Standards details records.

If the user wants to change something on a detail line, the user must first display the Estimate header, then enter an 'M' to maintain detail, enter the line number of the detail line the user want to change, or use a function key to locate the line.

Once the line has been displayed on the user's screen, the user may make changes by entering the number of the field the user want to change, and entering a different value. Each field on the screen is described in the preceding pages.

Deleting an existing Estimate record

To delete an existing Estimate record, the user must first display it on the user's screen. The user may locate the record using pre-defined function keys or the user may enter the Estimate code and the header will be displayed on the user's screen.

Once the user have displayed the Estimate header to be deleted, the user should choose option 'D' for delete. Estimate are not immediately deleted from the file—they are flagged for deletion at a later date. Estimate records which have been flagged for deletion remain in the file until the 'Purge deleted Estimate' program has been run. Whenever a Estimate that has been flagged for deletion is displayed on the user's screen, the word 'DEL' will appear in the top right corner of the user's screen.

To delete Estimate detail records, the user should first locate the Estimate header, then choose option 'M' to maintain lines. Locate the line the user want to delete, and choose option 'D' to delete the line. Estimate detail lines are flagged for deletion in the same manner as Estimate headers, described above.

Figure 13A:
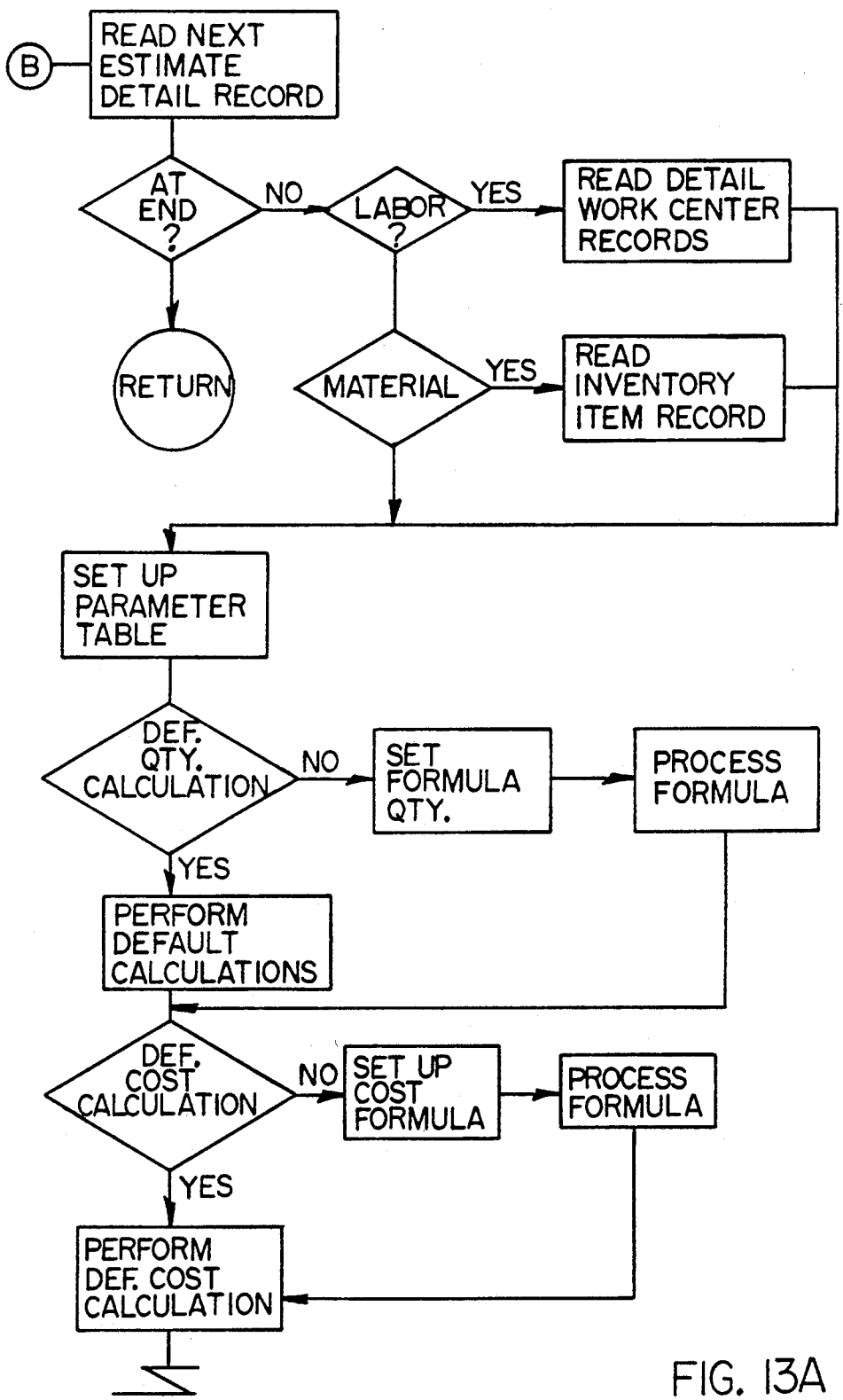
FIG. 13A is a detailed flow chart illustrating the process of Estimate Calculation shown in FIG. 7.
Figure 13B:
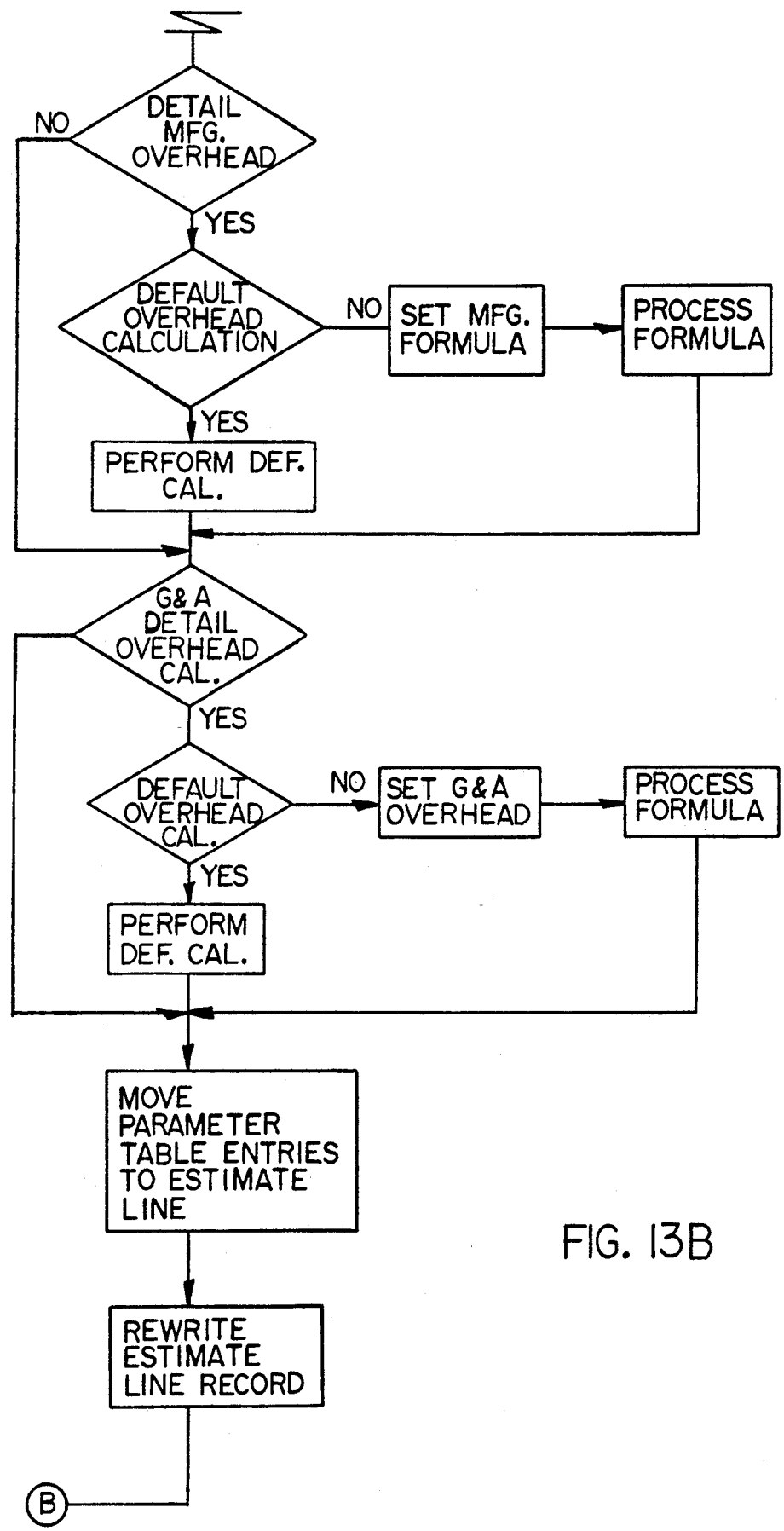
FIG. 13B is a continuation of the detailed flow chart shown in FIG. 13A illustrating the process of Estimate Calculation shown in FIG. 7.

Turning now to FIG. 13, the operations performed when the user requests that an estimate be calculated is shown. The estimating block shown in FIG. 7 processes each of the Estimate detail records for the estimate being calculated. Each record is either a labor, material, other cost, comment, or outside service. The estimating block first builds the parameter table and then performs either the default or formula based quantity and cost calculation as selected by the user. The estimating block also optionally calculates manufacturing and general and administrative overhead. After the calculations are completed, the result are written in the Estimate header and detail records.

The processing performed by the Work Order Entry/Change block shown in FIG. 8 is the same as that described above and shown in FIG. 13 except that it also calculates either due date or start date and commits or relieves inventory based on its calculations.

Similarly, the processing performed by the MRPF block shown in FIG. 9 is the same as that described above and shown in FIG. 13 except that it does not perform any cost calculations.

Figure 14:
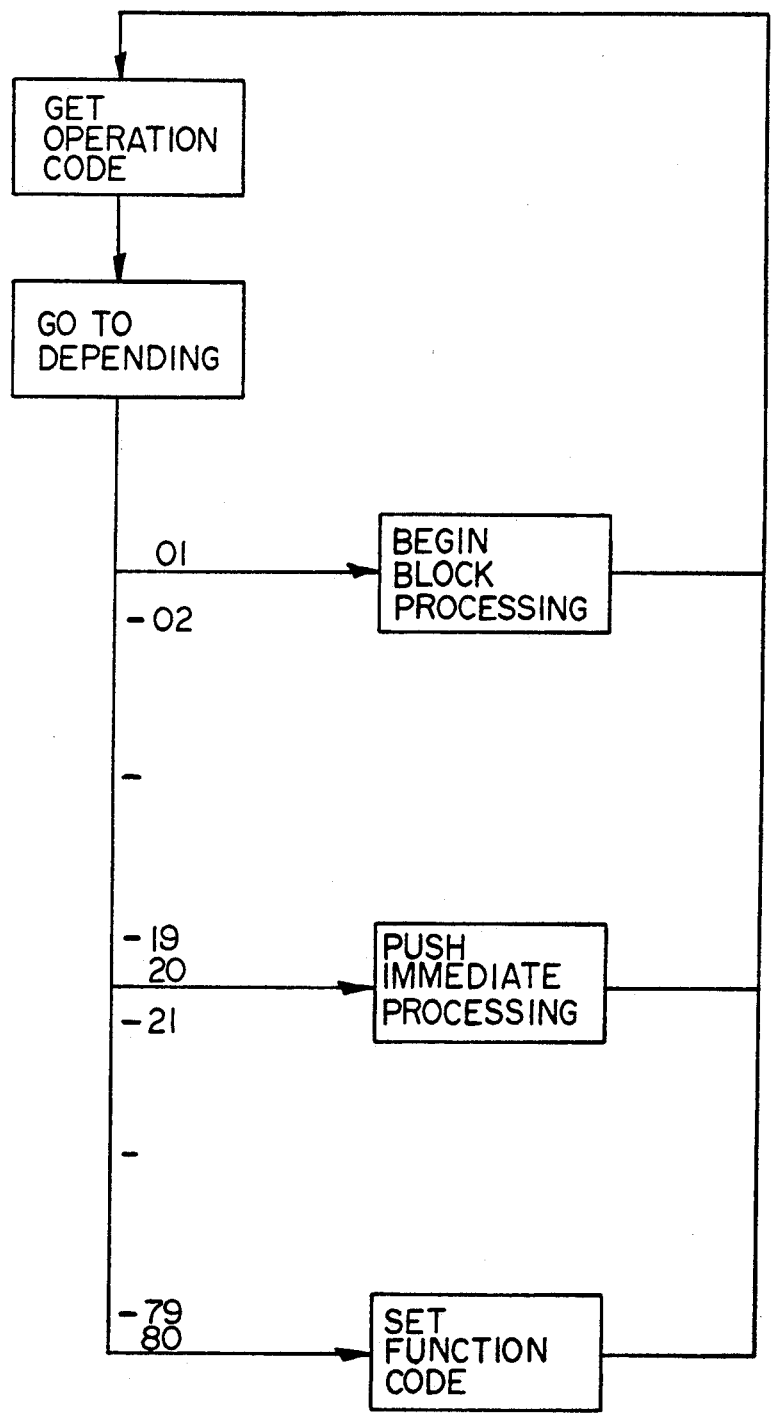
FIG. 14 is a detailed flow chart illustrating the process of Formula Processing shown in FIG. 7.

Finally, referring to FIG. 14, a detailed flow chart illustrating the process of Formula Processing shown in FIG. 7 is shown. A discussion of its operation follows:

FORMULA LOGIC

The following discussion outlines the general concepts in writing the formulas which are used in the MRP system of the present invention.

General Concepts

Formulas are designed to give diversity and flexibility in calculating quantities, pricing, overhead, costing, royalties, commissions, loading and discounts. All formulas are written with the same rules and concepts, but each type of formula has its own parameter table which determines the meaning of its instructions. The parameter tables are included in the File Maintenance section of documentation for each module.

Formulas consist of a header record, which specifies the formula name and description, and detail lines. Each detail line in a formula consists of a line number, operation code, operand (if applicable) and a comment line (if applicable).

The detail line number determines the sequence in which the commands of a formula are executed. When creating a formula, the system assigns the line number in increments of 10 thereby allowing for easy insertion of additional lines at a later date.

The operation code, or op code, determines the instruction that is to be performed by each detail line. In some cases, op codes are used independently, but in many cases they are used in conjunction with an operand. The operation code listing that follows is applicable to all formulas, regardless of the parameter table which is used. The listing contains a detailed description of each op code.

The operand is the value or variable which is to be acted on by this operation. In most cases, the operand will be a value from the parameter table. In some cases however, the operand may be a value such as a constant, or another formula name, etc. Some op codes do not require the use of an operand.

Each formula uses four stacks, a numeric stack, an alphanumeric stack, a boolean stack, which consists only of True/False values, and an environmental stack. Op codes and parameters are each associated with only one stack. The parameter tables and the operation code listings indicate which type of stack is applicable to each value.

When setting up the user's formulas the first op code must be a begin block and the last op code must be an end block. These blocks define the start and end of the user's formula, and are an example of op codes which do not utilize a parameter. Begin and end blocks may also be included within the formula. For every begin block there will be an end block.

Each stack within a formula works independently. Values are placed onto stacks using 'push' statements, and the user may push as many values on the stack as the user want. Values are removed from stacks using 'pop' statements. Push statements add values to the formula stack from the top, just as pop statements remove values from the top of the stack.

For example, let's see how a formula would find the result of 2+4−3. These are all numeric values, so the op codes will be selected accordingly. The first line of our formula would be a 'begin block.' We would then "Push Immed Numeric" of 2 on the numeric stack, then "Push Immed Numeric" of 4 onto the numeric stack. We can then execute the "Add" op code to combine the first two values of the stack, and place the result (6) as the top value of the stack. When 6 was placed as the top value of the stack, the 2 and 4 were pushed down, so they are now at positions 3 and 2, respectively. We can now "Push Immed Numeric" of 3 onto the stack (placing it in position 1 and moving 6 to position 2.) Next, we execute the "Subtract" command, which subtract the top value (3) from the value in position 2 (6), and places the result (3) on the top of the stack.

Errors may be encountered anywhere a formula is used. The system uses some standard error return codes to notify the operator of the error, or the user may set up the user's own error codes in the system, using "Formula Error Code Maintenance". The user-defined error codes are especially useful to advise of problems with data, which may not be caused by the formula logic, but which will prevent the formula from producing useful results for the manufacturing operation. The following is the list of Formula Error Codes set up in the system:

TABLE 9

FORMULA RETURN CODES

| RETURN CODE | DESCRIPTION |
|---|---|
| 01 | Incompatible Formula |
| 02 | Environmental Stack Overflow |
| 03 | Environmental Stack Underflow |
| 04 | Boolean Stack Overflow |
| 05 | Boolean Stack Underflow |
| 06 | Numeric Stack Overflow |
| 07 | Numeric Stack Underflow |
| 08 | Alpha Stack Overflow |
| 09 | Alpha Stack Underflow |
| 10 | Formula Not Found |
| 11 | I-O Error on Formula File |
| 12 | Missing End Block |
| 13 | Divide by Zero Error |
| 14 | Reserved Instruction |
| 15 | Non-implemented Instruction |
| 16 | Parameter No Out of Range |

How to Write Formulas

When the user selects a formula maintenance program from the user's menu, the formula header screen will be displayed first. The formula header screen appears below:

1. Line No

If the user are adding a line number, the system will assign the next available number or the user may enter a unique number. The system assigns line numbers in increments of 10 to allow the insertion of additional lines at a later date. If the user are editing the formula, he enters the line number the user are editing.

2. Op Code

The operation code determines the specific instruction to be executed by this line of the formula. The accompanying Op Code listing includes a description of each operation. Enter the op code for this line of the formula.

3. Operand

The operand is the value or variable to be acted upon by this line of the formula. There are at least three different kinds of operands:

a. Some op codes, such as 'begin block', do not require the use of an operand. These op codes are simply used to identify the beginning or ending of the formula.

b. Usually the operand will be a value from the parameter table. The formula file maintenance section for each module includes a parameter table, and each parameter is assigned a three digit parameter number.

c. Some op codes require the use of a constant. The 'push immediate numeric' code for example requires the entry of the constant value to be pushed onto the stack. The 'call' op code requires the entry of another formula code which is to be executed as part of the execution of this formula.

4. Comment

TABLE 10

| Sales Order Formula Maint | TIME 17:23 TERM 25 |
|---|---|
| *1. Formula Code | _____ |
| 2. Description 1 | _____ |

TABLE 10-continued

Sales Order Formula Maint    TIME 17:23    TERM 25

3. Description 2
4. Description 3

1. Formula Code

Enter a code (up to six alphanumeric characters) to identify this formula. If the user enter an existing formula code, the values will be displayed for the user to edit or delete. If the user are establishing a new formula, the user should enter an unused formula code, and the cursor will move to the first description line.

2.–4. Description 1–Description 4

The user may enter up to four 30-character lines of description about the formula the user are entering. If the user wants to maintain formula detail lines, he enters an 'M' for maintain at the 'enter line to change' prompt.

Maintaining Formula Detail Lines

When the user choose 'M' to maintain formula detail lines, the following screen will appear:

TABLE 11

1. Line No:
2. Op Code:
3. Operand:
4. Comment:

Enter a comment (up to 30 characters) to describe the instruction the user are entering. The comment is for clarification only and is not used by the formula.

Formula Op Codes

The listing below includes all op codes used in Key-Man formulas. This set of Op Codes is used in all formulas, regardless of the parameter table that applies.

TABLE 12

| OP CODE | DESCRIPTION | OPERAND | STATUS |
|---|---|---|---|
| 01 | Begin Block | | B |
| | Defines the start of block. This instruction does not alter NS, AS, or BS. | | |
| 02 | End Block | | B |
| | Defines the end of block. This instruction does not alter NS, AS, or BS. | | |
| 03 | Perform | L | B |
| | Executes the instruction or block at location designated by L. This instruction does not alter NS, AS, or BS. | | |
| 04 | Perform While True | L | B |
| | Executes the instruction or block at location designated by L repeatedly if BS0 = "T"; This instruction does not alter NS, AS, or BS. | | |
| 05 | Perform Until True | L | E |
| | Executes the instruction or block at location designated by L repeatedly if BS0 = "F"; This instruction does not alter NS, AS, or BS. | | |
| 06 | Call | A | B |
| | Executes the formula designated by A. This instruction does not alter NS, AS, or BS. | | |
| 07 | If True Then | | B |
| | Executes the next instruction or block if BS0 = "T"; This instruction does not alter NS, AS, or BS. | | |
| 08 | If Not True Then | | E |
| | Executes the next instruction or block if BS0 = "F"; This instruction does not alter NS, AS, or BS. | | |
| 09 | No Operation | | B |
| | No Operation; This instruction does not alter ES, NS, AS, or BS. | | |
| 10 | Push Immed Boolean | B | B |
| | Pushes the immediate boolean operand designated by B on BS; B to BS. This instruction does not alter ES, NS, or AS. | | |
| 11 | And | | B |
| | Pops BS two times then pushes BS0 and BS1 on BS; BS0 and BS1 to BS. This instruction does not alter ES, NS, or AS. | | |
| 12 | Or | | B |
| | Pops BS two times then pushes BS0 or BS1 on BS; BS0 or BS1 to BS. This instruction does not alter ES, NS, or AS. | | |
| 13 | Not | | B |
| | Pops BS then pushes not BS0 on BS; Not BS0 to BS. This instruction does not alter ES, NS, or AS. | | |
| 14 | Reserved | | R |
| 15 | Table Boolean Next | | U |
| 16 | Table Boolean Random | | U |
| 17 | Push Bool Parameter | L | B |
| | Pushes the Lth element of the parameter table on BS; param(L) to BS. This instruction does not alter ES, NS, or AS. | | |
| 18 | Pop Bool Parameter | L | B |
| | Pops BS into the Lth element of the parameter table; BS0 to param(L). This instruction does not alter ES, NS, or AS. | | |
| 19 | Reserved | | R |
| 20 | Push Immed Numeric | N | B |
| | Pushes the immediate numeric operand designated by N on NS; N to NS. This instruction does not alter ES, BS, or AS. | | |
| 21 | Add | | B |
| | Pops NS two times then pushes NS1 plus NS0 on NS; NS1 + NS0 to NS; This instruction does not alter ES, BS, or AS. | | |
| 22 | Subtract | | B |
| | Pops NS two times then pushes NS1 minus NS0 on NS; NS1 − NS0 to NS; This instruction does not alter ES, BS, or AS. | | |
| 23 | Multiply | | B |
| | Pops NS two times then pushes NS1 times NS0 on NS; NS1 × NS0 to NS; This instruction does not alter ES, BS, or AS. | | |
| 24 | Divide | | B |
| | Pops NS two times then pushes NS1 divided by NS0 on NS; NS1/NS0 to NS; This instruction does not alter ES, BS, or AS. | | |
| 25 | Integer | | B |
| | Pops NS then pushes the integer value of NS0 on NS; Int(NS0) to NS; This instruction does not alter ES, BS, or AS. | | |
| 26 | Repeat Numeric | | B |
| | Pushes the value of NS0 on NS; NS0 to NS; This instruction does not alter ES, BS, or AS. | | |
| 27 | Reserved | | R |
| 28 | Reserved | | R |
| 29 | Reserved | | R |
| 30 | Exponentiation | | U |
| 31 | Ln | | U |
| 32 | SIN | | U |
| 33 | COS | | U |
| 34 | TAN | | U |
| 35 | Table Numeric Next | | U |
| 36 | Table Numeric Random | | U |
| 37 | Reserved | | R |
| 38 | Reserved | | R |
| 39 | Reserved | | R |
| 40 | Reserved | | R |
| 41 | Reserved | | R |
| 42 | Reserved | | R |
| 43 | Convert to Alpha | | B |
| | Pops NS and converts NS0 to a alpha string in the form S99999999.999999 where S is either blank or "-". The alpha string is then pushed onto AS. This instruction does not alter ES, or BS. | | |
| 44 | Greater Than (Numeric) | | B |
| | If NS1 is greater than NS0 then pushes "T" on BS, else pushes "F" on BS. This instruction does not alter ES, NS, or AS. | | |
| 45 | Equal To (Numeric) | | B |
| | If NS1 = NS0 then pushes "T" on BS, else pushes "F" on BS. This instruction does not alter ES, NS, | | |

TABLE 12-continued

| OP CODE | DESCRIPTION | OPERAND | STATUS |
|---|---|---|---|
| | or AS. | | |
| 46 | Less Than (Numeric) | | E |
| | If NS1 is less than NS0 then pushes "T" on BS, else pushes "F" on BS. This instruction does not alter ES, NS, or AS. | | |
| 47 | Push Num Parameter | L | B |
| | Pushes the Lth element of the parameter table on NS; param(L) to NS. This instruction does not alter ES, BS, or AS. | | |
| 48 | Pop Num Parameter | L | B |
| | Pops NS into the Lth element of the parameter table; NS0 to param(L). This instruction does not alter ES, BS, or AS. | | |
| 49 | Reserved | | R |
| 50 | Push Alpha Immed | A | B |
| | Pushes the immediate alphanumeric operand designated by A on AS; A to AS. This instruction does not alter ES, BS, or NS. | | |
| 51 | Get Substring | | B |
| | Pops NS two times and pops AS, then pushes a substring of AS0 on AS. The substring consists of those characters which begins at the position of AS0 designated by NS0 and has a length of the remaining number of characters of AS0 or the length designated by NS1 whichever is less; This instruction does not alter ES or BS. | | |
| 52 | Put Substring | | B |
| | Pops NS two times and pops AS two times, then inserts a substring in AS0 into the string in AS1 and pushes the new string on AS. The substring in AS0 begins in position 1 and has a length designated by NS1; It is inserted in the string AS1 starting in the position designated by NS0. This instruction does not alter ES or BS. | | |
| 53 | Find SSTR | | U |
| 54 | Reserved | | R |
| 55 | Reserved | | R |
| 56 | Repeat Alpha | | U |
| 57 | Reserved | | R |
| 58 | Reserved | | R |
| 59 | Reserved | | R |
| 60 | Reserved | | R |
| 61 | Reserved | | R |
| 62 | Reserved | | R |
| 63 | Reserved | | R |
| 64 | Reserved | | R |
| 65 | Table Alpha Next | | U |
| 66 | Table Alpha Random | | U |
| 67 | Reserved | | R |
| 68 | Reserved | | R |
| 69 | Reserved | | R |
| 70 | Reserved | | R |
| 71 | Reserved | | R |
| 72 | Reserved | | R |
| 73 | Convert to Numeric | | U |
| 74 | Greater Than (Alpha) | | B |
| | If AS1 is greater than AS0 then pushes "T" on BS, else pushes "F" on BS. This instruction does not alter ES, NS, or AS. | | |
| 75 | Equal To (Alpha) | | B |
| | If AS1 = AS0 then pushes "T" on BS, else pushes "F" on BS. This instruction does not alter ES, NS, or AS. | | |
| 76 | Less Than (Alpha) | | E |
| | If AS1 is less than AS0 then pushes "T" on BS, else pushes "F" on BS. This instruction does not alter ES, NS, or AS. | | |
| 77 | Push Alpha Parameter | L | B |
| | Pushes the Lth element of the parameter table on AS; param(L) -- AS. This instruction does not alter ES, BS, or NS. | | |
| 78 | Pop Alpha Parameter | L | B |
| | Pops AS into the Lth element of the parameter table; AS0 -- param(L). This instruction does not alter ES, BS, or NS. | | |
| 79 | Reserved | | R |
| 80 | Set Error Code | L | B |
| | Set the Return Code to the value designated by L. This instruction does not alter ES, BS, AS, or NS. | | |
| 81-99 | Read Info into Parameter Table | | P |

NOTE
Explanations of the above op codes refer to NS, AS, BS, & ES.
NS = numeric stack
AS = alpha stack
BS = boolean stack
ES = environmental stack References to NS0, NS1 etc. refer to specific elements on the stack. When an element is "pushed" on the numeric stack, it becomes NS0. If another element is "pushed" on the numeric stack, it becomes NS0 and the prior element "pushed" becomes NS1. In other words, any element "pushed" on the stack becomes NS0 at that time, pushing down other elements by one position.

This also applies to elements on the alpha stack. Those are referred to as AS0, AS1 etc.

STATUS values are:

B = included in all versions of system.
E = Extended; Include only in 32 bit Cobol.
R = Reserved for future use.
U = Non-implemented instruction.
P = Parameter table dependent; used to read system values into elements of the parameter table.

A complete listing of the COBOL Source Code for Formula Calculation is attached in Appendix A.

Certain modifications and improvement will occur to those skilled in the art upon reading of the foregoing description. By way of example, improvements such as syntactical changes to the formula language to allow algebraic formula entry. It should be understood that all such modifications and improvements have been deleted for the sake of conciseness and readability and are properly within the scope of the following claims.

APPENDIX A
SOURCE CODE FOR FORMULA CALCULATION (c) Copyright 1988, 1989
by Cipher Corporation

```
* CPFRMCALC.WS  -  9/16/86
*
* FORMULA CALCULATION WORKING STORAGE
*
* INSTRUCTION STORAGE, STACKS, TRACE BUFFER AND REGISTERS
*
*
* INSTRUCTION STORAGE
*
01 FRM-INSTRUCTION.
    05 FRM-KEY.
        10 FRM-PREFIX                         PIC X(2).
        10 FRM-CODE                           PIC X(6).
        10 FRM-LINE-NO                        PIC 9999 COMP.
    05 FRM-OP                                 PIC 99.
    05 FRM-LITERAL                            PIC X(20).
    05 FRM-CONSTANT-R REDEFINES FRM-LITERAL.
        10 FRM-CONSTANT                       PIC S9(8)V9(6).
        10 FILLER                             PIC X(6).
```

```
    05 FRM-LOCATION-R REDEFINES FRM-LITERAL.
        10 FRM-LOCATION                          PIC 9(4).
        10 FILLER                                PIC X(16).
    05 FRM-BOOLEAN-R REDEFINES FRM-LITERAL.
        10 FRM-BOOLEAN                           PIC X.
        10 FILLER                                PIC X(19).
    05 FRM-COMMENT                               PIC X(30).
*
* TRACE BUFFER
*
*01 FRM-HEADING.
*   05 FILLER            PIC X(22) VALUE "      P Lv   Line    B L".
*   05 FILLER            PIC X(22) VALUE "v    Op   Description   ".
*   05 FILLER            PIC X(22) VALUE "             Constant/Loca".
*   05 FILLER            PIC X(22) VALUE "tion          Literal   ".
*   05 FILLER            PIC X(22) VALUE "   Boolean   Error De".
*   05 FILLER            PIC X(22) VALUE "scription              ".
*01 FRM-PRINT-LINE.
*   05 FILLER                      PIC X(06).
*   05 PRT-FRM-CURR-ENV-LOC        PIC Z9.
*   05 FILLER                      PIC X(04).
*   05 PRT-FRM-LINE-NO             PIC ZZZ9.
*   05 FILLER                      PIC X(04).
*   05 PRT-FRM-CURRENT-BLOCK-COUNT PIC Z9.
*   05 FILLER                      PIC X(04).
*   05 PRT-FRM-OP                  PIC 99.
*   05 FILLER                      PIC X(02).
*   05 PRT-FRM-DESCRIPTION         PIC X(20).
*   05 FILLER                      PIC X(02).
*   05 PRT-FRM-NT1                 PIC -ZZ,ZZZ,ZZZ.ZZZZZZ.
```

```
*       05 FILLER                    PIC X(02).

*       05 PRT-FRM-AT1               PIC X(20).

*       05 FILLER                    PIC X(03).

*       05 PRT-FRM-BT1               PIC X(01).

*       05 FILLER                    PIC X(03).

*       05 PRT-FRM-RETURN-CODE       PIC ZZ.

*       05 FILLER                    PIC X(01).

*       05 PRT-FRM-ERROR-DESC        PIC X(30).

*       05 FILLER                    PIC X(01).

*

*-- PROGRAM CONTROL

*

01 FRM-CURRENT-CODE                  PIC X(6) VALUE SPACES.

01 FRM-STARTING-LOCATION             PIC 9999 COMP VALUE ZERO.

01 FRM-CURRENT-PROGRAM-COUNTER       PIC 9999 COMP VALUE ZERO.

01 FRM-CURRENT-BLOCK-COUNT           PIC 99 COMP VALUE ZERO.

01 FRM-SKIP-BLOCK-COUNT              PIC 99 COMP VALUE ZERO.

01 FRM-NEXT-ENV-LOC                  PIC 99 COMP VALUE 1.

01 FRM-CURR-ENV-LOC                  PIC 99 COMP VALUE 0.

01 FRM-LAST-ENV-LOC                  PIC 99 COMP VALUE 03.

01 FRM-ENV-STACK.

05 FRM-STACK-ELEM OCCURS 03 TIMES.

10 FRM-STACK-CODE PIC X(6).

10 FRM-STACK-STARTING-LOCATION PIC 9999 COMP.

10 FRM-STACK-PROGRAM-COUNTER PIC 9999 COMP.

10 FRM-STACK-BLOCK-COUNT PIC 99 COMP.

*-- NUMERIC OPERATIONS
```

```
*

01 FRM-NT1                          PIC S9(8)V9(6) COMP VALUE ZERO.

01 FRM-NT2                          PIC S9(8)V9(6) COMP VALUE ZERO.

01 FRM-NT3                          PIC S9(8)V9(6) COMP VALUE ZERO.

01 FRM-INTEGER                      PIC S9(8) COMP VALUE ZERO.

01 FRM-NEXT-NUM-LOC                 PIC 99 COMP VALUE 1.

01 FRM-LAST-NUM-LOC                 PIC 99 COMP VALUE 05.

01 FRM-NUM-STACK.

05 FRM-NUM-STACK-ELEM OCCURS 05 TIMES PIC S9(8)V9(6) COMP.

*--APLHA OPERATIONS

*

01 FRM-AT1                          PIC X(20) VALUE SPACES.

01 FRM-AT1-R-1 REDEFINES FRM-AT1.

05 FRM-AT1-C OCCURS 20 TIMES PIC X.

01 FRM-AT1-R-2 REDEFINES FRM-AT1.

05 FRM-AT1-NUM                  PIC -9(8).9(6).

05 FILLER                       PIC X(4).

01 FRM-AT2                          PIC X(20) VALUE SPACES.

01 FRM-AT2-TABLE REDEFINES FRM-AT2.

05 FRM-AT2-C OCCURS 20 TIMES PIC X.

01 FRM-AT1-POS                      PIC 99 VALUE ZERO.

01 FRM-AT2-POS                      PIC 99 VALUE ZERO.

01 FRM-AT1-LEN                      PIC 99 VALUE ZERO.

01 FRM-AT2-LEN                      PIC 99 VALUE ZERO.

01 FRM-NEXT-ALPHA-LOC               PIC 99 COMP VALUE 1.

01 FRM-LAST-ALPHA-LOC               PIC 99 COMP VALUE 05.

01 FRM-ALPHA-STACK.

05 FRM-ALPHA-STACK-ELEM OCCURS 05 TIMES PIC X(20).
```

```
*-- BOOLEAN OPERATIONS
*
01 FRM-BT1                      PIC X VALUE SPACES.
01 FRM-BT2                      PIC X VALUE SPACES.
01 FRM-NEXT-BOOL-LOC            PIC 99 COMP VALUE 1.
01 FRM-LAST-BOOL-LOC            PIC 99 COMP VALUE 05.
01 FRM-BOOL-STACK.
    05 FRM-BOOL-STACK-ELEM OCCURS 05 TIMES PIC X.

*
* CPFRMCALCE.PL  - 6/15/87 (EXTENDED)
*
*           FORMULA CALCULATION
*
* MODIFIED VERSION OF CPFRMCALCB.PL
* INCLUDES EXTENDED CALCULATIONS
*
FORMULA-OPEN SECTION.
FORMULA-OPEN-BEGIN.
    PERFORM FRM-OPEN-FORH-FILE.
    IF WS-OPEN-ERROR NOT = "Y"
        PERFORM FRM-OPEN-FORD-FILE.
        IF WS-OPEN-ERROR NOT = "Y"
            PERFORM FRM-OPEN-TRACE-FILE.

FORMULA-CLOSE SECTION.
FORMULA-CLOSE-BEGIN.
    PERFORM FRM-CLOSE-FORH-FILE.
    PERFORM FRM-CLOSE-FORD-FILE.
```

```
        PERFORM FRM-CLOSE-TRACE-FILE.

FORMULA-CALC SECTION.

FORMULA-CALC-BEGIN.

MOVE O TO FRM-ERROR-CODE,

FRM-RETURN-CODE,

FRM-CURRENT-PROGRAM-COUNTER,

FRM-CURRENT-BLOCK-COUNT.

MOVE 1 TO FRM-NEXT-ENV-LOC,

FRM-NEXT-NUM-LOC,

FRM-NEXT-ALPHA-LOC,

FRM-NEXT-BOOL-LOC.

MOVE FRM-PASS-CODE TO FRM-CURRENT-CODE.

MOVE FRM-PASS-PREFIX TO FORH-PREFIX.

MOVE FRM-CURRENT-CODE TO FORH-CODE.

PERFORM FRM-READ-FORH-FILE.

MOVE FORH-TRACE-FLAG TO FRM-TRACE-FLAG.

PERFORM FRM-GET-INSTRUCTION.

IF FRM-RETURN-CODE = FRM-NORMAL-RETURN

PERFORM FRM-CALC.

FRM-CALC SECTION.

FRM-CALC-BEGIN.

GO TO

FRM-OP-1

FRM-OP-2

FRM-OP-3

FRM-OP-4
```

FRM-OP-5

FRM-OP-6

FRM-OP-7

FRM-OP-8

FRM-OP-9

FRM-OP-10

FRM-OP-11

FRM-OP-12

FRM-OP-13

FRM-OP-14

FRM-OP-15

FRM-OP-16

FRM-OP-17

FRM-OP-18

FRM-OP-19

FRM-OP-20

FRM-OP-21

FRM-OP-22

FRM-OP-23

FRM-OP-24

FRM-OP-25

FRM-OP-26

FRM-OP-27

FRM-OP-28

FRM-OP-29

FRM-OP-30

FRM-OP-31

FRM-OP-32

FRM-OP-33

FRM-OP-34

FRM-OP-35

FRM-OP-36

FRM-OP-37

FRM-OP-38

FRM-OP-39

FRM-OP-40

FRM-OP-41

FRM-OP-42

FRM-OP-43

FRM-OP-44

FRM-OP-45

FRM-OP-46

FRM-OP-47

FRM-OP-48

FRM-OP-49

FRM-OP-50

FRM-OP-51

FRM-OP-52

FRM-OP-53

FRM-OP-54

FRM-OP-55

FRM-OP-56

FRM-OP-57

FRM-OP-58

FRM-OP-59

FRM-OP-60

FRM-OP-61

FRM-OP-62

```
            FRM-OP-63

FRM-OP-64

FRM-OP-65

FRM-OP-66

FRM-OP-67

FRM-OP-68

FRM-OP-69

FRM-OP-70

FRM-OP-71

FRM-OP-72

FRM-OP-73

FRM-OP-74

FRM-OP-75

FRM-OP-76

FRM-OP-77

FRM-OP-78

FRM-OP-79

FRM-OP-80

DEPENDING ON FRM-OP.

PERFORM FRM-READ-PARAMS.

FRM-OP-END.

PERFORM FRM-PRINT-TRACE-RECORD.

FRM-OP-END-1.

IF FRM-RETURN-CODE = 0 AND FRM-CURRENT-BLOCK-COUNT > 0

PERFORM FRM-GET-NEXT-INSTRUCTION

IF FRM-RETURN-CODE = FRM-NORMAL-RETURN

GO TO FRM-CALC-BEGIN

ELSE
```

```
            PERFORM FRM-PRINT-TRACE-RECORD

GO TO FORMULA-EXIT

ELSE

GO TO FORMULA-EXIT.

*
* BEGIN BLOCK
*
FRM-OP-1.

ADD 1 TO FRM-CURRENT-BLOCK-COUNT.

MOVE FRM-NORMAL-RETURN TO FRM-RETURN-CODE.

GO TO FRM-OP-END.

*
* END BLOCK
*
FRM-OP-2.

SUBTRACT 1 FROM FRM-CURRENT-BLOCK-COUNT.

MOVE FRM-NORMAL-RETURN TO FRM-RETURN-CODE.

GO TO FRM-OP-END.

*
* PERFORM (IMMEDIATE)
*
FRM-OP-3.

PERFORM FRM-PUSH-ENV.

IF FRM-RETURN-CODE NOT = FRM-NORMAL-RETURN

GO TO FRM-OP-END.

MOVE 0 TO FRM-CURRENT-BLOCK-COUNT.
```

```
    MOVE FRM-LOCATION TO FRM-CURRENT-PROGRAM-COUNTER.

PERFORM FRM-GET-INSTRUCTION.

IF FRM-RETURN-CODE NOT = FRM-NORMAL-RETURN

GO TO FRM-OP-END.

PERFORM FRM-CALC.

IF FRM-RETURN-CODE NOT = FRM-NORMAL-RETURN

PERFORM FRM-POP-ENV

GO TO FRM-OP-END.

PERFORM FRM-POP-ENV.

IF FRM-RETURN-CODE NOT = FRM-NORMAL-RETURN

GO TO FRM-OP-END.

PERFORM FRM-GET-INSTRUCTION.

GO TO FRM-OP-END.

*
* PERFORM WHILE TRUE (IMMEDIATE)
*
FRM-OP-4.

PERFORM FRM-PUSH-ENV.

IF FRM-RETURN-CODE NOT = FRM-NORMAL-RETURN

GO TO FRM-OP-END.

MOVE FRM-LOCATION TO FRM-STARTING-LOCATION.

FRM-OP-4-LOOP.

PERFORM FRM-TOP-BS.

IF FRM-RETURN-CODE NOT = FRM-NORMAL-RETURN

GO TO FRM-OP-END.

IF FRM-BT1 = "T"

MOVE 0 TO FRM-CURRENT-BLOCK-COUNT

MOVE FRM-STARTING-LOCATION
```

```
            TO FRM-CURRENT-PROGRAM-COUNTER

PERFORM FRM-GET-INSTRUCTION

IF FRM-RETURN-CODE NOT = FRM-NORMAL-RETURN

GO TO FRM-OP-END

ELSE

PERFORM FRM-CALC

IF FRM-RETURN-CODE NOT = FRM-NORMAL-RETURN

PERFORM FRM-POP-ENV

PERFORM FRM-GET-INSTRUCTION

GO TO FRM-OP-END

ELSE

GO TO FRM-OP-4-LOOP.

PERFORM FRM-POP-ENV.

IF FRM-RETURN-CODE NOT = FRM-NORMAL-RETURN

GO TO FRM-OP-END.

PERFORM FRM-GET-INSTRUCTION.

GO TO FRM-OP-END.

*
* PERFORM UNTIL TRUE (IMMEDIATE)
*
FRM-OP-5.

PERFORM FRM-PUSH-ENV.

IF FRM-RETURN-CODE NOT = FRM-NORMAL-RETURN

GO TO FRM-OP-END.

MOVE FRM-LOCATION TO FRM-STARTING-LOCATION.
FRM-OP-5-LOOP.

PERFORM FRM-TOP-BS.
```

```
    IF FRM-RETURN-CODE NOT = FRM-NORMAL-RETURN

GO TO FRM-OP-END.

IF FRM-BT1 NOT = "T"

MOVE 0 TO FRM-CURRENT-BLOCK-COUNT

MOVE FRM-STARTING-LOCATION

TO FRM-CURRENT-PROGRAM-COUNTER

PERFORM FRM-GET-INSTRUCTION

IF FRM-RETURN-CODE NOT = FRM-NORMAL-RETURN

GO TO FRM-OP-END

ELSE

PERFORM FRM-CALC

IF FRM-RETURN-CODE NOT = FRM-NORMAL-RETURN

PERFORM FRM-POP-ENV

GO TO FRM-OP-END

ELSE

GO TO FRM-OP-5-LOOP.

PERFORM FRM-POP-ENV.

IF FRM-RETURN-CODE NOT = FRM-NORMAL-RETURN

GO TO FRM-OP-END.

PERFORM FRM-GET-INSTRUCTION.

GO TO FRM-OP-END.

*
* CALL (IMMEDIATE)
*
FRM-OP-6.

PERFORM FRM-PUSH-ENV.

IF FRM-RETURN-CODE NOT = FRM-NORMAL-RETURN

GO TO FRM-OP-END.
```

```
    MOVE FRM-LITERAL TO FRM-CURRENT-CODE.

MOVE 0 TO FRM-CURRENT-BLOCK-COUNT.

MOVE 0 TO FRM-CURRENT-PROGRAM-COUNTER.

PERFORM FRM-GET-INSTRUCTION.

IF FRM-RETURN-CODE NOT = FRM-NORMAL-RETURN

GO TO FRM-OP-END.

PERFORM FRM-CALC.

IF FRM-RETURN-CODE NOT = FRM-NORMAL-RETURN

PERFORM FRM-POP-ENV

GO TO FRM-OP-END.

PERFORM FRM-POP-ENV.

IF FRM-RETURN-CODE NOT = FRM-NORMAL-RETURN

GO TO FRM-OP-END.

PERFORM FRM-GET-INSTRUCTION.

GO TO FRM-OP-END.

*
* IF TRUE THEN
*
FRM-OP-7.

PERFORM FRM-PRINT-TRACE-RECORD.

PERFORM FRM-GET-NEXT-INSTRUCTION.

IF FRM-RETURN-CODE NOT = FRM-NORMAL-RETURN

GO TO FRM-OP-END.

PERFORM FRM-TOP-BS.

IF FRM-RETURN-CODE NOT = FRM-NORMAL-RETURN

GO TO FRM-OP-END.

IF FRM-BT1 = "T"

PERFORM FRM-CALC
```

```
        ELSE

PERFORM FRM-SKIP.

GO TO FRM-OP-END-1.

*

* IF NOT TRUE THEN

*

FRM-OP-8.

PERFORM FRM-PRINT-TRACE-RECORD.

PERFORM FRM-GET-NEXT-INSTRUCTION

IF FRM-RETURN-CODE NOT = FRM-NORMAL-RETURN

GO TO FRM-OP-END.

PERFORM FRM-TOP-BS.

IF FRM-RETURN-CODE NOT = FRM-NORMAL-RETURN

GO TO FRM-OP-END.

IF FRM-BT1 NOT = "T"

PERFORM FRM-CALC

GO TO FRM-OP-END

ELSE

PERFORM FRM-SKIP
            GO TO FRM-OP-END-1.

*

* NO OPERATION

*

FRM-OP-9.

MOVE FRM-NORMAL-RETURN TO FRM-RETURN-CODE.

GO TO FRM-OP-END.
```

```
*
* PUSH BOOLEAN (IMMEDIATE)
*
FRM-OP-10.

MOVE FRM-BOOLEAN TO FRM-BT1.

PERFORM FRM-PUSH-BS.

GO TO FRM-OP-END.

*
* AND
*
FRM-OP-11.

PERFORM FRM-POP-BS-2.

IF FRM-RETURN-CODE NOT = FRM-NORMAL-RETURN
        GO TO FRM-OP-END.

IF FRM-BT1 = "T" AND FRM-BT2 = "T"

MOVE "T" TO FRM-BT1

ELSE

MOVE "F" TO FRM-BT1.

PERFORM FRM-PUSH-BS.

GO TO FRM-OP-END.

*
* OR
*
FRM-OP-12.

PERFORM FRM-POP-BS-2.

IF FRM-RETURN-CODE NOT = FRM-NORMAL-RETURN
```

```
        GO TO FRM-OP-END.

IF FRM-BT1 = "T" OR FRM-BT2 = "T"

MOVE "T" TO FRM-BT1

ELSE

MOVE "F" TO FRM-BT1.

PERFORM FRM-PUSH-BS.

GO TO FRM-OP-END.

*
* NOT
*

FRM-OP-13.

PERFORM FRM-POP-BS.

IF FRM-RETURN-CODE NOT = FRM-NORMAL-RETURN

GO TO FRM-OP-END.

MOVE FRM-BT1 TO FRM-BT2.

IF FRM-BT1 = "T"

MOVE "F" TO FRM-BT1

ELSE

MOVE "T" TO FRM-BT1.

PERFORM FRM-PUSH-BS.

GO TO FRM-OP-END.

FRM-OP-14.

MOVE FRM-RESERVED-INST-ERR TO FRM-RETURN-CODE.

GO TO FRM-OP-END.

FRM-OP-15.

MOVE FRM-UNIMPLIMENTED-INST-ERR TO FRM-RETURN-CODE.
```

```
        GO TO FRM-OP-END.

FRM-OP-16.

MOVE FRM-UNIMPLIMENTED-INST-ERR TO FRM-RETURN-CODE.

GO TO FRM-OP-END.

*

* PUSH BOOLEAN PARAMETER (IMMEDIATE)

*

FRM-OP-17.

IF FRM-LOCATION > FRM-PARAM-MAX

OR FRM-LOCATION < 1
        MOVE FRM-PARAM-OUT-OF-RANGE-ERR TO FRM-RETURN-CODE

ELSE

MOVE FRM-PARAM-B(FRM-LOCATION) TO FRM-BT1

PERFORM FRM-PUSH-BS.

GO TO FRM-OP-END.

*

* POP BOOLEAN PARAMETER (IMMEDIATE)

*

FRM-OP-18.

PERFORM FRM-POP-BS.

IF FRM-RETURN-CODE NOT = FRM-NORMAL-RETURN

GO TO FRM-OP-END.

IF FRM-LOCATION > FRM-PARAM-MAX

OR FRM-LOCATION < 1

MOVE FRM-PARAM-OUT-OF-RANGE-ERR TO FRM-RETURN-CODE

ELSE
```

MOVE FRM-BT1 TO FRM-PARAM-B(FRM-LOCATION)

MOVE FRM-NORMAL-RETURN TO FRM-RETURN-CODE.

GO TO FRM-OP-END.

FRM-OP-19.

MOVE FRM-RESERVED-INST-ERR TO FRM-RETURN-CODE.

GO TO FRM-OP-END.

*
* PUSH NUMERIC (IMMEDIATE)
*

FRM-OP-20.

MOVE FRM-CONSTANT TO FRM-NT1.

PERFORM FRM-PUSH-NS.

GO TO FRM-OP-END.

*
* ADD
*

FRM-OP-21.

PERFORM FRM-POP-NS-2.

IF FRM-RETURN-CODE NOT = FRM-NORMAL-RETURN

GO TO FRM-OP-END.

ADD FRM-NT2 TO FRM-NT1.

PERFORM FRM-PUSH-NS.

GO TO FRM-OP-END.

*
* SUBTRACT

```
FRM-OP-22.

PERFORM FRM-POP-NS-2.

IF FRM-RETURN-CODE NOT = FRM-NORMAL-RETURN
        GO TO FRM-OP-END.

SUBTRACT FRM-NT2 FROM FRM-NT1.

PERFORM FRM-PUSH-NS.

GO TO FRM-OP-END.

*
* MULTIPLY
*

FRM-OP-23.

PERFORM FRM-POP-NS-2.

IF FRM-RETURN-CODE NOT = FRM-NORMAL-RETURN
        GO TO FRM-OP-END.

MULTIPLY FRM-NT2 BY FRM-NT1 GIVING FRM-NT3.

MOVE FRM-NT3 TO FRM-NT1.

PERFORM FRM-PUSH-NS.

GO TO FRM-OP-END.

*
* DIVIDE
*

FRM-OP-24.

PERFORM FRM-POP-NS-2.

IF FRM-RETURN-CODE NOT = FRM-NORMAL-RETURN
        GO TO FRM-OP-END.

IF FRM-NT2 = ZERO
```

```
        MOVE FRM-DIVIDE-BY-ZERO-ERR TO FRM-RETURN-CODE

GO TO FRM-OP-END.

DIVIDE FRM-NT1 BY FRM-NT2 GIVING FRM-NT3.

MOVE FRM-NT3 TO FRM-NT1.

PERFORM FRM-PUSH-NS.

GO TO FRM-OP-END.

*

* INTEGER

*

FRM-OP-25.

PERFORM FRM-POP-NS.

IF FRM-RETURN-CODE NOT = FRM-NORMAL-RETURN

GO TO FRM-OP-END.

MOVE FRM-NT1 TO FRM-INTEGER.

MOVE 0 TO FRM-NT1.

MOVE FRM-INTEGER TO FRM-NT1.

PERFORM FRM-PUSH-NS.

GO TO FRM-OP-END.

*

* REPEAT NUMERIC

*

FRM-OP-26.

PERFORM FRM-POP-NS.

IF FRM-RETURN-CODE NOT = FRM-NORMAL-RETURN

GO TO FRM-OP-END.

PERFORM FRM-PUSH-NS.

IF FRM-RETURN-CODE NOT = FRM-NORMAL-RETURN
```

```
        GO TO FRM-OP-END.

PERFORM FRM-PUSH-NS.

GO TO FRM-OP-END.

FRM-OP-27.

MOVE FRM-RESERVED-INST-ERR TO FRM-RETURN-CODE.

GO TO FRM-OP-END.

FRM-OP-28.

MOVE FRM-RESERVED-INST-ERR TO FRM-RETURN-CODE.

GO TO FRM-OP-END.

FRM-OP-29.

MOVE FRM-RESERVED-INST-ERR TO FRM-RETURN-CODE.

GO TO FRM-OP-END.

*
* EXPONENTIATION
*
FRM-OP-30.

MOVE FRM-UNIMPLIMENTED-INST-ERR TO FRM-RETURN-CODE.

GO TO FRM-OP-END.

*
* LN
*
```

FRM-OP-31.

MOVE FRM-UNIMPLIMENTED-INST-ERR TO FRM-RETURN-CODE.

GO TO FRM-OP-END.

*

* SINE

*

FRM-OP-32.

MOVE FRM-UNIMPLIMENTED-INST-ERR TO FRM-RETURN-CODE.

GO TO FRM-OP-END.

*

* COSINE

*

FRM-OP-33.

MOVE FRM-UNIMPLIMENTED-INST-ERR TO FRM-RETURN-CODE.

GO TO FRM-OP-END.

*

* TANGENT

*

FRM-OP-34.

MOVE FRM-UNIMPLIMENTED-INST-ERR TO FRM-RETURN-CODE.

GO TO FRM-OP-END.

FRM-OP-35.

```
    MOVE FRM-UNIMPLIMENTED-INST-ERR TO FRM-RETURN-CODE.

GO TO FRM-OP-END.

FRM-OP-36.

MOVE FRM-UNIMPLIMENTED-INST-ERR TO FRM-RETURN-CODE.

GO TO FRM-OP-END.

FRM-OP-37.

MOVE FRM-RESERVED-INST-ERR TO FRM-RETURN-CODE.

GO TO FRM-OP-END.

FRM-OP-38.

MOVE FRM-RESERVED-INST-ERR TO FRM-RETURN-CODE.

GO TO FRM-OP-END.

FRM-OP-39.

MOVE FRM-RESERVED-INST-ERR TO FRM-RETURN-CODE.

GO TO FRM-OP-END.

FRM-OP-40.

MOVE FRM-RESERVED-INST-ERR TO FRM-RETURN-CODE.

GO TO FRM-OP-END.

FRM-OP-41.

MOVE FRM-RESERVED-INST-ERR TO FRM-RETURN-CODE.

GO TO FRM-OP-END.

FRM-OP-42.

MOVE FRM-RESERVED-INST-ERR TO FRM-RETURN-CODE.

GO TO FRM-OP-END.
```

```
*
* CONVERT NUMERIC TO ALPHA
*
FRM-OP-43.

PERFORM FRM-POP-NS.

IF FRM-RETURN-CODE NOT = FRM-NORMAL-RETURN

GO TO FRM-OP-END.

MOVE SPACES TO FRM-AT1.

MOVE FRM-NT1 TO FRM-AT1-NUM.

PERFORM FRM-PUSH-AS.

IF FRM-RETURN-CODE NOT = FRM-NORMAL-RETURN

GO TO FRM-OP-END.

GO TO FRM-OP-END.

*
* GREATER THAN (NUMERIC)
*
FRM-OP-44.

PERFORM FRM-POP-NS-2.

IF FRM-RETURN-CODE NOT = FRM-NORMAL-RETURN

GO TO FRM-OP-END.

IF FRM-NT1 > FRM-NT2

MOVE "T" TO FRM-BT1

ELSE

MOVE "F" TO FRM-BT1.

PERFORM FRM-PUSH-BS.

IF FRM-RETURN-CODE NOT = FRM-NORMAL-RETURN

GO TO FRM-OP-END.

PERFORM FRM-PUSH-NS-2.
```

```
        GO TO FRM-OP-END.

*
* EQUAL TO (NUMERIC)
*
FRM-OP-45.

PERFORM FRM-POP-NS-2.

IF FRM-RETURN-CODE NOT = FRM-NORMAL-RETURN

GO TO FRM-OP-END.

IF FRM-NT1 = FRM-NT2

MOVE "T" TO FRM-BT1

ELSE

MOVE "F" TO FRM-BT1.

PERFORM FRM-PUSH-BS.

IF FRM-RETURN-CODE NOT = FRM-NORMAL-RETURN

GO TO FRM-OP-END.

PERFORM FRM-PUSH-NS-2.

GO TO FRM-OP-END.

*
* LESS THAN (NUMERIC)
*
FRM-OP-46.

PERFORM FRM-POP-NS.

IF FRM-RETURN-CODE NOT = FRM-NORMAL-RETURN

GO TO FRM-OP-END.

MOVE FRM-NT1 TO FRM-NT2.

PERFORM FRM-POP-NS.

IF FRM-RETURN-CODE NOT = FRM-NORMAL-RETURN

GO TO FRM-OP-END.
```

```
    IF FRM-NT1 < FRM-NT2

MOVE "T" TO FRM-BT1

ELSE

MOVE "F" TO FRM-BT1.

PERFORM FRM-PUSH-BS.

IF FRM-RETURN-CODE NOT = FRM-NORMAL-RETURN

GO TO FRM-OP-END.

PERFORM FRM-PUSH-NS-2.

GO TO FRM-OP-END.

*
* PUSH NUMERIC PARAMETER
*

FRM-OP-47.

IF FRM-LOCATION > FRM-PARAM-MAX

OR FRM-LOCATION < 1

MOVE FRM-PARAM-OUT-OF-RANGE-ERR TO FRM-RETURN-CODE

GO TO FRM-OP-END.

MOVE FRM-PARAM-N(FRM-LOCATION) TO FRM-NT1.

PERFORM FRM-PUSH-NS.

GO TO FRM-OP-END.

*
* POP NUMERIC PARAMETER (IMMEDIATE)
*

FRM-OP-48.

PERFORM FRM-POP-NS.

IF FRM-RETURN-CODE NOT = FRM-NORMAL-RETURN

GO TO FRM-OP-END.
```

```
    IF FRM-LOCATION > FRM-PARAM-MAX

OR FRM-LOCATION < 1

MOVE FRM-PARAM-OUT-OF-RANGE-ERR TO FRM-RETURN-CODE

GO TO FRM-OP-END.

MOVE FRM-NT1 TO FRM-PARAM-N(FRM-LOCATION).

MOVE FRM-NORMAL-RETURN TO FRM-RETURN-CODE.

GO TO FRM-OP-END.

FRM-OP-49.

MOVE FRM-UNIMPLIMENTED-INST-ERR TO FRM-RETURN-CODE.

GO TO FRM-OP-END.

*

* PUSH ALPHA (IMMEDIATE)

*

FRM-OP-50.

MOVE FRM-LITERAL TO FRM-AT1.

PERFORM FRM-PUSH-AS.

GO TO FRM-OP-END.

*

* GET SUBSTRING (CALL: NS0 = POS, NS1 = LENGTH, AS0 = STRING;
*                RETURN: AS0 = SUBSTRING)
*

FRM-OP-51.

PERFORM FRM-POP-NS-2.

IF FRM-RETURN-CODE NOT = FRM-NORMAL-RETURN

GO TO FRM-OP-END.

PERFORM FRM-CHECK-POS-LEN.

IF FRM-RETURN-CODE NOT = FRM-NORMAL-RETURN
```

```
        GO TO FRM-OP-END.

MOVE FRM-NT1 TO FRM-AT1-LEN,
                   FRM-AT2-LEN.

MOVE FRM-NT2 TO FRM-AT2-POS.

PERFORM FRM-POP-AS.

IF FRM-RETURN-CODE NOT = FRM-NORMAL-RETURN
        GO TO FRM-OP-END.

MOVE FRM-AT1 TO FRM-AT2.

MOVE SPACES TO FRM-AT1.

MOVE 1 TO FRM-AT1-POS.

PERFORM FRM-MOVE-CHAR UNTIL FRM-AT1-LEN = ZERO.

PERFORM FRM-PUSH-AS.

GO TO FRM-OP-END.

*
* PUT  SUBSTRING (CALL: NS0 = POS, NS1 = LENGTH, AS0 = SUBSTRING,
*               AS1 = STRING; RETURN AS0 = STRING)
*
FRM-OP-52.

PERFORM FRM-POP-NS-2.

IF FRM-RETURN-CODE NOT = FRM-NORMAL-RETURN
        GO TO FRM-OP-END.

PERFORM FRM-CHECK-POS-LEN.

IF FRM-RETURN-CODE NOT = FRM-NORMAL-RETURN
        GO TO FRM-OP-END.

MOVE FRM-NT1 TO FRM-AT1-LEN,
                   FRM-AT2-LEN.

MOVE FRM-NT2 TO FRM-AT1-POS.

PERFORM FRM-POP-AS.

IF FRM-RETURN-CODE NOT = FRM-NORMAL-RETURN
```

```
        GO TO FRM-OP-END.

MOVE FRM-AT1 TO FRM-AT2.

PERFORM FRM-POP-AS.

IF FRM-RETURN-CODE NOT = FRM-NORMAL-RETURN

GO TO FRM-OP-END.

MOVE 1 TO FRM-AT2-POS.

PERFORM FRM-MOVE-CHAR UNTIL FRM-AT1-LEN = ZERO.

PERFORM FRM-PUSH-AS.

GO TO FRM-OP-END.

FRM-OP-53.

MOVE FRM-UNIMPLIMENTED-INST-ERR TO FRM-RETURN-CODE.

GO TO FRM-OP-END.

FRM-OP-54.

MOVE FRM-RESERVED-INST-ERR TO FRM-RETURN-CODE.

GO TO FRM-OP-END.

FRM-OP-55.

MOVE FRM-RESERVED-INST-ERR TO FRM-RETURN-CODE.

GO TO FRM-OP-END.

*
* REPEAT ALPHA
*
FRM-OP-56.

MOVE FRM-UNIMPLIMENTED-INST-ERR TO FRM-RETURN-CODE.

GO TO FRM-OP-END.
```

```
FRM-OP-57.

MOVE FRM-RESERVED-INST-ERR TO FRM-RETURN-CODE.

GO TO FRM-OP-END.

FRM-OP-58.

MOVE FRM-RESERVED-INST-ERR TO FRM-RETURN-CODE.

GO TO FRM-OP-END.

FRM-OP-59.

MOVE FRM-RESERVED-INST-ERR TO FRM-RETURN-CODE.

GO TO FRM-OP-END.

FRM-OP-60.

MOVE FRM-RESERVED-INST-ERR TO FRM-RETURN-CODE.

GO TO FRM-OP-END.

FRM-OP-61.

MOVE FRM-RESERVED-INST-ERR TO FRM-RETURN-CODE.

GO TO FRM-OP-END.

FRM-OP-62.

MOVE FRM-RESERVED-INST-ERR TO FRM-RETURN-CODE.

GO TO FRM-OP-END.

FRM-OP-63.

MOVE FRM-RESERVED-INST-ERR TO FRM-RETURN-CODE.

GO TO FRM-OP-END.

FRM-OP-64.
```

MOVE FRM-RESERVED-INST-ERR TO FRM-RETURN-CODE.

GO TO FRM-OP-END.

FRM-OP-65.

MOVE FRM-UNIMPLIMENTED-INST-ERR TO FRM-RETURN-CODE.

GO TO FRM-OP-END.

FRM-OP-66.

MOVE FRM-UNIMPLIMENTED-INST-ERR TO FRM-RETURN-CODE.

GO TO FRM-OP-END.

FRM-OP-67.

MOVE FRM-RESERVED-INST-ERR TO FRM-RETURN-CODE.

GO TO FRM-OP-END.

FRM-OP-68.

MOVE FRM-RESERVED-INST-ERR TO FRM-RETURN-CODE.

GO TO FRM-OP-END.

FRM-OP-69.

MOVE FRM-RESERVED-INST-ERR TO FRM-RETURN-CODE.

GO TO FRM-OP-END.

FRM-OP-70.

MOVE FRM-RESERVED-INST-ERR TO FRM-RETURN-CODE.

GO TO FRM-OP-END.

FRM-OP-71.

MOVE FRM-RESERVED-INST-ERR TO FRM-RETURN-CODE.

GO TO FRM-OP-END.

FRM-OP-72.

MOVE FRM-RESERVED-INST-ERR TO FRM-RETURN-CODE.

GO TO FRM-OP-END.

*
* CONVERT TO NUMERIC
*

FRM-OP-73.

MOVE FRM-UNIMPLIMENTED-INST-ERR TO FRM-RETURN-CODE.

GO TO FRM-OP-END.

*
* GREATER THAN (ALPHA)
*

FRM-OP-74.

PERFORM FRM-POP-AS-2.

IF FRM-RETURN-CODE NOT = FRM-NORMAL-RETURN

GO TO FRM-OP-END.

IF FRM-AT1 > FRM-AT2

MOVE "T" TO FRM-BT1

ELSE

MOVE "F" TO FRM-BT1.

PERFORM FRM-PUSH-BS.

IF FRM-RETURN-CODE NOT = FRM-NORMAL-RETURN

GO TO FRM-OP-END.

PERFORM FRM-PUSH-AS-2.

GO TO FRM-OP-END.

*

```
* EQUAL TO (ALPHA)
*
FRM-OP-75.

PERFORM FRM-POP-AS-2.

IF FRM-RETURN-CODE NOT = FRM-NORMAL-RETURN

GO TO FRM-OP-END.

IF FRM-AT1 = FRM-AT2

MOVE "T" TO FRM-BT1

ELSE

MOVE "F" TO FRM-BT1.

PERFORM FRM-PUSH-BS.

IF FRM-RETURN-CODE NOT = FRM-NORMAL-RETURN

GO TO FRM-OP-END.

PERFORM FRM-PUSH-AS-2.

GO TO FRM-OP-END.

*
* LESS THAN (ALPHA)
*
FRM-OP-76.

PERFORM FRM-POP-AS-2.

IF FRM-RETURN-CODE NOT = FRM-NORMAL-RETURN

GO TO FRM-OP-END.

IF FRM-AT1 < FRM-AT2

MOVE "T" TO FRM-BT1

ELSE

MOVE "F" TO FRM-BT1.

PERFORM FRM-PUSH-BS.

IF FRM-RETURN-CODE NOT = FRM-NORMAL-RETURN
```

```
        GO TO FRM-OP-END.

PERFORM FRM-PUSH-AS-2.

GO TO FRM-OP-END.

*

* PUSH ALPHA PARAMETER (IMMEDIATE)

*

FRM-OP-77.

IF FRM-LOCATION > FRM-PARAM-MAX

OR FRM-LOCATION < 1

MOVE FRM-PARAM-OUT-OF-RANGE-ERR TO FRM-RETURN-CODE

GO TO FRM-OP-END.

MOVE FRM-PARAM-A(FRM-LOCATION) TO FRM-AT1.

PERFORM FRM-PUSH-AS.

GO TO FRM-OP-END.

*

* POP ALPHA PARAMETER (IMMEDIATE)

*

FRM-OP-78.

PERFORM FRM-POP-AS.

IF FRM-RETURN-CODE NOT = FRM-NORMAL-RETURN

GO TO FRM-OP-END.

IF FRM-LOCATION > FRM-PARAM-MAX

OR FRM-LOCATION < 1

MOVE FRM-PARAM-OUT-OF-RANGE-ERR TO FRM-RETURN-CODE

GO TO FRM-OP-END.

MOVE FRM-AT1 TO FRM-PARAM-A(FRM-LOCATION).

MOVE FRM-NORMAL-RETURN TO FRM-RETURN-CODE.
```

```
        GO TO FRM-OP-END.

FRM-OP-79.

MOVE FRM-RESERVED-INST-ERR TO FRM-RETURN-CODE.

GO TO FRM-OP-END.

*

* Set Error Code

*

FRM-OP-80.

MOVE FRM-LOCATION TO FRM-ERROR-CODE.

MOVE FRM-NORMAL-RETURN TO FRM-RETURN-CODE.

GO TO FRM-OP-END.

FORMULA-EXIT.

EXIT.

*

* DOUBLE STACK ROUTINES

*

FRM-PUSH-NS-2 SECTION.

FRM-PUSH-NS-2-BEGIN.

PERFORM FRM-PUSH-NS.

IF FRM-RETURN-CODE = FRM-NORMAL-RETURN

MOVE FRM-NT2 TO FRM-NT1

PERFORM FRM-PUSH-NS.

FRM-POP-NS-2 SECTION.
```

```
FRM-POP-NS-2-BEGIN.

PERFORM FRM-POP-NS.

IF FRM-RETURN-CODE = FRM-NORMAL-RETURN

MOVE FRM-NT1 TO FRM-NT2

PERFORM FRM-POP-NS.

FRM-PUSH-AS-2 SECTION.

FRM-PUSH-AS-2-BEGIN.

PERFORM FRM-PUSH-AS.

IF FRM-RETURN-CODE = FRM-NORMAL-RETURN

MOVE FRM-AT2 TO FRM-AT1

PERFORM FRM-PUSH-AS.

FRM-POP-AS-2 SECTION.

FRM-POP-AS-2-BEGIN.

PERFORM FRM-POP-AS.

IF FRM-RETURN-CODE = FRM-NORMAL-RETURN

MOVE FRM-AT1 TO FRM-AT2

PERFORM FRM-POP-AS.

FRM-POP-BS-2 SECTION.

FRM-POP-BS-2-BEGIN.

PERFORM FRM-POP-BS.

IF FRM-RETURN-CODE = FRM-NORMAL-RETURN

MOVE FRM-BT1 TO FRM-BT2

PERFORM FRM-POP-BS.

*

* STACK ROUTINES
```

```
*

FRM-PUSH-ENV SECTION.

FRM-PUSH-ENV-BEGIN.

IF FRM-NEXT-ENV-LOC NOT > FRM-LAST-ENV-LOC

MOVE FRM-CURRENT-CODE TO

FRM-STACK-CODE(FRM-NEXT-ENV-LOC)

MOVE FRM-STARTING-LOCATION TO

FRM-STACK-STARTING-LOCATION(FRM-NEXT-ENV-LOC)

MOVE FRM-CURRENT-PROGRAM-COUNTER TO

FRM-STACK-PROGRAM-COUNTER(FRM-NEXT-ENV-LOC)

MOVE FRM-CURRENT-BLOCK-COUNT TO

FRM-STACK-BLOCK-COUNT(FRM-NEXT-ENV-LOC)

ADD 1 TO FRM-NEXT-ENV-LOC

MOVE FRM-NEXT-ENV-LOC TO FRM-CURR-ENV-LOC

SUBTRACT 1 FROM FRM-CURR-ENV-LOC

MOVE FRM-NORMAL-RETURN TO FRM-RETURN-CODE

ELSE

MOVE FRM-ENV-STACK-OVERFLOW-ERR TO FRM-RETURN-CODE.

FRM-POP-ENV SECTION.

FRM-POP-ENV-BEGIN.

IF FRM-NEXT-ENV-LOC > 1

SUBTRACT 1 FROM FRM-NEXT-ENV-LOC

MOVE FRM-NEXT-ENV-LOC TO FRM-CURR-ENV-LOC

SUBTRACT 1 FROM FRM-CURR-ENV-LOC

MOVE FRM-STACK-CODE(FRM-NEXT-ENV-LOC) TO

FRM-CURRENT-CODE

MOVE FRM-STACK-STARTING-LOCATION(FRM-NEXT-ENV-LOC) TO

FRM-STARTING-LOCATION
```

```
            MOVE FRM-STACK-PROGRAM-COUNTER(FRM-NEXT-ENV-LOC) TO
                FRM-CURRENT-PROGRAM-COUNTER
            MOVE FRM-STACK-BLOCK-COUNT(FRM-NEXT-ENV-LOC) TO
                FRM-CURRENT-BLOCK-COUNT
        ELSE
            MOVE FRM-ENV-STACK-UNDERFLOW-ERR TO FRM-RETURN-CODE.

FRM-PUSH-BS SECTION.

FRM-PUSH-BS-BEGIN.

IF FRM-NEXT-BOOL-LOC NOT > FRM-LAST-BOOL-LOC
            MOVE FRM-BT1 TO
                FRM-BOOL-STACK-ELEM(FRM-NEXT-BOOL-LOC)
            ADD 1 TO FRM-NEXT-BOOL-LOC
            MOVE FRM-NORMAL-RETURN TO FRM-RETURN-CODE
        ELSE
            MOVE FRM-BOOL-STACK-OVERFLOW-ERR TO FRM-RETURN-CODE.

FRM-POP-BS SECTION.

FRM-POP-BS-BEGIN.

IF FRM-NEXT-BOOL-LOC > 1
            SUBTRACT 1 FROM FRM-NEXT-BOOL-LOC
            MOVE FRM-BOOL-STACK-ELEM(FRM-NEXT-BOOL-LOC) TO
                FRM-BT1
            MOVE FRM-NORMAL-RETURN TO FRM-RETURN-CODE
        ELSE
            MOVE FRM-BOOL-STACK-UNDERFLOW-ERR TO FRM-RETURN-CODE.

FRM-TOP-BS SECTION.
```

```
FRM-TOP-BS-BEGIN.

IF FRM-NEXT-BOOL-LOC > 1

SUBTRACT 1 FROM FRM-NEXT-BOOL-LOC

MOVE FRM-BOOL-STACK-ELEM(FRM-NEXT-BOOL-LOC) TO

FRM-BT1

ADD 1 TO FRM-NEXT-BOOL-LOC

MOVE FRM-NORMAL-RETURN TO FRM-RETURN-CODE

ELSE

MOVE FRM-BOOL-STACK-UNDERFLOW-ERR TO FRM-RETURN-CODE.

FRM-PUSH-AS SECTION.

FRM-PUSH-AS-BEGIN.

IF FRM-NEXT-ALPHA-LOC NOT > FRM-LAST-ALPHA-LOC

MOVE FRM-AT1 TO

FRM-ALPHA-STACK-ELEM(FRM-NEXT-ALPHA-LOC)

ADD 1 TO FRM-NEXT-ALPHA-LOC

MOVE FRM-NORMAL-RETURN TO FRM-RETURN-CODE

ELSE

MOVE FRM-ALPHA-STACK-OVERFLOW-ERR TO FRM-RETURN-CODE.

FRM-POP-AS SECTION.

FRM-POP-AS-BEGIN.

IF FRM-NEXT-ALPHA-LOC > 1

SUBTRACT 1 FROM FRM-NEXT-ALPHA-LOC

MOVE FRM-ALPHA-STACK-ELEM(FRM-NEXT-ALPHA-LOC) TO

FRM-AT1

MOVE FRM-NORMAL-RETURN TO FRM-RETURN-CODE

ELSE
```

```
        MOVE FRM-ALPHA-STACK-UNDERFLOW-ERR TO FRM-RETURN-CODE.

FRM-PUSH-NS SECTION.

FRM-PUSH-NS-BEGIN.

IF FRM-NEXT-NUM-LOC NOT > FRM-LAST-NUM-LOC

MOVE FRM-NT1 TO

FRM-NUM-STACK-ELEM(FRM-NEXT-NUM-LOC)

ADD 1 TO FRM-NEXT-NUM-LOC

MOVE FRM-NORMAL-RETURN TO FRM-RETURN-CODE

ELSE

MOVE FRM-NUM-STACK-OVERFLOW-ERR TO FRM-RETURN-CODE.

FRM-POP-NS SECTION.

FRM-POP-NS-BEGIN.

IF FRM-NEXT-NUM-LOC > 1

SUBTRACT 1 FROM FRM-NEXT-NUM-LOC

MOVE FRM-NUM-STACK-ELEM(FRM-NEXT-NUM-LOC) TO

FRM-NT1

MOVE FRM-NORMAL-RETURN TO FRM-RETURN-CODE

ELSE

MOVE FRM-NUM-STACK-UNDERFLOW-ERR TO FRM-RETURN-CODE.

*
* CHARACTER HANDLING ROUTINES
*

FRM-CHECK-POS-LEN SECTION.

FRM-CHECK-POS-LEN-BEGIN.

IF FRM-NT1 < 1
```

```
            OR FRM-NT1 > 20

MOVE FRM-INDEX-OUT-OF-RANGE-ERR TO FRM-RETURN-CODE

ELSE

IF FRM-NT2 < 1

OR FRM-NT2 > 20

MOVE FRM-INDEX-OUT-OF-RANGE-ERR TO FRM-RETURN-CODE.

FRM-MOVE-CHAR SECTION.

FRM-MOVE-CHAR-BEGIN.

IF FRM-AT1-POS NOT > 20

AND FRM-AT2-POS NOT > 20

MOVE FRM-AT2-C(FRM-AT2-POS)

TO FRM-AT1-C(FRM-AT1-POS)

ADD 1 TO FRM-AT1-POS

ADD 1 TO FRM-AT2-POS

SUBTRACT 1 FROM FRM-AT1-LEN

ELSE

MOVE ZERO TO FRM-AT1-LEN.

*

* INSTRUCTION FETCH ROUTINES

*

FRM-SKIP SECTION.

FRM-SKIP-BEGIN.

MOVE  FRM-CURRENT-BLOCK-COUNT    TO    FRM-SKIP-BLOCK-COUNT.

FRM-SKIP-LOOP.

IF FRM-OP = 1

ADD 1 TO FRM-CURRENT-BLOCK-COUNT
```

```
        ELSE

IF FRM-OP = 2

SUBTRACT 1 FROM FRM-CURRENT-BLOCK-COUNT.

IF FRM-CURRENT-BLOCK-COUNT > FRM-SKIP-BLOCK-COUNT

PERFORM FRM-GET-NEXT-INSTRUCTION

IF FRM-RETURN-CODE = FRM-NORMAL-RETURN

GO TO FRM-SKIP-LOOP.

FRM-SKIP-EXIT.

EXIT.

FRM-GET-INSTRUCTION SECTION.

FRM-GET-INSTRUCTION-BEGIN.

MOVE FRM-PASS-PREFIX TO FORD-PREFIX.

MOVE FRM-CURRENT-CODE TO FORD-CODE.

MOVE FRM-CURRENT-PROGRAM-COUNTER TO FORD-LINE-NO.

PERFORM FRM-START-FORD-FILE.

PERFORM FRM-READ-NEXT-FORD-FILE.

IF FORD-FILE-STATUS NOT = I-O-OK

MOVE FRM-I-O-ERR TO FRM-RETURN-CODE

ELSE

IF FRM-PASS-PREFIX = FORD-PREFIX

AND FRM-CURRENT-CODE = FORD-CODE

MOVE FORD-LINE-NO

TO FRM-CURRENT-PROGRAM-COUNTER

MOVE FORD-RECORD TO FRM-INSTRUCTION

MOVE FRM-NORMAL-RETURN TO FRM-RETURN-CODE

ELSE

MOVE FRM-FORMULA-NOT-FOUND-ERR TO FRM-RETURN-CODE.
```

```
FRM-GET-NEXT-INSTRUCTION SECTION.

FRM-GET-NEXT-INSTRUCTION-BEGIN.

PERFORM FRM-READ-NEXT-FORD-FILE.

IF FORD-FILE-STATUS NOT = I-O-OK

MOVE FRM-I-O-ERR TO FRM-RETURN-CODE

ELSE

IF FRM-PASS-PREFIX = FORD-PREFIX

AND FRM-CURRENT-CODE = FORD-CODE

MOVE FORD-LINE-NO

TO FRM-CURRENT-PROGRAM-COUNTER

MOVE FORD-RECORD TO FRM-INSTRUCTION

MOVE FRM-NORMAL-RETURN TO FRM-RETURN-CODE

ELSE

MOVE FRM-MISSING-END-BLOCK-ERR TO FRM-RETURN-CODE.

*FRM-PRINT-TRACE-RECORD SECTION.

*FRM-PRINT-TRACE-RECORD-BEGIN.

*   IF FRM-TRACE-FLAG NOT = "Y"

*       GO TO FRM-PRINT-TRACE-RECORD-EXIT.

*   MOVE SPACES TO FRM-PRINT-LINE.

*   MOVE FRM-CURR-ENV-LOC TO PRT-FRM-CURR-ENV-LOC.

*   MOVE FRM-LINE-NO TO PRT-FRM-LINE-NO.

*   MOVE FRM-CURRENT-BLOCK-COUNT TO PRT-FRM-CURRENT-BLOCK-COUNT.

*   MOVE FRM-OP TO PRT-FRM-OP.

*   IF FRM-OP NOT > OP-MAX

*       MOVE OP-DESCRIPTION(FRM-OP) TO PRT-FRM-DESCRIPTION.

*   MOVE FRM-NT1 TO PRT-FRM-NT1.
```

```
*   MOVE FRM-AT1 TO PRT-FRM-AT1.

*   MOVE FRM-BT1 TO PRT-FRM-BT1.

*   MOVE FRM-RETURN-CODE TO PRT-FRM-RETURN-CODE.

*   IF FRM-RETURN-CODE NOT = FRM-NORMAL-RETURN

*       MOVE FRM-ERROR-DESCRIPTION(FRM-RETURN-CODE)

*           TO PRT-FRM-ERROR-DESC.

*   PERFORM PRINT-TRACE-RECORD.

*FRM-PRINT-TRACE-RECORD-EXIT.

*   EXIT.
```

I claim:

1. A computer system for controlling the output of production, including pricing, costing, scheduling etc., of manufactured items, said system comprising:
    (a) input means for receiving production information;
    (b) data file means for storing said production information in a storage device;
    (c) control means for interrogating said data file means, storing said production information and using the result of such interrogation to create a parameter table for controlling said output, said parameter table having a plurality of elements which can be set to pre-determined values or can be determined by user-defined formulas as a function of any of the other elements already in said parameter table;
wherein said control means for interrogating said data file means, storing said production information and using the result of such interrogation to create said parameter table containing said selected production information is selectively operable between said pre-determined values and said user-defined formulas.

2. The apparatus according to claim 1, wherein said production information includes data for sales orders, inventory items, purchase orders, estimates, and work orders.

3. The apparatus according to claim 2, wherein said production information further includes data for product standards including product dependent labor, material, services and other costs items and standard operations including product independent labor, materials services and other costs items.

4. The apparatus according to claim 2, wherein said data file means is divided into separate files, one each for said sales order data, inventory item data, purchase order data, estimate data, and work order data.

5. A method for controlling the output of production, including pricing, costing, scheduling etc., of manufactured items, said system comprising:
    (a) receiving production information;
    (b) storing said production information in a storage device;
    (c) interrogating said storage device, storing said production information and using the result of such interrogation to create a parameter table for controlling said output, said parameter table having a plurality of elements which can be set to pre-determined values or can be determined by user-defined formulas as a function of any of the other elements already in said parameter table;
wherein step (c) is selectively operable between said pre-determined values and said user-defined formulas.

6. The method according to claim 5, wherein said production information includes data for sales orders, inventory items, purchase orders, estimates, and work orders.

7. The method according to claim 6, wherein said production information further includes data for product standards including product dependent labor, material, services and other costs items and standard operations including product independent labor, materials, services and other costs items.

8. The method according to claim 6, wherein said production information is divided into separate files, one each for said sales order data, inventory item data, purchase order data, estimate data, and work order data.

* * * * *